(12) United States Patent
Crockett et al.

(10) Patent No.: US 7,957,509 B2
(45) Date of Patent: *Jun. 7, 2011

(54) VOICE ENHANCING FOR ADVANCE INTELLIGENT NETWORK SERVICES

(75) Inventors: Susanne Marie Crockett, Buffalo Grove, IL (US); Dianna Inara Tiliks, Elk Grove, IL (US); Gordon Lynn Blumenschein, Woodridge, IL (US); James Daniel Kovarik, Batavia, IL (US); Scott Ryan Watry, Greenfield, WI (US); Kenneth Robert Stroud, Lago Vista, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 900 days.

This patent is subject to a terminal disclaimer.

(21) Appl. No.: 11/875,295

(22) Filed: Oct. 19, 2007

(65) Prior Publication Data
US 2008/0089503 A1    Apr. 17, 2008

Related U.S. Application Data

(63) Continuation of application No. 10/134,637, filed on Apr. 30, 2002, now Pat. No. 7,317,787.

(51) Int. Cl.
*H04M 1/64* (2006.01)

(52) U.S. Cl. ............... 379/88.03; 370/468; 379/201.03; 379/207.02; 455/454; 455/466; 700/182; 701/2; 701/117; 713/170; 717/136; 726/28

(58) Field of Classification Search ............... 379/88.03, 379/201.03, 219, 220.01, 207.02; 455/466, 455/454; 701/117, 2; 704/275; 705/52; 709/225; 715/209; 370/468; 700/182; 713/170; 717/136; 726/28

See application file for complete search history.

(56) References Cited

U.S. PATENT DOCUMENTS

| 4,232,199 A | 11/1980 | Boatwright et al. |
| 4,266,098 A | 5/1981 | Novak |
| 4,296,463 A | 10/1981 | Dalboussiere et al. |
| 4,429,188 A | 1/1984 | Allen |
| 4,611,094 A | 9/1986 | Asmuth et al. |
| 4,611,096 A | 9/1986 | Asmuth et al. |
| 4,788,718 A | 11/1988 | McNabb |

(Continued)

FOREIGN PATENT DOCUMENTS

EP          0611083          8/1994

(Continued)

OTHER PUBLICATIONS

Berman, Roger K., and Brewster, John H., "Perspectives on the AIN Architecture," IEEE Communications Magazine, pp. 27-32 (Feb. 1992).

(Continued)

*Primary Examiner* — Gerald Gauthier
(74) *Attorney, Agent, or Firm* — Greenblum & Bernstein, P.L.C.

(57) ABSTRACT

A method for updating communications service parameters includes receiving, at a platform configured for speech recognition functionality and corresponding to a communications address associated with verbally updating communications service parameters, a voice instruction from a requester to update a communications service parameter. The voice instruction is translated into digital command data and the digital command data and the update to the communications service parameter are stored in a database. A change in a communications service corresponding to the update to the communications service parameter is implemented in near real-time.

22 Claims, 49 Drawing Sheets

U.S. PATENT DOCUMENTS

| | | | |
|---|---|---|---|
| 4,860,347 A | 8/1989 | Costello | |
| 4,878,240 A | 10/1989 | Lin et al. | |
| 4,897,866 A | 1/1990 | Majmudar et al. | |
| 4,899,373 A | 2/1990 | Lee et al. | |
| 5,054,055 A | 10/1991 | Hanle et al. | |
| 5,109,408 A | 4/1992 | Greenspan et al. | |
| 5,200,995 A | 4/1993 | Gaukel et al. | |
| 5,222,125 A | 6/1993 | Creswell et al. | |
| 5,241,588 A | 8/1993 | Babson, III et al. | |
| 5,247,571 A | 9/1993 | Kay et al. | |
| 5,294,229 A | 3/1994 | Hartzell et al. | |
| 5,333,185 A | 7/1994 | Burke et al. | |
| 5,337,351 A | 8/1994 | Manabe et al. | |
| 5,345,380 A | 9/1994 | Babson, III et al. | |
| 5,353,331 A | 10/1994 | Emery et al. | |
| 5,396,546 A | 3/1995 | Remillard | |
| 5,398,220 A | 3/1995 | Barker | |
| 5,404,396 A | 4/1995 | Brennan | |
| 5,436,957 A | 7/1995 | McConnell | |
| 5,438,568 A | 8/1995 | Weisser, Jr. | |
| 5,444,768 A | 8/1995 | Lemaire et al. | |
| 5,448,631 A | 9/1995 | Cain | |
| 5,463,682 A | 10/1995 | Fisher et al. | |
| 5,467,388 A | 11/1995 | Redd, Jr. et al. | |
| 5,469,500 A | 11/1995 | Satter et al. | |
| 5,479,487 A | 12/1995 | Hammond | |
| 5,483,582 A | 1/1996 | Pugh et al. | |
| 5,533,102 A | 7/1996 | Robinson et al. | |
| 5,535,263 A | 7/1996 | Blumhardt | |
| 5,544,320 A | 8/1996 | Konrad | |
| 5,548,566 A | 8/1996 | Barker | |
| 5,550,909 A | 8/1996 | Chanda et al. | |
| 5,572,583 A | 11/1996 | Wheeler, Jr. et al. | |
| 5,579,384 A | 11/1996 | Seymour | |
| 5,583,564 A | 12/1996 | Rao et al. | |
| 5,592,541 A | 1/1997 | Fleischer, III et al. | |
| 5,615,252 A | 3/1997 | Sizer, II et al. | |
| 5,625,676 A | 4/1997 | Greco et al. | |
| 5,629,978 A | 5/1997 | Blumhardt et al. | |
| 5,642,410 A | 6/1997 | Walsh et al. | |
| 5,655,013 A | 8/1997 | Gainsboro | |
| 5,657,451 A | 8/1997 | Khello | |
| 5,680,446 A | 10/1997 | Fleischer, III et al. | |
| 5,687,212 A | 11/1997 | Kinser, Jr. et al. | |
| 5,696,815 A | 12/1997 | Smyk | |
| 5,740,438 A | 4/1998 | Ratcliff et al. | |
| 5,742,668 A | 4/1998 | Pepe et al. | |
| 5,751,707 A | 5/1998 | Voit et al. | |
| 5,754,636 A | 5/1998 | Bayless et al. | |
| 5,758,351 A | 5/1998 | Gibson et al. | |
| 5,764,748 A | 6/1998 | Rosenthal et al. | |
| 5,787,237 A | 7/1998 | Reilly | |
| 5,790,173 A | 8/1998 | Strauss et al. | |
| 5,796,806 A | 8/1998 | Brickbichler | |
| 5,796,950 A | 8/1998 | Sips et al. | |
| 5,799,073 A | 8/1998 | Fleischer, III et al. | |
| 5,802,157 A | 9/1998 | Clarke et al. | |
| 5,802,159 A | 9/1998 | Smolentzov et al. | |
| 5,805,587 A | 9/1998 | Norris et al. | |
| 5,822,419 A | 10/1998 | Enstone et al. | |
| 5,864,613 A | 1/1999 | Flood | |
| 5,867,562 A | 2/1999 | Scherer | |
| 5,870,549 A | 2/1999 | Bobo, II | |
| 5,881,144 A | 3/1999 | Havens | |
| 5,892,822 A | 4/1999 | Gottlieb et al. | |
| 5,915,008 A | 6/1999 | Dulman | |
| 5,917,817 A | 6/1999 | Dunn et al. | |
| 5,920,618 A | 7/1999 | Fleischer, III et al. | |
| 5,933,490 A | 8/1999 | White et al. | |
| 5,933,778 A | 8/1999 | Buhrmann et al. | |
| 5,937,050 A | 8/1999 | Yue et al. | |
| 5,940,488 A | 8/1999 | DeGrazia et al. | |
| 5,945,985 A * | 8/1999 | Babin et al. | 715/209 |
| 5,946,381 A | 8/1999 | Danne et al. | |
| 5,958,016 A | 9/1999 | Chang et al. | |
| 5,982,774 A | 11/1999 | Foladare et al. | |
| 5,982,870 A | 11/1999 | Pershan et al. | |
| 5,999,611 A | 12/1999 | Tatchell et al. | |
| 6,028,917 A | 2/2000 | Creamer et al. | |
| 6,032,184 A | 2/2000 | Cogger et al. | |
| 6,038,296 A | 3/2000 | Brunson et al. | |
| 6,058,175 A | 5/2000 | Schultz | |
| 6,058,178 A | 5/2000 | McKendry et al. | |
| 6,097,802 A | 8/2000 | Fleischer, III et al. | |
| 6,104,799 A | 8/2000 | Jain et al. | |
| 6,115,040 A | 9/2000 | Bladow et al. | |
| 6,118,780 A | 9/2000 | Dunn et al. | |
| 6,125,126 A | 9/2000 | Hallenstal | |
| 6,134,310 A | 10/2000 | Swan et al. | |
| 6,160,877 A | 12/2000 | Tatchell et al. | |
| 6,161,128 A | 12/2000 | Smyk | |
| 6,167,122 A | 12/2000 | Titmuss et al. | |
| 6,173,437 B1 | 1/2001 | Polcyn | |
| 6,192,118 B1 | 2/2001 | Bayless et al. | |
| 6,195,678 B1 | 2/2001 | Komuro | |
| 6,195,697 B1 | 2/2001 | Bowman-Amuah | |
| 6,212,561 B1 | 4/2001 | Sitaraman et al. | |
| 6,233,330 B1 | 5/2001 | McClure et al. | |
| 6,240,441 B1 | 5/2001 | Beckett et al. | |
| 6,246,751 B1 | 6/2001 | Bergl et al. | |
| 6,246,756 B1 | 6/2001 | Borland et al. | |
| 6,259,449 B1 | 7/2001 | Saxena et al. | |
| 6,263,064 B1 | 7/2001 | O'Neal et al. | |
| 6,304,641 B1 | 10/2001 | Culli et al. | |
| 6,317,484 B1 | 11/2001 | McAllister | |
| 6,320,948 B1 | 11/2001 | Heilmann et al. | |
| 6,330,598 B1 | 12/2001 | Beckwith et al. | |
| 6,337,899 B1 | 1/2002 | Alcendor et al. | |
| 6,445,694 B1 | 9/2002 | Swartz | |
| 6,453,164 B1 | 9/2002 | Fuller et al. | |
| 6,456,706 B1 | 9/2002 | Blood | |
| 6,463,145 B1 | 10/2002 | O'Neal et al. | |
| 6,505,051 B1 * | 1/2003 | Alperovich et al. | 455/466 |
| 6,529,596 B1 | 3/2003 | Asprey et al. | |
| 6,549,619 B1 | 4/2003 | Bell et al. | |
| 6,574,661 B1 | 6/2003 | Delano et al. | |
| 6,631,186 B1 | 10/2003 | Adams et al. | |
| 6,631,416 B2 | 10/2003 | Bendinelli et al. | |
| 6,640,239 B1 | 10/2003 | Gidwani | |
| 6,662,221 B1 | 12/2003 | Gonda et al. | |
| 6,671,365 B2 | 12/2003 | Kemppainen | |
| 6,678,827 B1 | 1/2004 | Rothermel et al. | |
| 6,728,238 B1 | 4/2004 | Long et al. | |
| 6,748,439 B1 | 6/2004 | Monachello et al. | |
| 6,778,651 B1 | 8/2004 | Jost et al. | |
| 6,782,305 B2 * | 8/2004 | Liteplo et al. | 700/182 |
| 6,785,606 B2 * | 8/2004 | DeKock et al. | 701/117 |
| 6,816,481 B1 | 11/2004 | Adams et al. | |
| 6,891,940 B1 | 5/2005 | Bhandari et al. | |
| 6,931,115 B1 | 8/2005 | Okamura | |
| 6,961,417 B2 * | 11/2005 | Koch | 379/207.02 |
| 7,054,644 B2 * | 5/2006 | Heubel | 455/454 |
| 7,085,287 B1 * | 8/2006 | Chapman | 370/468 |
| 7,092,803 B2 * | 8/2006 | Kapolka et al. | 701/29 |
| 7,117,159 B1 * | 10/2006 | Packingham et al. | 704/275 |
| 7,133,517 B2 * | 11/2006 | Pinckney et al. | 379/219 |
| 7,155,001 B2 | 12/2006 | Tiliks et al. | |
| 7,167,550 B2 | 1/2007 | Klos et al. | |
| 7,203,837 B2 * | 4/2007 | O'Shea et al. | 713/170 |
| 7,222,334 B2 * | 5/2007 | Casati et al. | 717/136 |
| 7,317,787 B2 * | 1/2008 | Crockett et al. | 379/88.03 |
| 7,349,430 B1 * | 3/2008 | Chapman | 370/468 |
| 7,370,364 B2 * | 5/2008 | Dobbins et al. | 726/28 |
| 7,447,287 B1 | 11/2008 | Parantainen | 375/354 |
| 7,526,547 B2 * | 4/2009 | Rodrigo | 709/225 |
| 2001/0034711 A1 * | 10/2001 | Tashenberg | 705/52 |
| 2001/0047265 A1 * | 11/2001 | Sepe, Jr. | 704/275 |
| 2001/0048738 A1 | 12/2001 | Baniak et al. | |
| 2001/0049737 A1 | 12/2001 | Carolan et al. | |
| 2002/0054587 A1 | 5/2002 | Baker et al. | |
| 2002/0168055 A1 | 11/2002 | Crockett et al. | |
| 2002/0176557 A1 | 11/2002 | Burger | |
| 2003/0005076 A1 | 1/2003 | Koch et al. | |
| 2003/0007621 A1 | 1/2003 | Graves et al. | |
| 2003/0031306 A1 * | 2/2003 | Pedersen et al. | 379/220.01 |
| 2003/0076941 A1 | 4/2003 | Tiliks et al. | |
| 2003/0079028 A1 | 4/2003 | Kortum et al. | |

| | | |
|---|---|---|
| 2003/0161459 A1 | 8/2003 | McBlain et al. |
| 2003/0200321 A1 | 10/2003 | Chen et al. |
| 2004/0111269 A1 | 6/2004 | Koch |
| 2004/0199624 A1 | 10/2004 | Poisson et al. |
| 2004/0213392 A1 | 10/2004 | Crockett et al. |
| 2004/0243708 A1 | 12/2004 | Stebbings |
| 2004/0267440 A1* | 12/2004 | DeKock et al. ............ 701/117 |
| 2005/0058270 A1 | 3/2005 | Allen et al. |
| 2005/0114794 A1 | 5/2005 | Grimes et al. |

FOREIGN PATENT DOCUMENTS

| | | |
|---|---|---|
| EP | 0740480 | 10/1996 |
| WO | 92/09164 | 5/1992 |
| WO | 99/16230 | 4/1999 |
| WO | 99/20058 | 4/1999 |
| WO | 00/65857 | 11/2000 |
| WO | 01/35240 | 5/2001 |

OTHER PUBLICATIONS

Advanced Intelligent Network (AIN) 0.1 Switching Systems Generic Requirements (Bellcore TR-NWT-001284), Issue 1, (Aug. 1992).

Advanced Intelligent Network (AIN) 0.1 Switch-Service Control Point (SCP) Application Protocol Interface Generic Requirements (Bellcore TR-NWT-001285), Issue 1 (Aug. 1992).

"MegaHub PACE SMS—Service Management System—Advanced Intelligent Network Systems," Communications Corporation, Issue 0.4 (Jul. 1994).

BT Technology Journal, vol. 13, No. 2, Ipswich GB. pp. 132-142, Marshall et al., "The information services supermarket" (Apr. 1995).

Internet Web Pages by Z-Tel, "Personal Communications Center" (Apr. 2000).

Internet Web Pages by TOSC International, "Cool Call" (May 2000).

Internet Web Pages by Phone.Com, "My Phone Service" (downloaded May 2000).

Lennox et al., "Call processing Language Framework and Requirements" RFC 2824, (May 2000).

Lennox et al., "CPL: A Language for User Control of Internet Telephony Services", Internet Engineering Task Force, IPTEL WG (Oct. 2000).

"Sprint Wholesale Toll-Free Services," www.sprintbiz.com/wholesale/products/toll_free_services.pdf (Jan. 2001).

"Next Generation Phone System", Internet web pages by CommWeb. Com (Aug. 2001).

Internet web pages by Dazil Internet Services, "Caller EyeDee" (downloaded Dec. 2001).

"Teleglobe International Toll Free Services," www.teleglobe.com (Dec. 2002).

Kramer, "Standalone Call Accounting: The Hardware, the Software, and the Enterprise", Communications Convergence, Mar. 2001, http://www.cconvergence.com/shared/article/showArticle.jhtml?articleId=8711796&pgno=1 (downloaded Jun. 2004).

Internet Web Site by iVB Enterprise Solutions, "SpeechAccess Speaker Verification," http//www.intervoice-brite.com/ivbes/speechaccess/ speaker_verification.html (downloaded Apr. 2002).

* cited by examiner

ONLINE CALL MANAGER -

PLEASE SELECT AN ACCOUNT NUMBER:

<u>BUSINESS</u>     <u>PERSONAL</u> o (314) 372-5010 BUSINESS LINE 1    o (512) 555-5831 HOME
o (314) 372-5011 BUSINESS LINE 2    o (512) 555-8433 WIRELESS
o (314) 372-5012 BUSINESS LINE 3

SUBMIT

FIG. 6

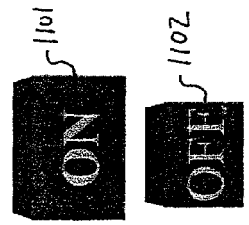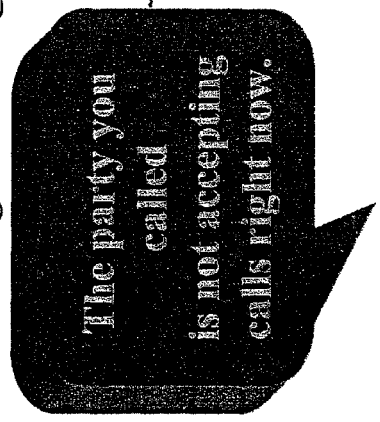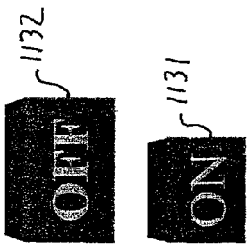
Fig. 20

*Home Monitor: Reports Menu* — 1210

| Blocked Calls From | Time/Date | Blocked Calls To: |
|---|---|---|
| 312-555-9999 | 09/01/01 9:27 | |
| 847-566-9191 | 09/01/01 12:13 | |
| 847-555-3232 | 09/01/01 15:10 | |
| 603-444-4444 | 09/01/01 16:32 | |
| 701-555-5555 | 09/01/01 17:03 | |
| | 09/01/01 17:45 | 616-333-1245 |

*Call Status Screen*

| ON | Call Forward All Calls To: 312-555-1616<br>Voice Mail Number is: 312-555-1616 | OFF ~94 |
|---|---|---|
| ON | Call Forward Time Start: 7:00 AM M-F<br>Call Forward Time Stop: 3:00 PM M-F<br>Calls From ALL to (312) 555 1616 | OFF ~95 |
| ON | Call Forward Time Start: 3:00 PM Sat<br>Call Forward Time Stop: 7:00 PM Sat<br>Calls From 601-555-5555,<br>134-123-1234 to (312) 338-8353 | OFF ~96 |
| ON | 701-555-5555, 123-444-4444 Will Call You Back<br>608-555-8282, 312-555-9999 Call Me Back Later | OFF ~97 |
| ON | 603-444-4444 Special Forward to 312-555-1616 | OFF ~98 |

VOICE ENHANCING FOR ADVANCE INTELLIGENT NETWORK SERVICES

This application is a continuation application of pending U.S. patent application Ser. No. 10/134,637, filed on Apr. 30, 2002.

This application is related to U.S. patent application Ser. No. 09/716,276, filed Nov. 21, 2000, entitled "System and Method for Implementing and Accessing Call Forwarding Services" in the names of Gordon L. BLUMENSCHEIN et al., and is further related to U.S. patent application Ser. No. 09/983,303, filed Oct. 24, 2001, entitled "System and Method for Restricting and Monitoring Telephone Calls" in the names of Nancy A. BOOK et al., the disclosures of which are expressly incorporated by reference herein in their entireties.

BACKGROUND OF THE INVENTION

1. Field of the Invention

The present invention relates to the field of telecommunications. More particularly, the present invention relates to advanced intelligent network (AIN) call services enhanced for voice interaction with subscribers and callers.

2. Acronyms

The written description provided herein contains acronyms which refer to various telecommunications services, components and techniques, as well as features relating to the present invention. Although some of these acronyms are known, use of these acronyms is not strictly standardized in the art. For purposes of the written description herein, the acronyms are defined as follows:

Advanced Intelligent Network (AIN)
Anonymous Call Rejection (ACR)
Authentication/Subscription Information (ASI)
Caller Identification (Caller ID)
Central Office (CO)
Common Object Request Broker Architecture (CORBA)
Dual Tone Multi-Frequency (DTMF)
Electronic Key Telephone System (EKTS)
Generic Data Interface (GDI)
Graphical User Interface (GUI)
HyperText Mark-Up Language (HTML)
HyperText Transfer Language Protocol (HTTP)
Incoming Call Manager (ICM)
Interactive Voice Response (IVR)
Internet Caller Identification (ICID)
Internet Call Waiting (ICW)
Lightweight Directory Access Protocol (LDAP)
Line Information Database (LIDB)
Local Access and Transport Area (LATA)
local exchange carrier (LEC)
Local Number Portability (LNP)
Numbering Plan Area (NPA)
Off-Hook Delay (OHD)
Outgoing Call Control (OCC)
Personal Computer (PC)
Personal Call Manager/Personal Communications Manager (PCM)
Personal Digital Assistant (PDA)
Personal Identification Number (PIN)
Plain Old Telephone Service (POTS)
Public Switched Telephone Network (PSTN)
Registration Server (RS)
Service Control Point (SCP)
Service Management System (SMS)
Service Node/Intelligent Peripheral (SN/IP)
Service Switching Point (SSP)
Signaling System 7 (SS7)
Signaling Transfer Point (STP)
Subscriber Internet Provider (SIP)
Time of Day/Day of Week (TOD/DOW)
Terminating Attempt Trigger (TAT)
Transaction Capabilities Application Part (TCAP)
Transmission Control Protocol/Internet Protocol (TCP/IP)
Uniform Resource Locator (URL)
World Wide Web (WWW)

3. Background Information

Currently, subscribers to call control services within the public switched telephone network (PSTN) are able to initiate and modify their services by calling a customer service representative or by interacting with an interactive voice response (IVR) system using a standard dual tone multifrequency (DTMF) telephone device. These methods practically limit the number and types of services that can be provided to and modified by the subscribers because all information pertaining to the services is presented audibly. In addition, the potential market for subscribers to call control services is not fully exploited because of customer reluctance to use IVR systems.

Furthermore, for many call control services, subscribers must submit requests to the customer service arm of their provider to initiate new services or update existing ones. The requests are implemented according to the provider's time line and discretion. It is difficult for the users to gauge when the service alteration will take effect.

There have been attempts to remedy the problems associated with IVR access to PSTN services. These attempts incorporate use of packet switched data networks, such as the Internet, to avoid conventional IVR systems and to streamline the initiation and modification functions. The current Internet based systems have several drawbacks, however, including the inability to ensure near real-time update of services and incompatibility with existing IVR implementations. Also, because the current Internet based systems operate exclusively from the conventional IVR systems, i.e., the two systems cannot coexist, customers must select either the Internet interface or the IVR interface. Consequently, a customer who has selected the Internet interface, and who is without a personal computer (PC) and/or Internet access, is not able to make desired changes to his or her services through an IVR. The inability to implement desired changes is especially troublesome considering that users are often interested in altering some call services (e.g., call screening, call forwarding, paging, and caller ID) when they are away from their home or business telephone and PC.

An example of call control services provided over a packet switched data network is described in CHANG et al., U.S. Pat. No. 5,958,016, which teaches enabling advanced intelligence network (AIN) services over the World Wide Web (WWW or "the web") through a provisioning system called the service management system (SMS). The service management system as disclosed in CHANG et al., however, does not ensure near real-time data update and is not compatible with existing IVR implementations. Therefore, the services presented via the web are limited in functionality to the extent near real-time data updates are not guaranteed. For example, if a subscriber modifies an incoming call service, which blocks calls from selected phone numbers or classes of phone numbers, to add an allowed incoming phone number, the subscriber will not begin immediately to receive calls from the newly blocked phone number. Rather, the subscriber must wait an unspecified period of time for the service to be updated via the SMS. Also, as discussed above, the web interface and the IVR interface are mutually exclusive.

One conventional call control service is call blocking, in which incoming or outgoing calls are blocked based on selected time periods or on the calling telephone number. For example, if a family wishes not to be disturbed at dinner time, the subscriber initiates an incoming call blocking service, e.g., depressing a predetermined sequence of keys of a DTMF telephone, to avoid receiving all incoming calls from 5:30 p.m. to 7:00 p.m. Similarly, a business that conducts a daily staff meeting from 8:00 a.m. to 9:00 a.m. may redirect all incoming calls to an answering service. Likewise, conventional services enable subscribers to block calls from selected telephone numbers, e.g., telemarketers, to avoid harassment or interruptions.

Outgoing calls may similarly be blocked based on selected time periods or on called telephone numbers. Conventionally, outgoing calls are blocked during certain hours selected by the subscriber. For example, calls from a teenager's telephone can be blocked from 9:00 p.m. to 7:00 a.m. the following day in order to prevent excessive nightly use of the telephone and to encourage the teenager to do homework or go to bed. Further, a typical application of controlling outgoing calls based on telephone numbers is blocking calls to "900" numbers from the subscriber's business or home, avoiding potentially inappropriate communications and undesirable bills. Also, conventional services typically enable blocking of all long distance calls initiated from the subscriber's telephone.

One drawback of the current call blocking service is that, because of the lack of precise control, it may prevent completion of important calls to and from the subscriber's telephone number during the call blocking activation period. For example, a service that merely blocks all incoming calls to the subscriber's home during a preselected time period each day, or originating from a particular area code, may inadvertently prevent the subscriber from calling his own home. Similarly, the subscriber is unable to complete a telephone call from his own home during a restricted period, or to a restricted number, without first deactivating the call blocking feature. The unblocking process is time consuming and, in an emergency situation, potentially disastrous. This is especially the case where a subscriber must painstakingly use an IVR system dependent on touch tones of a DTMF telephone.

Another disadvantage is that the subscriber does not know what and when telephone calls are blocked, unless the subscriber also subscribes to (and activates) a separate service, e.g., caller identification, automated voice messaging, etc., that captures the information. Further, conventional call blocking systems do not provide instantaneous (or nearly instantaneous) call blocking data from the PSTN to the customer.

In addition, there is no convenient way to interactively access AIN call services, e.g., changing forwarding phone numbers, accessing records of blocked calls, activating schedules, activating restricted number lists, and the like, that is consistently and reliably available to the customer, regardless of the customer's circumstances and location. For example, some conventional AIN call services are generally accessible to the customer either using a DTMF telephone through an IVR system in the PSTN or using a graphical user interface (GUI) over the Internet. The IVR communication is often more convenient due to the common accessibility of DTMF telephones. IVR interaction is time consuming and often tedious and undesirable from the subscriber's point of view. This is especially true when the subscriber or caller must enter long series of numbers using the touch-tone keypad, as may be the case for extended IVR menuing and security information, such as an account number, an access number and a personal identification numbers (PIN).

Although automated speech recognition capability in an IVR may be an improvement, such systems are not generally available for AIN call services and exclude the ability of the subscriber to access and modify the services over the Internet.

The Internet communication may be preferable under many circumstances, because service related data is provided quickly and in easily comprehensible visual (as opposed to audio) formats. However, Internet communications require an Internet accessible device, such as a personal computer or a personal digital assistant (PDA). Internet accessible devices are significantly more expensive than DTMF telephones and less readily accessible. Also, in order to have both IVR and Internet access to control call forwarding, subscribers would have to open separate accounts, which is inconvenient and potentially difficult for the provider to reconcile, especially where the multiple accounts may send conflicting information regarding calls to be forwarded with respect to the same telephone number.

The present invention overcomes the problems associated with the prior art, as described below.

BRIEF DESCRIPTION OF THE DRAWINGS

The present invention is further described in the detailed description that follows, by reference to the noted drawings by way of non-limiting examples of embodiments of the present invention, in which like reference numerals represent similar parts throughout several views of the drawings, and in which:

FIG. 6 is an exemplary window to be displayed at the user's PC requesting identification of a PCM account number, according to an aspect of the present invention;

FIG. 20 is an exemplary web page to be displayed at the subscriber's PC showing a screening routing list, according to an aspect of the present invention;

FIG. 21 is an exemplary web page to be displayed at the subscriber's PC showing a calling blocking report, according to an aspect of the present invention;

FIG. 26 is an exemplary web page to be displayed at the user's PC showing a change to the weekly scheduler, according to an aspect of the present invention;

FIG. 27 is an exemplary web page to be displayed at the user's PC showing an updated weekly scheduler, according to an aspect of the present invention;

FIG. 30 is an exemplary web page to be displayed at the user's PC showing an activation and scheduling summary for Flexible Call Forwarding, according to an aspect of the present invention;

FIG. 31 is an exemplary web page of an alternative embodiment to be displayed at the user's PC showing an activation and scheduling summary for Flexible Call Forwarding, according to an aspect of the present invention;

DETAILED DESCRIPTION OF EMBODIMENTS

Figure 1:
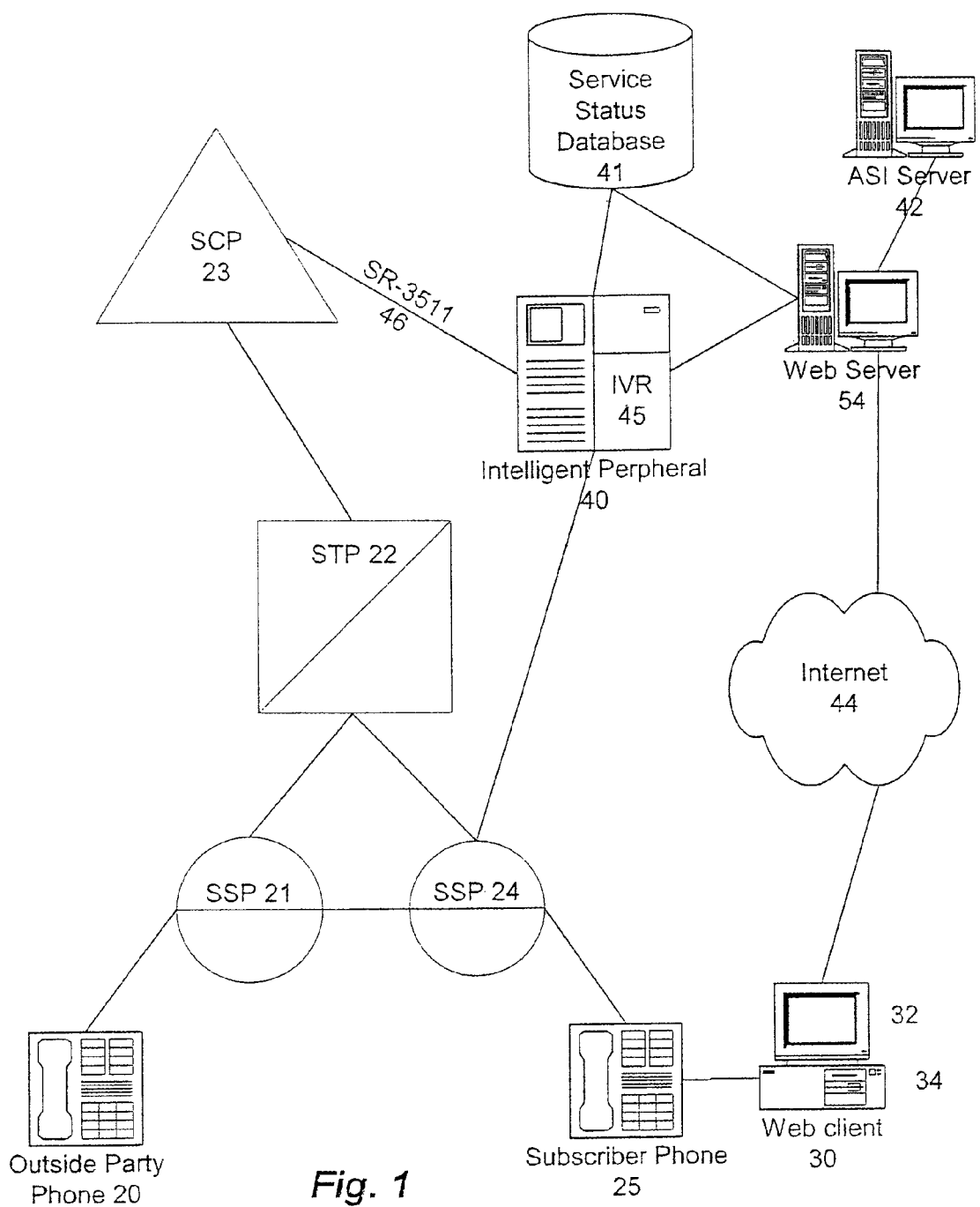
FIG. 1 is a block diagram showing an exemplary PCM telecommunications network, according to an aspect of the present invention.

The present invention relates to enhancing AIN call services to further resolve the previously identified problems, simply and efficiently. The AIN call services to which the voice enhancement applies may be implemented individually or through a Personal Call Manager (PCM) system, along with other telecommunication services, such as call monitoring, Flexible Call Forwarding, Internet Caller Identification (ICID), Incoming Call Manager (ICM), Outgoing Call Control (OCC) and personal directories. The present invention also relates to an AIN based service that allows a subscriber connected to a communications network, including the Internet and other packet switched type data networks, as well as through conventional IVR and service node/intelligent peripheral (SN/IP) systems, to customize and execute the AIN call services, with near real-time access to the service data. Furthermore, the present invention enables the IVR and SN/IP systems to incorporate voice recognition, further simplifying the subscriber and/or caller interaction with the AIN call services when not using the communications network.

In view of the above, the present invention through one or more of its various aspects and/or embodiments is presented to accomplish one or more objectives and advantages, such as those noted below.

An aspect of the present invention provides a method for verbally editing at least one parameter of a subscriber's AIN service using speech recognition functionality residing on an intelligent peripheral, which includes an interactive voice response platform. The parameter is stored in association with an account of the subscriber. A call, including at least a dialed number associated with editing the AIN service, is received from the subscriber at a switch. The dialed number may include a toll free number or a star code. In response to the dialed number, a connection is established with the intelligent peripheral. Call service data of the subscriber's account, including the parameter, is retrieved from a database and a voice announcement is played to the subscriber, identifying the parameter. The intelligent peripheral receives a voice instruction from the subscriber in response to the voice announcement and translates the voice instruction into digital command data relating to a change to the parameter. The digital command data and the change to the parameter is stored, and the change is implemented in near real-time.

The connection with the intelligent peripheral that is established in response to the dialed number may include suspending the call at the switch and establishing a temporary connection between the switch and the intelligent peripheral using a first interface protocol, such as a GR-1129 interface protocol. The call service data is then retrieved from the database by establishing a connection between the intelligent peripheral and a service control point (SCP) using a second interface protocol, such as an SR-3511 interface protocol, and retrieving the call service data from an SCP database. Implementing the change to the parameter includes transmitting the change from the intelligent peripheral to the SCP through the second interface protocol connection, storing the change in the SCP database, and implementing the change in response to a trigger activating the AIN service. Alternatively, the connection with the intelligent peripheral may include routing the call from the switch to the intelligent peripheral.

The method may further include establishing a connection between a graphical user interface (GUI) of the subscriber and the intelligent peripheral through a web server in a packet switched data network, and establishing a connection between the intelligent peripheral and the database. The call service data of the subscriber account, including the change to the parameter, is retrieved from the database and displayed at the GUI.

Another aspect of the present invention provides a method for accessing a subscriber account in a database relating to an AIN service in a public switched telephone network (PSTN). The method includes receiving calling data associated with a call initiated by the subscriber at a switch, the calling data including at least one dialed number associated with accessing the AIN service. An SCP is queried based on at least the dialed number. A connection is established with a service node/intelligent peripheral (SN/IP) based on an instruction received from the SCP in response to the query, enabling speech recognition functionality of the SN/IP. A first voice announcement is played at the SN/IP requesting identification information relating to the subscriber account. A first voice response is received from the subscriber providing the requested identification information. The information is translated into digital identification data and the subscriber is verified based on the digital identification data. The verification may include comparing the digital identification data to previously stored voice data of the subscriber.

A connection is established between the SN/IP and the AIN service database and call service data is retrieved from the subscriber account. A second voice announcement is played at the intelligent peripheral based on the retrieved call service data. A second voice response is received from the subscriber relating to a modification to the call service data and translated into digital instruction data. The call service data is updated based on the modification and sent to the AIN service database. The updated call service data is stored for immediate implementation in the AIN service database. Establishing the connection with the SN/IP may include suspending the call at the switch and forming a temporary connection between the switch and the SN/IP using a GR-1129 interface protocol. Establishing the connection between the SN/IP and the AIN service database may include forming a connection between the SN/IP and the SCP using an SR-3511 interface protocol.

Another aspect of the present invention provides a method for executing an AIN service using speech recognition functionality residing on an intelligent peripheral and includes storing at least one parameter in a database in association with an AIN service of a subscriber account. The parameter relates to a restriction on calls involving the subscriber's telephone number. A switch receives a call from a calling terminal involving the subscriber's telephone number and queries an SCP based on the subscriber telephone number. A connection is established with the intelligent peripheral, which includes an interactive voice response platform, based on a response to the query. Call service data of the subscriber, including the at least one parameter, is retrieved from the database. A voice announcement is played to the calling terminal, identifying the parameter and requesting an instruction or a verification relating to the call service data. The intelligent peripheral receives a voice input from the calling terminal in response to the voice announcement, providing the instruction or the verification, and translates the voice input into digital command data. The switch receives an instruction from the intelligent peripheral for processing the call based on the digital command data. The call is processes according to the instruction.

Establishing the connection with the intelligent peripheral may include suspending the call at the switch and establishing a temporary connection between the switch and the intelligent peripheral using a first interface protocol, such as the GR-1129 interface protocol. Retrieving the call service data of the subscriber's account from the database may include establishing a connection between the intelligent peripheral and the SCP, which may include the database, using a second interface protocol, such as the SR-3511 interface protocol.

Another aspect of the present invention provides a system for verbally editing at least one parameter of a subscriber's AIN service in the PSTN using speech commands. The parameter is stored in association with a subscriber account. The system includes an intelligent peripheral with speech recognition functionality, which is accessible by the subscriber through the PSTN and a packet switched data network. The system also includes a switch, which receives a call from the subscriber and establishes a connection with the intelligent peripheral based on at least a dialed number of the call, and an AIN service database, which stores call service data in relation to the subscriber account. The call service data includes the at least one parameter. The intelligent peripheral retrieves the parameter from the AIN service database, plays a voice announcement to the subscriber relating to the parameter, receives a voice instruction from the subscriber in response to the voice announcement relating to a change to the parameter, translates the voice instruction into digital command data, and edits the parameter in accordance with the digital command data. The AIN service database stores the edited parameter in association with the account in near real-time for immediate implementation in the PSTN.

The switch may establish the connection with the intelligent peripheral by suspending the call and establishing a temporary connection between the switch and the service intelligent peripheral using a first interface protocol, such as the GR-1129 protocol. The system may further include an SCP, which includes the AIN service database. The intelligent peripheral then retrieves the parameter from the AIN service database by connecting to the SCP using a second interface protocol such as the SR-3511 protocol, and retrieving the parameter from an SCP database. The SCP receives the edited parameter from the intelligent peripheral through the second interface protocol connection, stores the edited parameter in the AIN service database, and implements the edited parameter in response to a trigger activating the AIN service. Also, the switch may establish the connection with the intelligent peripheral by routing the call to the intelligent peripheral, in response to the dialed number, based on an internal routing translation or an instruction from the SCP.

Another aspect of the present invention provides a system for accessing an account of a subscriber, relating to an AIN service in the PSTN, including a switch, an SCP, an AIN service database and a SN/IP. The switch receives calling data relating to a call from the subscriber at a terminal, the calling data including at least one dialed number associated with the AIN service. The SCP receives a query from the switch based on at least the dialed number. The AIN service database stores AIN service data, including identification data and call service data, in relation to the subscriber account. The SN/IP is connected to the subscriber terminal by the switch based on an instruction from the SCP in response to the query, enabling speech recognition functionality, so that the SN/IP receives the AIN service data from the AIN service database. The SN/IP receives a first voice input from the subscriber terminal, in response to a first voice prompt, providing identification information, translates the first voice input into digital identification data, and verifies the subscriber based comparing the digital identification data with the stored identification data. The SN/IP further receives a second voice input from the subscriber terminal, in response to a second voice prompt, relating to a modification to the AIN service data, translates the second voice response into digital instruction data, updates the AIN service data based on the digital instruction data, and sends the updated AIN service data to the AIN service database, which stores the updated AIN service data for implementation by the SCP.

The system may further include a web server in a packet switched data network connectable to the subscriber's GUI and the SN/IP. The SN/IP then receives the digital identification data relating to the subscriber account from the subscriber through the GUI, retrieves the updated AIN service data from the subscriber account in the AIN service database, and displays the retrieved data on the GUI.

Another aspect of the present invention provides a system for executing an AIN service of a subscriber in the PSTN using speech recognition. The system includes an SCP, a switch and an intelligent peripheral. The SCP includes an AIN service database that stores call service data, including at least one parameter relating to a restriction on calls involving a subscriber telephone number, in relation to a subscriber account. The switch receives a call from a calling terminal involving the subscriber telephone number and queries the SCP based on at least the subscriber telephone number. The SCP identifies the AIN service and the subscriber account based on the subscriber telephone number. The intelligent peripheral, which includes speech recognition functionality, retrieves the call service data from the AIN service database. The switch establishes a connection with the intelligent peripheral based on an instruction from the SCP in response to the query. The intelligent peripheral plays a voice announcement to the calling terminal through the connection with the switch, the voice announcement identifying the parameter and requesting an instruction or a verification relating to the call service data. The intelligent peripheral also receives a voice input from the calling terminal in response to the voice announcement, providing the instruction or the verification. The intelligent peripheral then translates the voice input into digital command data and instructs the switch to process the call based on the digital command data.

Another aspect of the present invention provides a computer readable medium for storing a computer program that enables editing at least one parameter of an AIN service of a subscriber, using speech recognition functionality residing on an intelligent peripheral, where the at least one parameter is stored in association with a subscriber account. The computer readable medium includes a receiving source code segment that receives a call from the subscriber at a switch, including at least a dialed number for editing the AIN service; a connecting source code segment that establishes a connection with the intelligent peripheral in response to the dialed number; and a retrieving source code segment that retrieves call service data from a database, including the parameter and relating to the subscriber account. The intelligent peripheral is accessible by the subscriber through a web server in a packet switched data network. The computer readable medium further includes a speech recognizing source code segment that plays a voice announcement to the subscriber identifying the parameter, receives a voice instruction from the subscriber in response to the voice announcement and translates the voice instruction into digital command data relating to a change to the at least one parameter. The computer readable medium also includes a storing source code segment, which receives and stores the digital command data relating to the change to the parameter in the database, and an implementing source code segment, which implements the change to the parameter in near real-time.

The connecting source code segment may establish the connection with the intelligent peripheral by suspending the call at the switch and establishing a temporary connection between the switch and the intelligent peripheral using a GR-1129 interface protocol. The retrieving source code segment may retrieve the call service data of the subscriber account from the database by establishing a connection between the intelligent peripheral and an SCP in the PSTN using an SR-3511 interface protocol. Alternatively, the connecting source code segment establishes the connection with the intelligent peripheral by routing the call from the switch to the intelligent peripheral.

Another aspect of the present invention provides a computer readable medium for storing a computer program that accesses an account of a subscriber for an AIN service in the PSTN, including a receiving source code segment that receives calling data at a switch, the calling data being associated with a call initiated by the subscriber and including at least one dialed number associated with the AIN service. The computer readable medium also includes a querying source code segment, which queries a SCP based on at least the dialed number, and a connecting source code segment, which establishes a connection with a SN/IP based on an instruction received from the SCP in response to the query. The computer readable medium also includes a first speech recognizing source code segment that receives a first voice input at the SN/IP from the subscriber terminal in response to a first automated voice prompt, the first voice input providing identification information; translates the first voice input into digital identification data; and verifies the subscriber based on comparing the digital identification data with previously stored identification data. Further, the computer readable medium includes a second speech recognizing source code segment that receives a second voice input at the SN/IP from the subscriber terminal in response to a second automated voice prompt, the second voice input relating to a modification of previously stored AIN service data; translates the second voice response into digital instruction data; and updates the AIN service data based on the digital instruction data. A memory stores the updated AIN service data for implementation by the SCP.

Yet another aspect of the present invention provides a computer readable medium for storing a computer program that executes a subscriber's AIN service using speech recognition functionality residing on an intelligent peripheral, including a storing source code segment that stores at least one parameter in a database in association with an AIN service account of the subscriber; a receiving source code segment that receives at a switch a call from a calling terminal involving the subscriber telephone number and queries an SCP based on at least the subscriber telephone number; a connecting source code segment that establishes a connection with the intelligent peripheral based on a response to the query; and a data retrieving source code segment that retrieves call service data of the subscriber from the database, including the parameter. The parameter relates to a restriction on calls involving the subscriber's telephone number. The computer readable medium further includes a speech recognizing source code segment that plays a voice announcement to the calling terminal, the voice announcement identifying the parameter and requesting an instruction or a verification relating to the call service data; receives a voice input from the calling terminal in response to the voice announcement, providing the instruction or the verification; and translates the voice input into digital command data. The computer readable medium also includes a processing source code segment that receives at the switch an instruction from the intelligent peripheral for processing the call based on the digital command data and processes the call according to the instruction.

The various aspects and embodiments of the present invention are described in detail below.

Personal Call Manager

The Personal Call Manager (PCM) service is an AIN based service that allows a subscriber connected to a communications network, including the Internet and other packet switched type data networks, as well as through IVR systems, including IVR functionality provided by SN/IPs, to customize and execute services associated with telephonic communications, with near real-time access to the service data. PCM enhances functionality and compatibility with other AIN based call control services, including, for example, the call monitoring, Flexible Call Forwarding and Intelligent Call Forwarding services, discussed below.

FIG. 1 illustrates an exemplary telecommunications network in association with PCM. The network includes an outside party telephone 20, service switching points (SSPs) 21 and 24, and a subscriber telephone 25. The subscriber telephone 25 is any type of PSTN compatible telephone, including a plain old telephone service (POTS) telephone, or a telephone in a Centrex system, a PBX system or electronic key telephone system (EKTS). The exemplary network also includes a signaling transfer point (STP) 22, a service control point (SCP) 23 and an intelligent peripheral (AIN/IP) 40, which incorporates an IVR 45.

By way of example, the SCP 23 is implemented with the Bellcore Integrated Service Control Point, loaded with ISCP software Version 4.4 (or higher), available from Telecordia, Murray Hill, N.J. In an alternative embodiment of the invention, the SCP 23 may be a Lucent Advantage SCP, with software release 94, available from Lucent Technologies, Inc.

Depending on the call origination point, the SSP 21 and the SSP 24 may be either the originating or the terminating switch. For example, if a call is placed from the outside party telephone 20 to the subscriber telephone 25, the SSP 21 is the originating switch and the SSP 24 is the terminating switch. If a call is placed from the subscriber telephone 25 to the outside party telephone 20, the SSP 24 is the originating switch and SSP 21 is the terminating switch. However, as a practical matter, the originating switch and the terminating switch may be the same, or the call may be routed through any number of intervening switches in the PSTN between the originating and the terminating switches. The SSPs 21 and 24 include, for example, 1AESS or 5ESS switches manufactured by Lucent Technologies, Inc.; DMS-100 switches manufactured by Nortel Networks Corporation (Nortel); AXE-10 switches manufactured by Telefonaktiebolaget LM Ericsson, or EWSD switches available from Siemens Information and Communication Networks, Inc. The switches may utilize an AIN Release 0.1 protocol. However, embodiments of the present invention may include switches, such as ATM switches, that are incorporated into any alternative telecommunications technology.

The call flow logic of the present invention may be upgraded to accommodate future AIN releases and protocols and future trigger types. Specifications of AIN Release 0.1 SSPs may be found in Bellcore TR-NWT-001285, Switch-Service Control Point Application Protocol Interface Generic Requirements, and Telecordia Technical Reference TR-NWT-001284, AIN Switching Systems Generic Requirements, the disclosures of which are expressly incorporated by reference herein in their entireties.

In alternative embodiments, the intelligent peripheral 40 may be a SN/IP, such as an IBM Resource Manager, a Lucent Compact Service Node or a Lucent Enhanced Media Resource Server (eMRS). The data network communicates to the PSTN (specifically the SCP 23) through the intelligent peripheral 40 using the SR-3511 protocol 46, or an equivalent protocol. Also, as stated above, the IVR 45 of the intelligent peripheral 40 is accessible through a PSTN central office switch (CO), such as the SSP 21 or the SSP 24. The intelligent peripheral 40 communicates with the switches using the GR-1129 protocol.

An associated data network includes a web client 30, a web server 54, an authentication/subscription information server 42 and a service status database 41, connectable through the Internet 44. Although FIG. 1 depicts a direct connection between the Internet 44 and the web client 30, such as a conventional T1 or cable modem connection, it is intended to include any type of Internet interface, including a telephone modem connection through the subscriber phone 25 and the associated SSP 24. The web client 30 includes a GUI 32, i.e., a PC, operating client software 34, an example of which is ICW Client, available from Southwestern Bell Telephone Company. Alternatively, the client software 34 can be run at the web server 54. The web client 30 incorporates a web browser, such as Microsoft Internet Explorer, available from Microsoft Corporation, or Netscape Navigator, available from Netscape Communications Corporation. In one embodiment, the web client 30 is implemented with an IBM Pentium based PC, running the Linux operating system, available from, for example, Free Software Foundation, Inc., or the Microsoft Windows operating system, and running the Microsoft Internet Explorer, Netscape Navigator or HotJava, available from Sun Microsystems, Inc., web browser software. An embodiment of the invention includes the web server 54 running the Linux or Microsoft Windows operating system and the Apache web server software, available from the Apache Software Foundation, or the Jigsaw web server software, available from World Wide Web Consortium (W3C).

Figure 2:
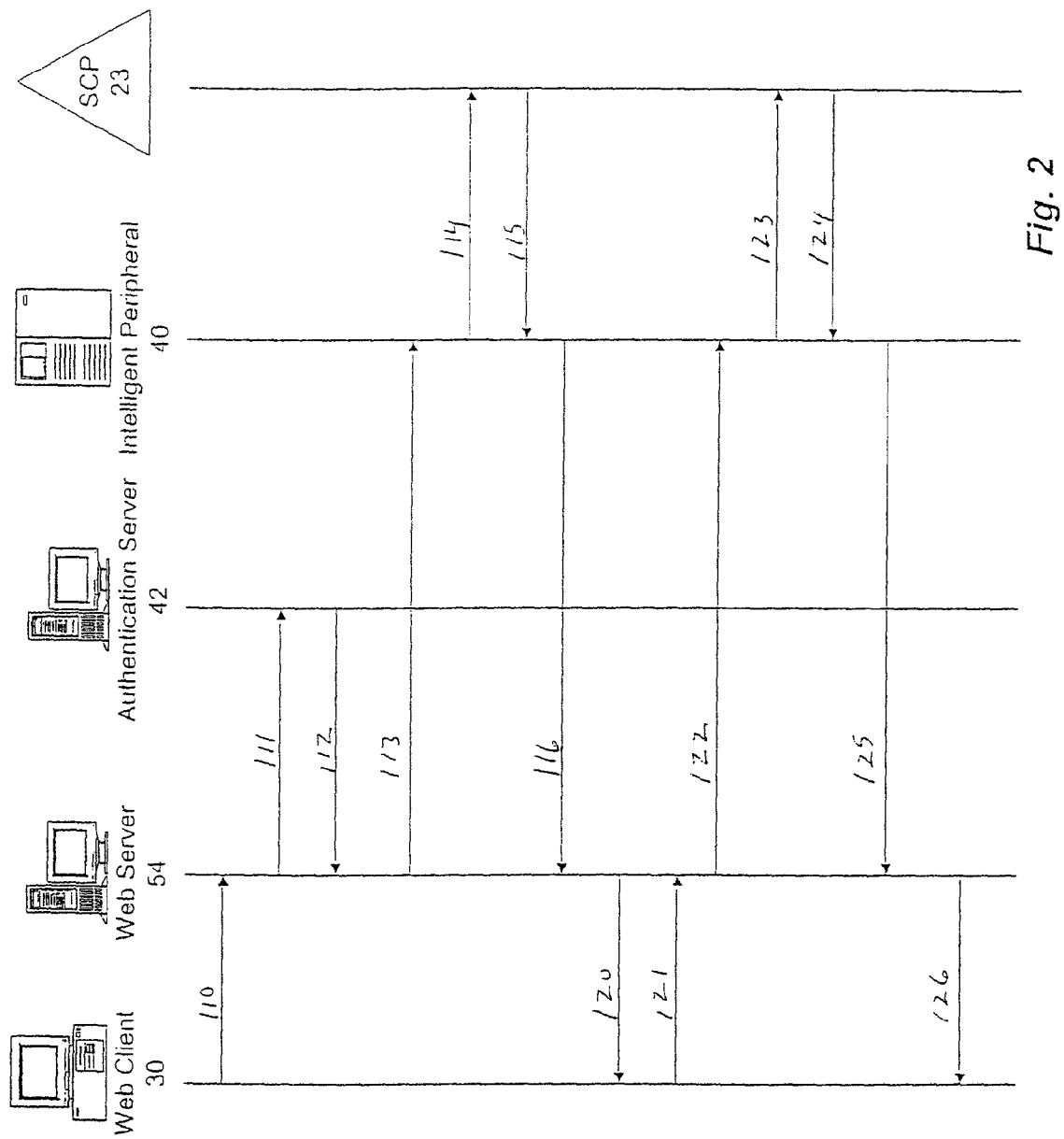
FIG. 2 is a call flow diagram illustrating subscriber requests for information from the PCM system, according to an aspect of the present invention.

FIG. 2 is an exemplary call flow diagram depicting a subscriber using the PCM service. Initially, the subscriber accesses a public packet switched data network, such as the Internet, from a web client 30, using a web browser such as Microsoft Internet Explorer, Netscape Navigator or HotJava. Once on the Internet, the subscriber connects to the web server 54 at step 110, which serves as a secure access platform. The web server 54 receives HTTP messages from the web client 30 and provides HTML web pages in response to the subscriber's input to the web client 30. The web pages relate to the subscriber's PCM account.

Once connected to the web server 54, the user must first log-in to the PCM account, also depicted at block 201 in FIG. 4 and described below. The log-in equates to an authentication of the user. To perform the authentication, the web server 54 contacts the authentication/subscription information (ASI) server 42 at step 111, which confirms that the subscriber is an authorized user by verifying at least the subscriber's name and a password. The ASI server 42 also provides to the web server 54 a list of the services to which the user has subscribed in the PCM account at step 112. The services for each phone number are linked to the PCM account through the ASI server 42.

At steps 113 and 114, the web server 54 then retrieves from the SCP 23, via the intelligent peripheral 40, current service data and the related status of the various services, such as call monitoring and Flexible Call Forwarding, managed through the PCM account. The data and status of the services, i.e., service data, is forwarded to the web client 30 at steps 115 and 116. A PCM summary page is displayed on the web client 30 at step 120, as seen for example in FIG. 7, discussed in detail below.

Figure 3:
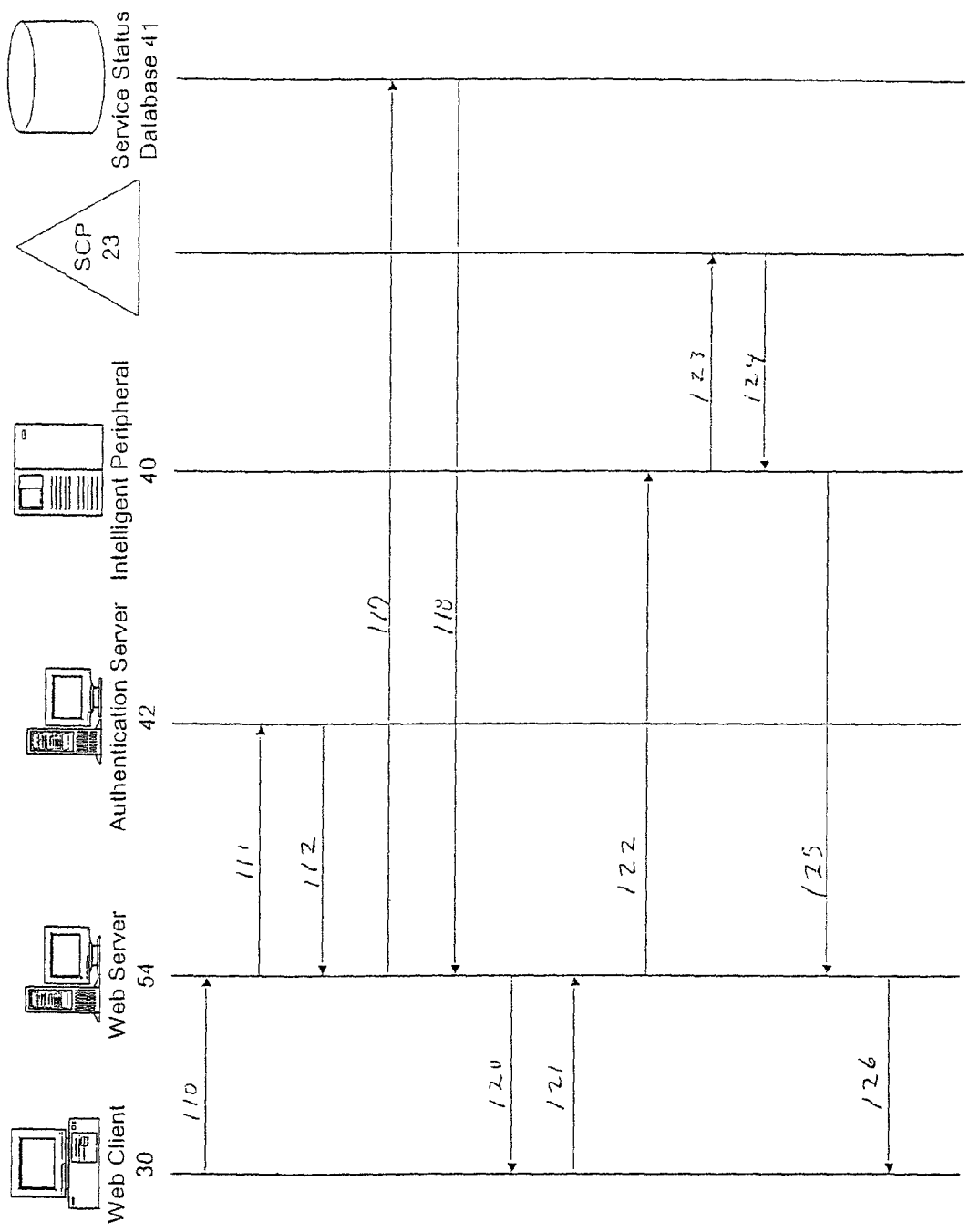
FIG. 3 is a call flow diagram illustrating subscriber requests for information from the PCM system, according to an alternative embodiment of the present invention.

In another embodiment, depicted in FIG. 3, after logging in and being authenticated at steps 110-112, the web server 54 retrieves from a service status database 41 the data and status of the various services managed through the PCM account at steps 117 and 118, rather than from the SCP 23, directly. This database serves as a cache for the service information in the SCP 23. The service status database 41 contains information current to the most recent update interface with the SCP 23. The cache arrangement enables the user to efficiently access this information without waiting for the SCP 23 to process the request. At the same time, it reduces SCP 23 traffic. The service status database 41 is refreshed periodically to ensure currency, as well as pursuant to a specific command by the user. This database is a conventional lightweight directory access protocol (LDAP) database, such as the LDAP database available from Lucent Technologies, Inc. In the alternative, the database may be a standard relational database, such as those available from Oracle Corporation or Sybase, Inc.

Upon review of the service status, the user may choose to interact with one or all of the available services, as shown in FIGS. 2 and 3. When the user selects a desired service, a message is sent at step 121 to the web server 54, which responds with the corresponding service screen. When the user selects a particular service necessitating access to the PSTN (e.g., OCC or ICM), the request is sent to the intelligent peripheral 40 at step 122.

Significantly, the intelligent peripheral 40 may be the same intelligent peripheral that implements IVR access to the user's services through a conventional PSTN. The intelligent peripheral 40 internally translates data messages received from the web server 54 and accesses the relevant call services data from the SCP 23 at step 123 through the SR-3511 protocol, the use of which enables the simultaneous compatibility with functions of the IVR 45. Details of the SR-3511 protocol are provided in Bellcore, Recommendation SR-3511 SCP Intelligent Peripheral (IP) Interface Specification for TCP/IP, Version 5.0 (January 1997), the disclosure of which is expressly incorporated by reference herein in its entirety. In various embodiments, the translation program is in C, C++ or JAVA. The intelligent peripheral 40 then transmits a summary of the requested service, based on information received from the SCP 23 at step 124, to the web server 54 at step 125. The web server 54 sends the information to the web client 30 at step 126 to be displayed to the user.

At this point, the user may choose to update or to simply review the service information. When the service is updated, the web server 54 sends the update instructions in a data message to the intelligent peripheral 40. The intelligent peripheral then translates the update instruction into the SR-3511 protocol and communicates the updated service parameters directly to the SCP 23.

For example, one available service is call manager, discussed in detail below, which includes an Incoming Call Manager (ICM), by which the user may prioritize, forward, preview or block selected telephone numbers. In the update procedure, the subscriber enters a telephone number to be blocked, for instance, which the web server 54 communicates to the intelligent peripheral 40. The intelligent peripheral 40, in turn, sends the data via SR-3511 to the SCP 23, which flags the number to be blocked. Because the instructions of the intelligent peripheral 40 to the SCP 23 are sent and implemented almost immediately, without the involvement of the provider's account management or customer service, the changes to the service are operable and available shortly after the user sends the instructions. In an embodiment that includes the service status database 41, the cache will then be updated in due course to reflect the updated information in the SCP 23.

Figure 4:
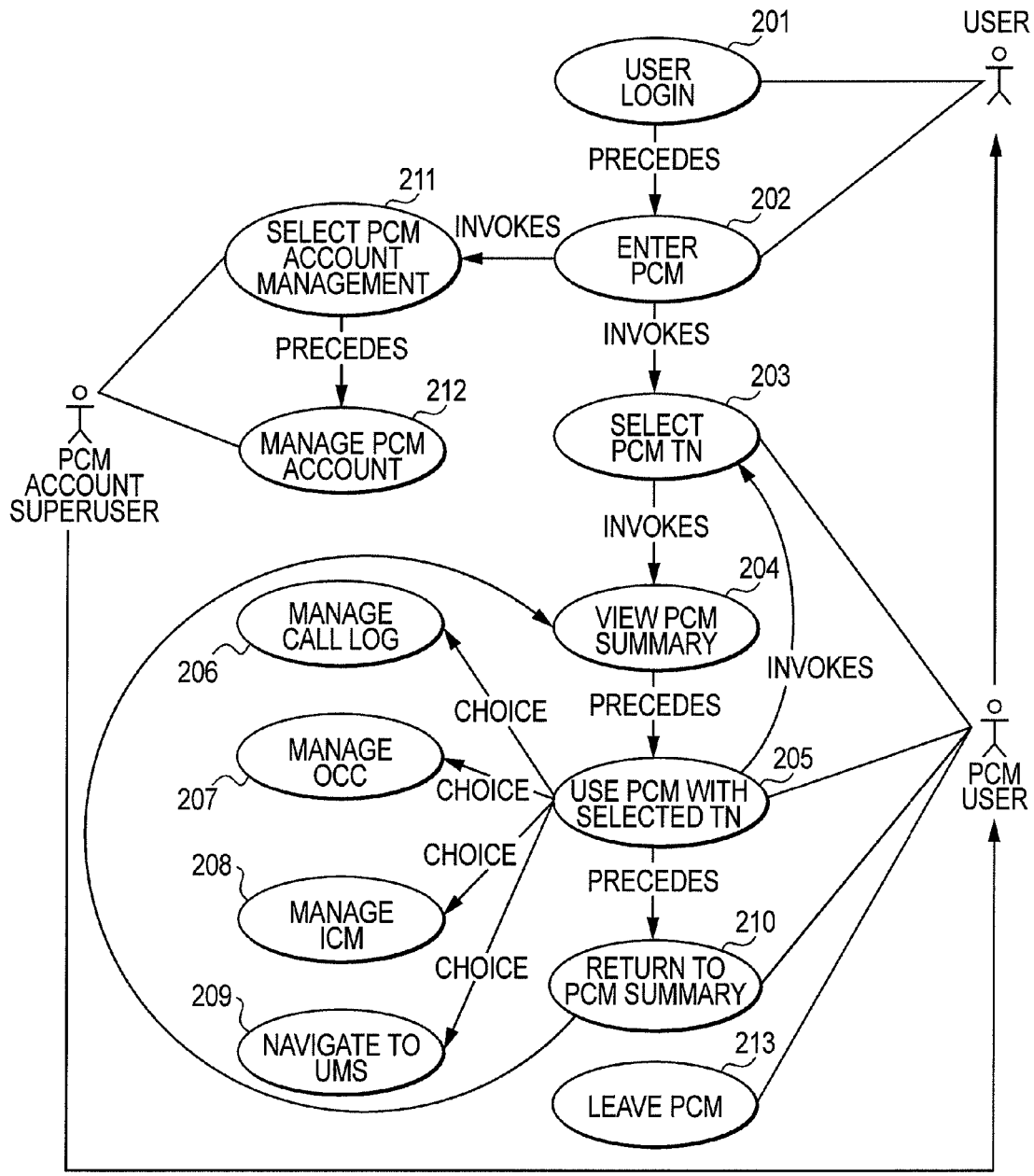
FIG. 4 illustrates user action in an exemplary web-based PCM system, according to an aspect of the present invention.
Figure 5:
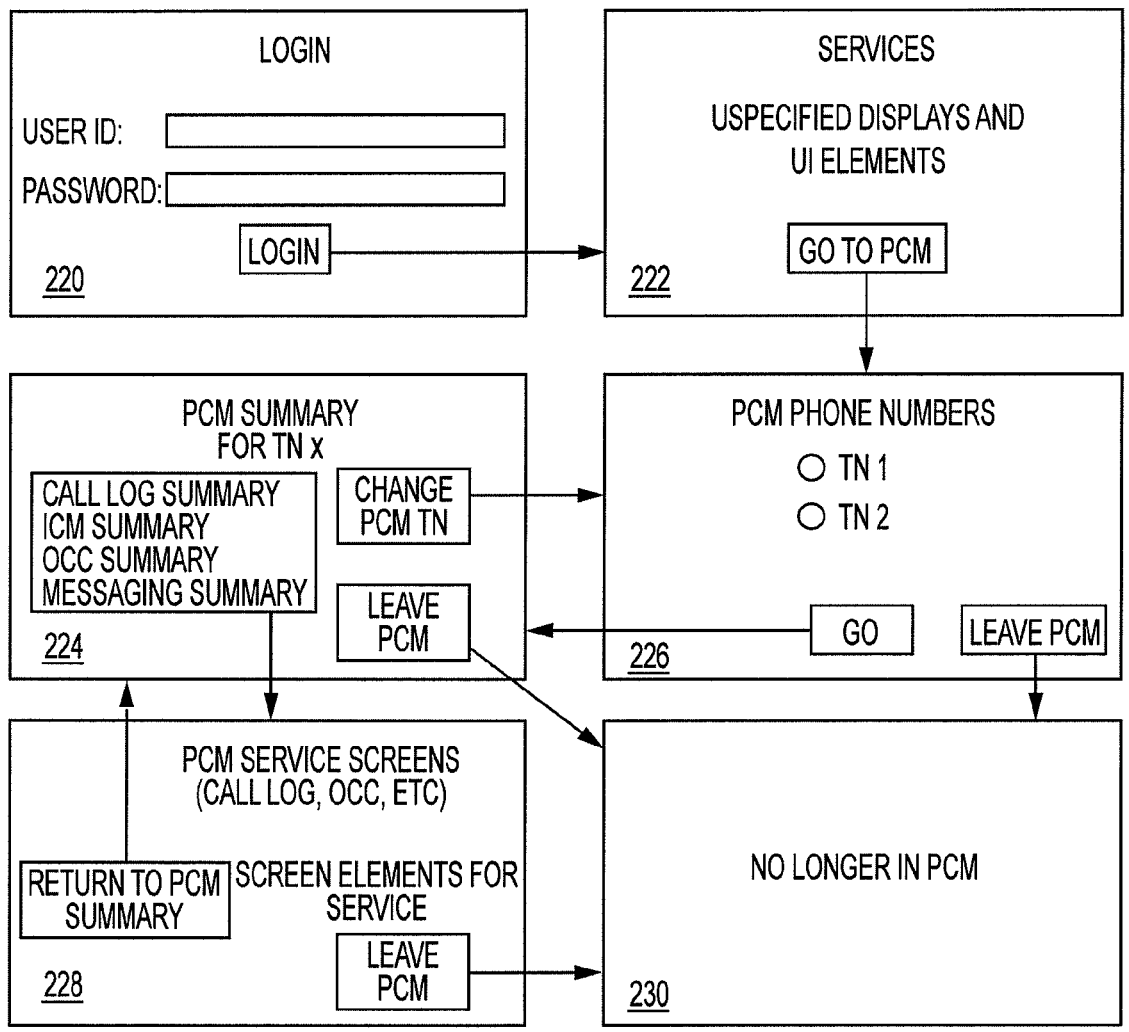
FIG. 5 illustrates an exemplary window navigation flow for basic user actions, according to an aspect of the present invention.

FIG. 4 depicts the procedure followed by the subscriber when first entering the PCM web site. The subscriber must first log-in at block 201. Assuming the subscriber's PCM account has already been established, he or she must provide the authentication data to proceed. The authentication data is entered at a log-in screen, an example of which is depicted in FIG. 5 at screen 220. To maintain the integrity of the secure platform, authentication preferably requires a user ID and a password. The user ID is any name, not necessarily unique within the PCM system, selected at account initiation by the subscriber. The password is confidential (at the subscriber's discretion) and must be unique with respect to the associated user ID. The subscriber may change the password as desired, but appropriate authentication data must be provided prior to such changes. If the subscriber enters an invalid user ID or password, the web server 54 responds with a message explaining the problem and allows another chance to enter correct data.

After the user is authenticated, the user proceeds to enter the PCM at block 202. At this time, the user views a general informational screen 222 of FIG. 5, which is formatted at the discretion of the service provider. It may include, by way of example, new services offered to the subscriber. After the user elects to proceed into the PCM, the web server 54 navigates to a page 226 that displays telephone numbers associated with the PCM account(s) to which the user belongs and to which the user is authorized to access. FIG. 6 depicts an exemplary screen displaying phone numbers to which the user has access.

At this point, the user selects a telephone number at block 203 and the corresponding services are displayed for the selected telephone number at screen 224. The user may then elect to implement the various services in place for a particular phone number. In an embodiment of the invention, if the user selects the Flexible Call Forwarding service in the PCM account, he or she further enters the appropriate PIN. Alternatively, at block 202 the user may elect to manage the PCM account at blocks 211 and 212, depending on the user's privileges, assigned by the subscriber, within a particular account to manage the PCM account.

If the PCM has more than one associated telephone number, the user would see a web page listing the numbers, as in screen 226 of FIG. 5. The screen has user interface elements that allow the user to select one of the numbers. Thus, each PCM account keeps track of a non-empty set of phone numbers to be managed through the PCM on behalf of the corresponding set of users, presumably members of a family, business, organization or other group related to the subscriber.

After the user selects a phone number at block 203, the system displays for the user a PCM summary page 204 corresponding to the selected telephone number. The PCM summary page displays only data the user is authorized to see for the selected telephone number. As shown at screen 224, the PCM summary provides various options to the user, including by way of example, selecting from among listed services 206-209, returning to select an alternative PCM telephone number or exiting PCM altogether 213.

Figure 7:
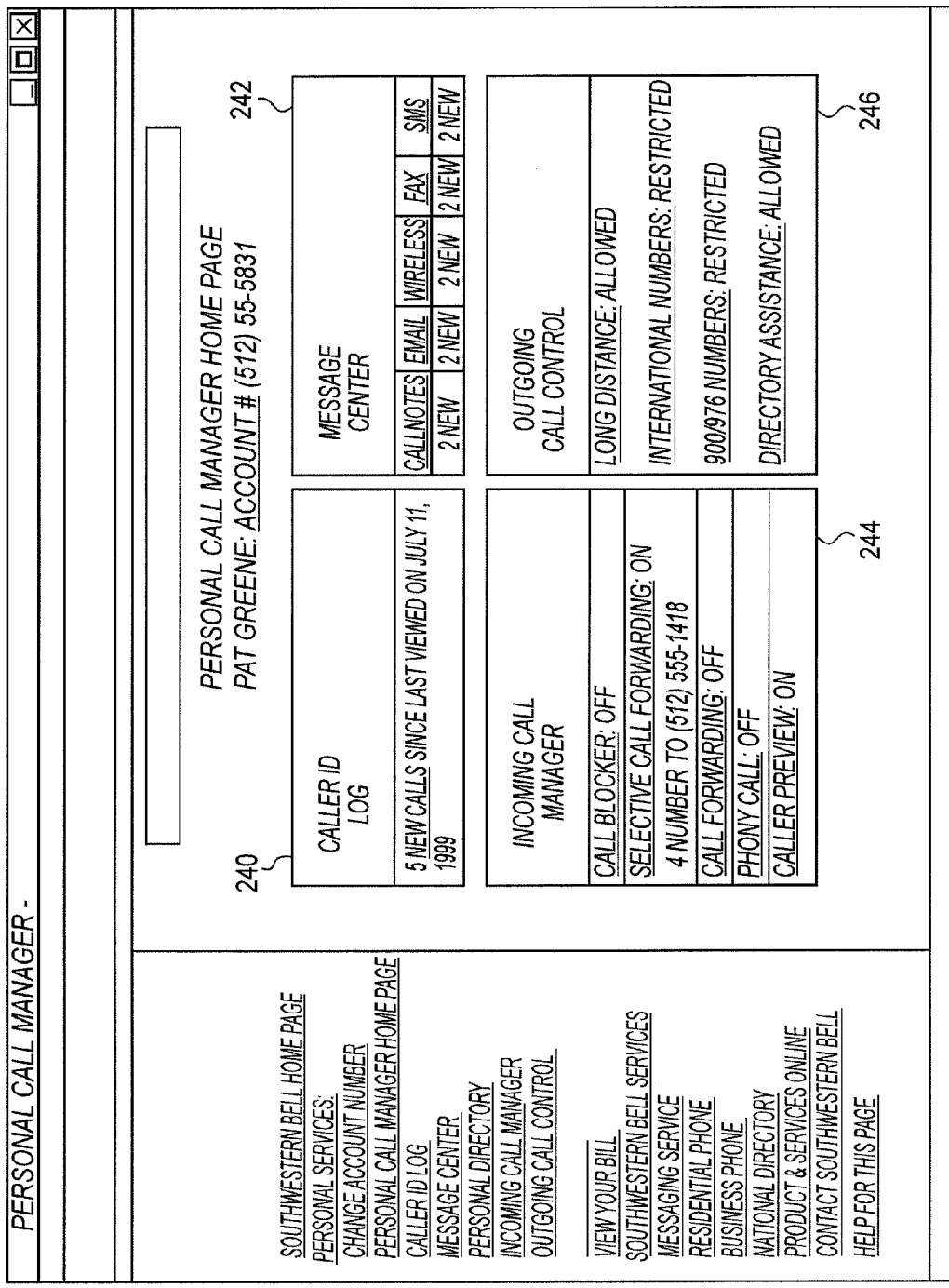
FIG. 7 is an exemplary PCM home page window to be displayed at the user's PC identifying customized user options for a selected account number, according to an aspect of the present invention.

FIG. 7 shows an exemplary PCM summary display, which corresponds to screen 224 of FIG. 5, entitled Personal Call Manager Home Page for account number (512)555-5831, which is the selected telephone number in the example. FIG. 7 shows four services accessible through the PCM, although the four services are not intended to be limiting. That is, the PCM is able to administer any call services associated with an SCP 23. The services depicted in the PCM summary screen 224, as well as in FIG. 7, are Caller ID Log 240, Message Center 242, Incoming Call Manager (ICM) 244 and Outgoing Call Control (OCC) 246. The displayed information is summary in fashion, the details being available to the user through selection of one of the available services, which displays a PCM service screen 228 of FIG. 5. At the summary screen, the Caller ID Log 240 of FIG. 7 retrieves data from the SCP 23 and shows, for example, the number of call records added since the last review. The Message Center 242 retrieves data from the SCP 23 and shows the number of new call notes, e-mails, wireless calls, faxes and messages reviewed. The ICM 244 of FIG. 7 likewise retrieves data from the SCP 23 and shows the status of the call blocker, call forwarding, priority call and caller preview features. The OCC summary retrieves data from the SCP 23 and shows whether international calls, long distance calls, 900/976 numbers and/or directory assistance calls are restricted.

From the PCM summary screen, the user may choose to use PCM to manage any of the displayed services, indicated at block 205 in FIG. 4. This is done by simply clicking on one of the display boxes 240-246 of FIG. 7 to cause the web server 54 to display a new web page corresponding to the selected service. Or, the PCM summary page includes a list of the personal services 248, which duplicates the display boxes. In addition, the list 248 may include additional personal services that do not require interaction with the SCP 23. These services include, for example, a personal directory, paging capability and billing review.

The paging capability provides the option of paging the subscriber when a caller ID is received from a subscriber specified phone number. Paging may include a page, a wireless short message, an e-mail, or a generated phone call to a specified number. Moreover, caller ID logs can be collected and paged to the subscriber at periodic intervals with summary and/or detailed information.

After selection of one of the services, the web server 54 navigates to and displays the selected services web page, indicated by blocks 206-209, and displays the corresponding service screen 228 of FIG. 5. The user may review information, activate or deactivate the service or change the scope of the service, as desired, in accordance with the level of access available to that user. After accessing one of the available services, the user may return to the PCM summary page at block 210. Returning can be accomplished by selecting a specific option to return or by simply clicking the BACK icon provided by the web browser. The user may also exit PCM at block 213 of FIG. 4, ending the current session at block 230 of FIG. 5.

As stated above, the subscriber may interface with the PCM service, as well as the individual AIN calling services that may be implemented through the PCM service, through the IVR 45 of the intelligent peripheral 40. From any DTMF telephone, the subscriber dials a toll-free number, e.g., an 800 number or local service provider number, to access the IVR 45. Alternatively, the subscriber may dial a star code, such as *95, in response to which the SSP 24 has been programmed to route the connection to the IVR 45 to access a particular AIN service, such as call blocking, discussed below. Once the connection is established, the IVR 45 prompts the subscriber to enter an account number, along with a password or PIN, using the touch tone keypad of the DTMF telephone. Upon successful authentication, the subscriber has the ability to perform any number of administrative and operational functions, such as changing or adding PINs, toggling the services ON and OFF and activating or deactivating customized lists and schedules.

In an embodiment of the invention, the intelligent peripheral 40 (and the IVR 45) are provided with speech recognition functionality. For example, in response to automated voice prompts, an IBM Resource Manager, programmed with speaker independent Nuance 8.0 speech recognition software, available from Nuance Communications, may receive and interpret voice input from the caller, in addition to touch tone signals. Any comparable speech recognition system may likewise be incorporated into the system, such as a Lucent eMRS.

The intelligent peripheral 40 with speech recognition functionality captures analog voice signals of the subscriber and converts the voice signals to digital data, which may be stored in relation to the subscriber's account. The data is segmented, or arranged into recognizable patterns, and compared to previously stored models of words to be recognized. The speech recognition functionality may include multiple languages, including English, Spanish and French.

The segmentation of data may be based on any number of conventional speech recognition techniques. For example, the data may be segmented into phonemes, which are basic sounds or units of speech, and compared to phonetic models to build and identify words. The phoneme based speech recognition may enable identification of continuous or fluent speech from the subscriber. Alternatively, the speech data may be segmented by timing to search for and match previously identified anticipated responses, such as simple words and phrases, including numbers, letters of the alphabet and predetermined command words, such as ON, OFF and the days of the week. The present invention may incorporate any level of speech recognition and associated vocabulary capable of handling basic IVR interactions between the subscriber and the AIN services.

Furthermore, the intelligent peripheral 40 may confirm subscriber responses that result in a low level of confidence in the speech recognition. In other words, the processed subscriber data may be converted into synthesized speech, generated at the intelligent peripheral 40 and transmitted to the subscriber for confirmation. For example, after requesting and receiving the numbers of the subscriber's PIN, the intelligent peripheral 40 generates a prompt asking, "You said that your PIN was '1234.' Please say 'yes' if this is correct and 'no' if this it is not correct."

When the intelligent peripheral 40 includes speech recognition capability, the subscriber is further able access the PCM and related services from a non-DTMF telephone, as well. Also, even when using a DTMF telephone, the subscriber may choose to verbally interact with the intelligent peripheral 40, avoiding having to tediously input touch tones from the telephone keypad and saving time and effort, which is especially advantageous when long series of numbers, such as account numbers or PINs, are involved. In an embodiment of the invention, Nuance Verifier 3.0 software may be incorporated in the intelligent peripheral 40 to further enable verification based on the caller's voice print, enabling efficient authentication, in addition to convenient speech interaction.

Figure 8:
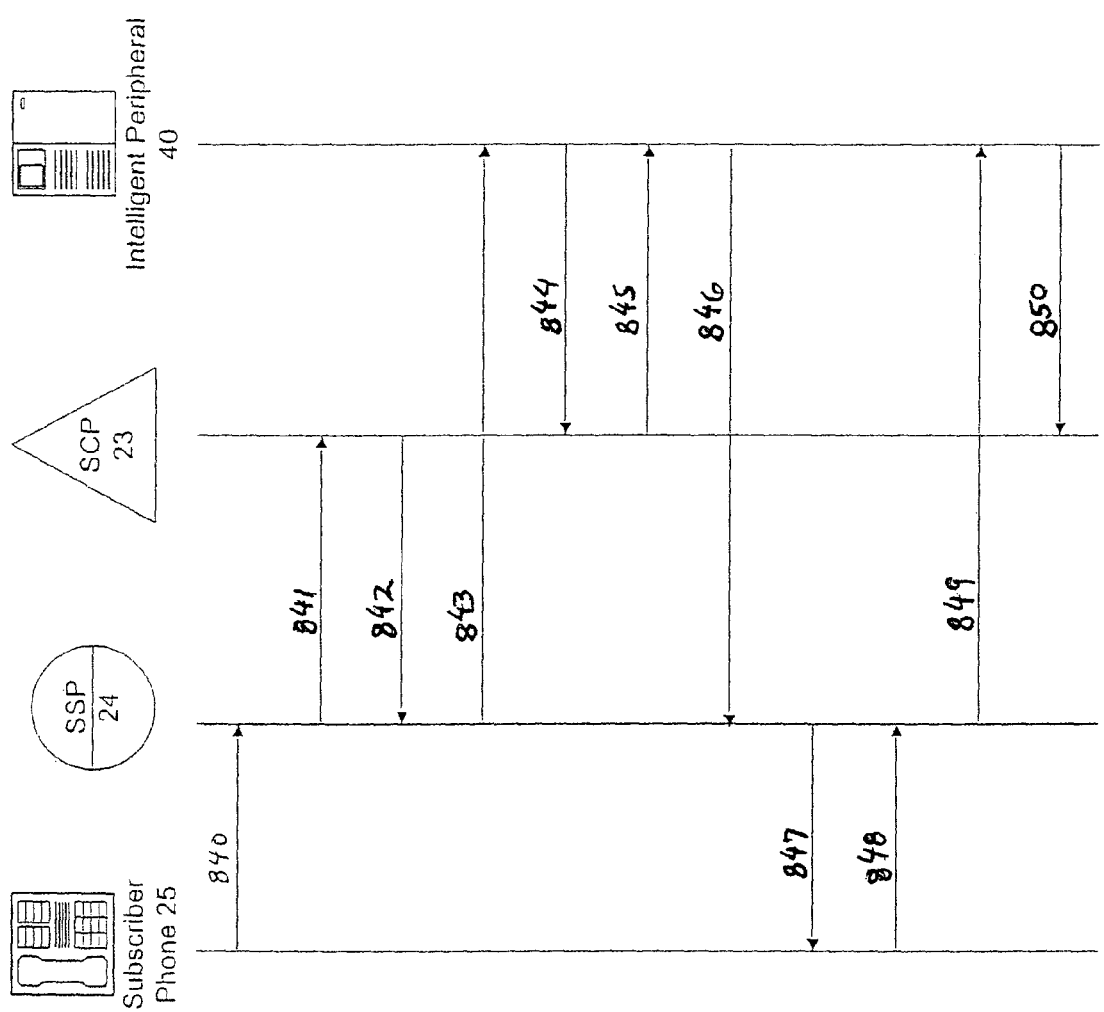
FIG. 8 is a call flow diagram illustrating subscriber requests for information from the PCM system using voice recognition, according to an aspect of the present invention.

When the subscriber wishes to review or edit call service data using speech recognition, the subscriber dials a toll-free number, e.g., an 800 number or local service provider number to access the IVR 45 of the intelligent peripheral 40, as described above. Referring to FIG. 8, the SSP 24 receives the dialed number from the subscriber telephone 25 at step 840 (assuming the subscriber calls from the subscriber telephone 25). The SSP 24 suspends the call and queries the SCP 23 at step 841 based, for example, on the calling party number and/or the dialed number. In response, the SCP 23 instructs the SSP 24 at step 842 to connect with the intelligent peripheral 40 temporarily to enable the speech recognition functionality of the intelligent peripheral 40.

At step 843, the SSP 24 establishes the temporary connection to the intelligent peripheral 40 using GR-1129 protocol, without actually routing the call to the intelligent peripheral 40. The SSP 24 continues to suspend the call and establishes a voice connection with the intelligent peripheral 40, through a second switch, if necessary, based signaling instructions sent through the PSTN, such as a signaling system 7 (SS7) system or comparable out-of-band signaling capability. The temporary connection enables the intelligent peripheral 40 to perform the speech prompting and recognition function, determine whether further call processing is required (or available) and return control of the call to the SSP 24 without having to place an outbound call or remain in the circuit.

The substance of the voice interaction is dictated by the call service data in the subscriber's PCM account, as well as any related call services implemented independently or through the PCM service, as discussed below. When the call service data is stored in the SCP 23, the intelligent peripheral 40 retrieves the status and service information from the SCP 23 using SR-3511 at steps 844 and 845. In an alternative embodiment, the intelligent peripheral 40 may receive the call service data from the SCP 23 through a common object request broker architecture (CORBA) or a transmission control protocol/Internet protocol (TCP/IP) interface. The intelligent peripheral 40 may alternatively retrieve the call service data from an external database, such as the service status database 41. The SCP 23 is likewise able to retrieve data from the intelligent peripheral, or an external database related to the AIN service, through a generic data interface (GDI) server, for example, invoked by a GetData command.

Based on the status and call service data, the intelligent peripheral 40 plays announcements to the subscriber through the SSP 24 at steps 846 and 847. The subscriber's voice responses are received by the intelligent peripheral 40 through the SSP 24 at steps 848 and 849. The communications between the SSP 24 and the intelligent peripheral 40 incorporate GR-1129 protocol throughout the transaction. Changes made by the subscriber to the status and call service data through the speech recognition functionality are subsequently stored in the respective database, e.g., the SCP 23, at step 850 for immediate implementation after being stored.

In an embodiment of the invention requiring authentication data, the intelligent peripheral 40 may initiate communication with the subscriber prior to retrieving status and service information from the SCP 23 at steps 844 and 845. Alternatively, when authentication data is stored at a database other than the SCP 23 (e.g., the ASI server 42), the intelligent peripheral 40 perform additional steps to retrieve the authentication data and query the subscriber through the SSP 24, accordingly.

Figure 9:
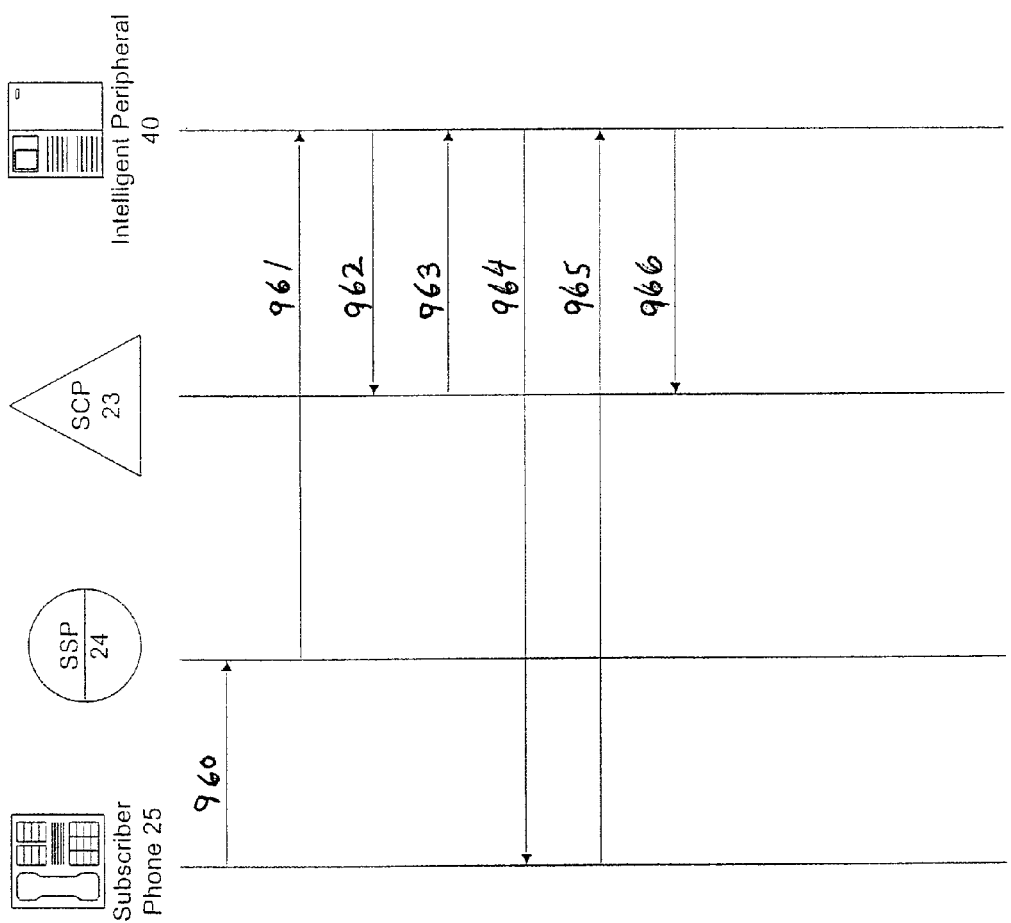
FIG. 9 is a call flow diagram illustrating subscriber requests for information from the PCM system using voice recognition, according to an alternative embodiment of the present invention.

FIG. 9 depicts another embodiment of the invention involving speech recognition. The subscriber dials the toll-free number or star code to access the IVR 45 of the intelligent peripheral 40, as described above. At step 960, the SSP 24 receives the dialed number from the subscriber telephone 25 (assuming the subscriber calls from the subscriber telephone 25). The SSP 24 routes the subscriber's call to the intelligent peripheral 40 at step 961, either through normal translations or based on instructions from the SCP 23 in response to a query from the SSP 24 (not pictured). The intelligent peripheral 40 then directly interacts with the subscriber, playing announcements and receiving voice responses. In particular, when the call service data is stored in the SCP 23, the intelligent peripheral 40 retrieves the status and service information from the SCP 23 using SR-3511, CORBA or TCP/IP at steps 962 and 963, in the same manner discussed above. Based on the status and call service data, the intelligent peripheral 40 plays announcements to the subscriber at step 964 and receives the subscriber's voice responses at step 965. Changes made by the subscriber to the status and call service data through the speech recognition functionality are subsequently stored in the respective database, e.g., the SCP 23, at step 966 for immediate implementation upon being stored.

The call services implemented through the PCM service may include IVR interaction with an outside party caller, such as call monitoring, Flexible Call Forwarding and Intelligent Call Forwarding, discussed below. The IVR interaction with the caller may likewise include speech recognition. When speech recognition is involved, the subscriber or the outside caller may interact with the intelligent peripheral 40 in the same manner indicated in FIG. 8 or FIG. 9.

For example, when the caller initiates a call from the outside party telephone 20 to the subscriber telephone 25, the SSP 24 is the terminating switch. Consistent with FIG. 8, the SSP 24 queries the SCP 23 which identifies the particular calling service to be invoked. In response to the call, the SCP 23 instructs the SSP 24 to connect the caller to the intelligent peripheral 40 temporarily to enable the speech recognition. While the call is suspended at the SSP 24, the intelligent peripheral 40 communicates with the caller through the SSP 24 using GR-1129 protocol to enable announcements to be played and voice responses to be received from the caller and interpreted by the intelligent peripheral 40. For example, when the AIN service involves entering a PIN to bypass a call blocking function, such as the call monitoring service discussed below, the intelligent peripheral 40 requests the bypass PIN, which may be spoken by the caller at the outside party telephone 20. The intelligent peripheral 40 receives the spoken response, translates the response to digital data, identifies the words (e.g., a series of numbers), and determines whether the words match the bypass PIN data stored in relation to the subscriber's account. When the bypass PIN is positively identified, the intelligent peripheral 40 instructs the SSP 24 to terminate the suspended call to the subscriber telephone 25. The intelligent peripheral 40 is accordingly disconnected.

Alternatively, the SCP 23 may instruct the SSP 24 to route the call to the intelligent peripheral 40. Consistent with FIG. 9, the intelligent peripheral 40 then directly interacts with the caller, playing announcements and receiving voice responses. The intelligent peripheral 40 may subsequently route the call (if necessary) to the SSP 24 for connection using a two B-channel transfer, a release link transfer, a tied-up connection, or the like. Any caller data received through the speech recognition functionality that must be stored (e.g., data enabling customized reports, such as call detail records) is stored in the applicable database (e.g., the SCP 23), as discussed above.

Figure 10:
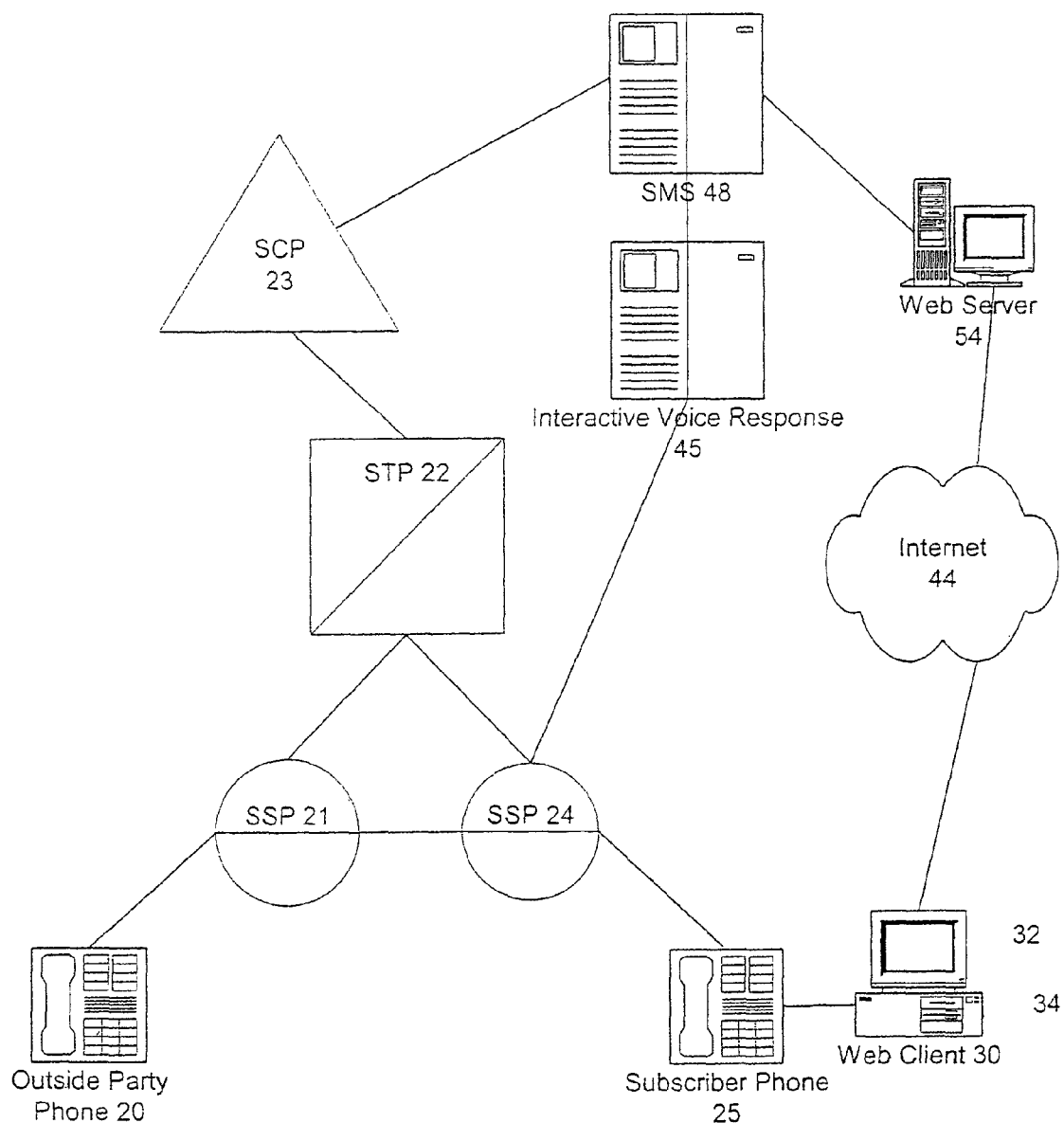
FIG. 10 is a block diagram showing an alternative exemplary PCM telecommunications network, according to an aspect of the present invention.

FIG. 10 depicts an alternative embodiment of the invention in which a service management system (SMS) 48 serves as the interface between the web server 54 and the SCP 23, as opposed to the intelligent peripheral 40. The SMS 48 is capable of transmitting and receiving information to and from the SCP 23. The SMS 48 also enables the subscriber to interface with the SCP 23 from both the subscriber phone 25 (or other DTMF telephone) through the IVR 45 and from the web client 30 (or other Internet compatible device) through the web server 54, via the Internet 44. Because an intelligent peripheral 40 is not necessary, an independent IVR 45 may be included in the network. For example, the IVR 45, available under the trademark CONVERSANT System for IVR, Version 6.0, Update 1, provided by Lucent Technologies, Inc., may be used. Although not pictured in FIG. 10, the network may further include an external database connected to the SMS 48, such as the service status database 41, and a separate authentication platform, such as the ASI server 42.

The PCM service implemented with the SMS 48 functions in a similar manner as described in FIGS. 2 and 3 with respect to the intelligent peripheral 40 and is discussed in detail below with respect to specific AIN based call control services. Generally, the SMS 48 receives data regarding the PCM service from the SCP 23 and sends the data to the web server 54, which causes the data to be displayed at the web client 30. In turn, changes to the PCM service are forwarded from the web client 30, through the web server 54, to the SMS 48, which stores the data and updates the SCP 23 in near real-time. The SCP 23 immediately implements the modified PCM service.

Call Monitoring

Call monitoring is an AIN based service that allows a subscriber connected to a communications network, including the Internet and other packet switched type data networks, as well as through conventional IVR and/or intelligent peripheral systems, to customize and execute restrictions on incoming and outgoing telephone calls for a service subscriber. Call monitoring may be implemented as an independent service or part of a PCM portfolio of AIN services. FIG. 10 illustrates an exemplary telecommunications network in association with the call monitoring service.

The call monitoring service includes numerous features in various embodiments of the invention. For example, the subscriber may turn the call monitoring service ON or OFF, create a time of day, day of week schedule for restricting telephone calls, create and maintain lists of restricted telephone numbers (and groups of telephone numbers) for incoming and/or outgoing calls, and create and maintain lists of priority telephone numbers (and groups of telephone numbers) that are not subject to restriction regardless of other time or telephone number related restrictions. The subscriber may bypass any restrictions by entering a blocking override PIN, enabling the call to process normally. The subscriber may also receive visually formatted reports and verbally formatted reports regarding blocked incoming and outgoing calls via the Internet 44 and the IVR 45, respectively. The reports may be customized to the subscriber's specifications. The SMS 48 stores and distributes subscriber specific data relating to the call monitoring service, including account numbers, PIN numbers, call specific data and subscriber report information. The restricted call data may be monitored in near real-time by the subscriber at the GUI 32 via the Internet 44.

The service enables the subscriber, when connected to a communications network, including the Internet and other packet switched type data networks, or to a conventional IVR system or SN/IP, to customize aspects of the call monitoring service, with near real-time access to the service data. For example, the call monitoring service relates to providing call detail records, in near real-time, that can be downloaded from a web-site related to the call monitoring service. The web site also provides a tool for implementing and editing the various restrictions, including for example, lists of restricted and priority telephone numbers, as well as activation/deactivation schedules.

With respect to restricted telephone numbers, the call monitoring service receives restricted call data from the subscriber, identifies incoming and outgoing calls by calling party number and called party number, and terminates restricted calls according to the subscriber's restricted call data. The restricted call data includes, for example, restrictions on calls to and from selected telephone numbers, or groups of telephone numbers. For example, the restrictions include specific telephone numbers of parties from which the subscriber does not wish to receive call, such as harassing callers and telemarketers. Additionally, the subscriber may likewise restrict outgoing calls to specific telephone numbers, or groups of telephone numbers, such as "900" numbers or long distance numbers, generally. The calling restriction data may also include time of day, day of week applicability. For example, the subscriber may specify that no calls are to be received after a certain time, e.g., 10 p.m., on weekdays. Significantly, the subscriber retains the ability to override the incoming and outgoing call restrictions, on a call-by-call basis, by entering a PIN.

The subscriber may also create a list of priority numbers, which includes telephone numbers that are not affected by the incoming or outgoing call restrictions, without requiring a blocking override PIN. For example, an outgoing call restriction that disables all calls from the subscriber's telephone after 10:00 p.m. would have as an exception calls to a pre-designated telephone number (i.e., a priority number) of a close relative, thus enabling outgoing calls to that number after 10:00 p.m., without the extra step of entering the blocking override PIN. The call monitoring service also allows calls from the subscriber telephone to "escape" numbers, such as 911 and local fire and police departments, even during periods of call restriction, without the subscriber specifically identifying the escape numbers as priority numbers.

As stated above, the subscriber interactively accesses the call monitoring service by either of two methods. First, the subscriber may dial a toll-free number, e.g., an 800 number or local service provider number, to access the IVR 45. The subscriber is prompted to enter an account number, along with a password or PIN (which may or may not be the same as the blocking override PIN), further discussed below. The subscriber then has the ability to change any PINs (including the account access PIN and the blocking override PIN), toggle the service ON and OFF and create, edit, activate or deactivate restriction lists, the priority lists and schedules. The subscriber may provide the information requested by the voice prompts of the IVR 45 by using the touch tones of a DTMF telephone key pad or, when the IVR 45 is included in a SN/IP having speech recognition functionality, as discussed above, by simply speaking into the receiver. Second, the subscriber has the option to access the call monitoring service using the GUI 32 via the Internet 44. With the GUI 32, the subscriber is able to implement all of the IVR functions identified above, as well as customize reports and report formats, and monitor the service in near real-time.

Figure 11:
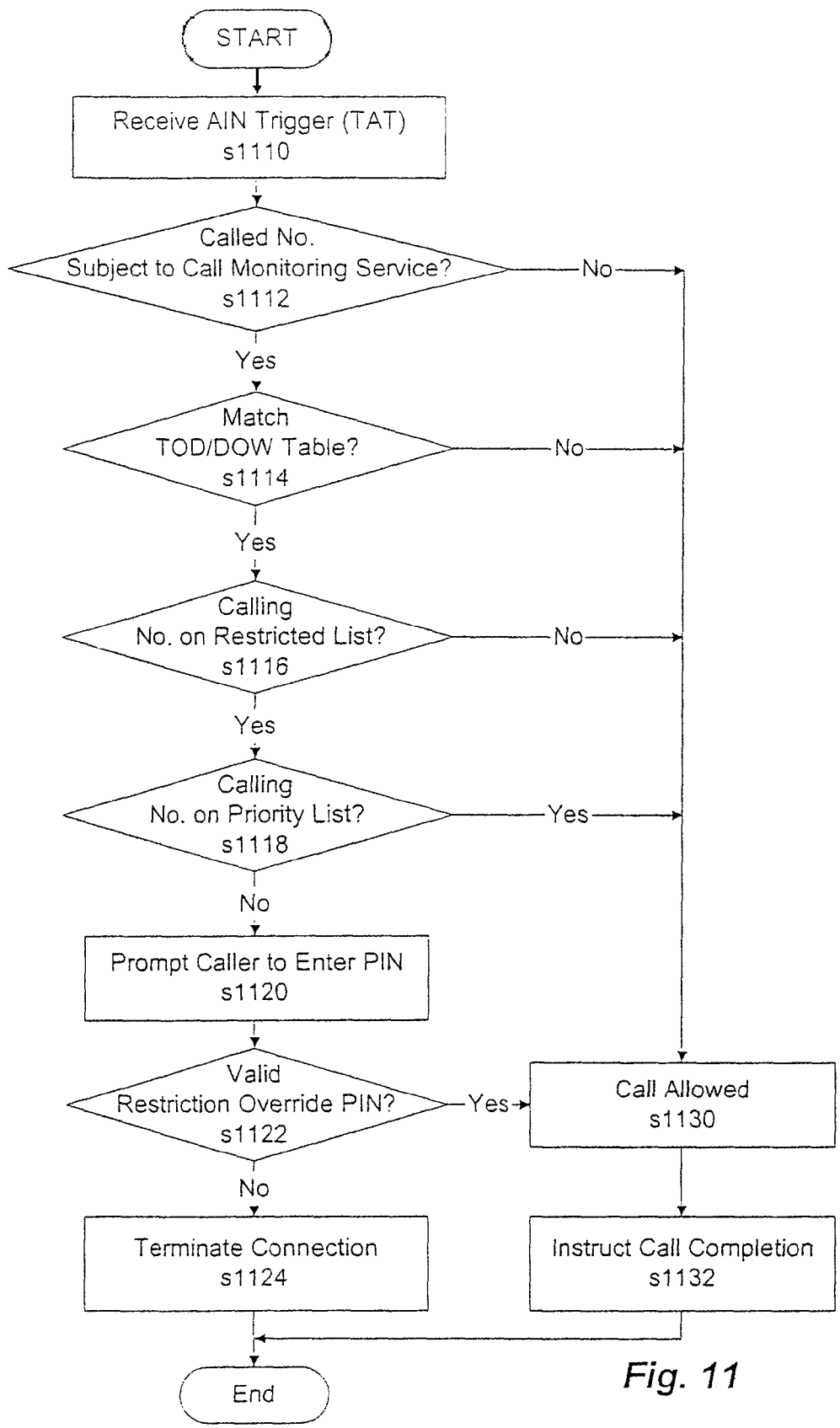
FIG. 11 is a flowchart of exemplary SCP service logic for a call monitoring service, according to an aspect of the present invention.

FIG. 11 is an exemplary flow diagram depicting implementation of the call monitoring service with respect to incoming calls, according to the service logic of the SCP 23, in one embodiment of the invention. The call originates from the outside party telephone 20, and is connected to the terminating SSP 24 through the originating SSP 21, by known processes. At step s1110, the SCP 23 receives a standard AIN prompt from the terminating SSP 24, notifying the SCP 23 of the attempted termination of the call to the subscriber telephone 25. The AIN prompt includes at least the calling party number and the called party number, which correlate to the telephone numbers of the outside party telephone 20 and the subscriber telephone 25, respectively. The AIN prompt, which initiates the call monitoring service logic at the SCP 23, may be, for example, a terminating attempt trigger (TAT). As the SCP 23 begins to process the service logic in response to the trigger, the call is suspended at the terminating SSP 24.

Based on the called party number in the AIN prompt, the SCP 23 determines at step s1112 whether the subscriber telephone 25 subscribes to the call monitoring service using, for example, an internal look-up table that associates telephone numbers with AIN services. When the SCP 23 determines that the called party number does not participate in the call monitoring service, the call is allowed at step s1130. The SCP 23 accordingly instructs the SSP 24 to complete the call at step s1132. Of course, the call is subject to any other AIN services associated with the subscriber telephone 25 and outside party telephone 20, as determined by the SCP 23, prior to instruction to complete the call.

When the subscriber telephone 25 is determined to correspond to a call monitoring service subscription, the SCP 23 determines at step s1114 whether the call blocking feature of the call monitoring service is active, according to a schedule previously established by the subscriber. The SCP 23 may also determine whether the call monitoring service itself is ON or OFF (not pictured). When the service is OFF, the call is allowed to complete at steps s1130 and s1132.

In an embodiment of the invention, the schedule is a time of day, day of week table stored at the SCP 23. At step s1114, the SCP 23 determines whether there is a match in the time of day, day of week table, based on the time and date of the call. The time of day, day of week schedule includes a table of at least one date and time period, during which the call blocking feature of the call monitoring service is active. During the date and time period, it is assumed that the SCP 23 has been instructed to block all incoming calls to the subscriber telephone 25, except those on the priority list, discussed below. The date and time information of the schedule is provided by the subscriber to the service provider any number of ways, including contacting a customer service representative of the service provider by telephone or interfacing with the SCP 23 by way of the SMS 48, using the Internet 44 or the IVR 45, as discussed below.

When there is not a match in the time of day, day of week table, the SCP 23 determines that the call blocking feature is not active. Therefore, all incoming calls are allowed at step s1130. The SCP 23 instructs the SSP 24 to connect the call to the subscriber telephone 25 at step s1132. When there is a match in the time of day, day of week table, the SCP 23 accesses any restriction list identified in the table. At step s1116, the SCP 23 determines whether the calling party number is specifically identified as an incoming restricted number based on an incoming restriction list. Incoming restricted numbers include specific telephone numbers, calls from which the subscriber wishes to avoid receiving during the time period specified in the schedule. The numbers are stored, for example, in an incoming restriction table in the SCP 23. Incoming restricted numbers also include groups of telephone numbers, such as "out of area" numbers or numbers from a particular area code, that the subscriber wishes to avoid receiving. The incoming restricted numbers are provided to the SCP 23 through any number of avenues, including communication through customer service representatives of the service provider or through the SMS 48, via the Internet 44 or the IVR 45, as discussed below.

When the SCP 23 identifies the calling party number as an incoming restricted number, the SCP 23 determines at step s118 whether the calling party number has been previously identified by the subscriber as an incoming priority number, i.e., a number that is always permitted to be connected to the subscriber telephone 25 regardless of whether the call blocking feature is active. For example, an incoming priority number is permitted to connect even when the subscriber designates that all incoming calls are to be blocked during a particular time period. The SCP 23 compares the calling party number to an incoming priority list, which may be stored in a table at the SCP 23 and associated with the subscriber's call monitoring service account. The incoming priority list is pre-established by the subscriber and includes important telephone numbers, from which incoming calls are never blocked. For example, a subscriber, who has the call monitoring service for his residence, may include a work telephone number on the incoming priority list. Then, regardless of the time of day or the day of week, calls from the office telephone will not be blocked. The SCP 23 determines that the call is allowed at step s1130 and the call is completed by the terminating SSP 24 at step s1132.

When the calling party number is not on the incoming priority list, the SCP 23 instructs the SSP 24 at step s1120 to play an announcement advising the calling party that the call monitoring service has blocked the call and providing various options to the calling party, including the option to enter a blocking override PIN to bypass the call blocking feature of the service. For example, in an embodiment of the invention that includes forwarding blocked calls to a voice mail service, the announcement queries the caller: "Please press the pound key followed by your PIN to bypass call blocking; otherwise, please leave a message after the tone."

At step s1122 the SCP 23 determines whether it has received a valid blocking override PIN associated with the subscriber account. If no PIN is received, or if an invalid PIN is received, the call is terminated at step s1124. In an alternative embodiment of the invention, the SCP 23 may instruct the SSP 24 to play a second announcement whenever an invalid PIN is received, advising the caller that the PIN is not valid and to please try again. The call is then terminated at step s1124 only after the second attempt to enter a valid blocking override PIN has failed. Whenever a valid blocking override PIN is received by the SCP 23 via the SSP 24, the call is allowed at step s1130 and the SCP 23 instructs the SSP 24 to connect the calling party to the subscriber telephone 25 at step s1132.

In an alternative embodiment of the invention, the PIN announcement is played by a platform other than the SSP 24, such as a SN/IP. In this embodiment, the SCP 23 instructs the SSP 24 to forward the incoming call to the SN/IP, which plays the PIN announcement, receives the caller's digital response and determines whether the entered number matches the blocking override PIN. When the SN/IP determines that the number matches the blocking override PIN, the call is returned to the SSP 24, which is then instructed by the SCP 23 to connect the call to the subscriber telephone 25.

Figure 12:
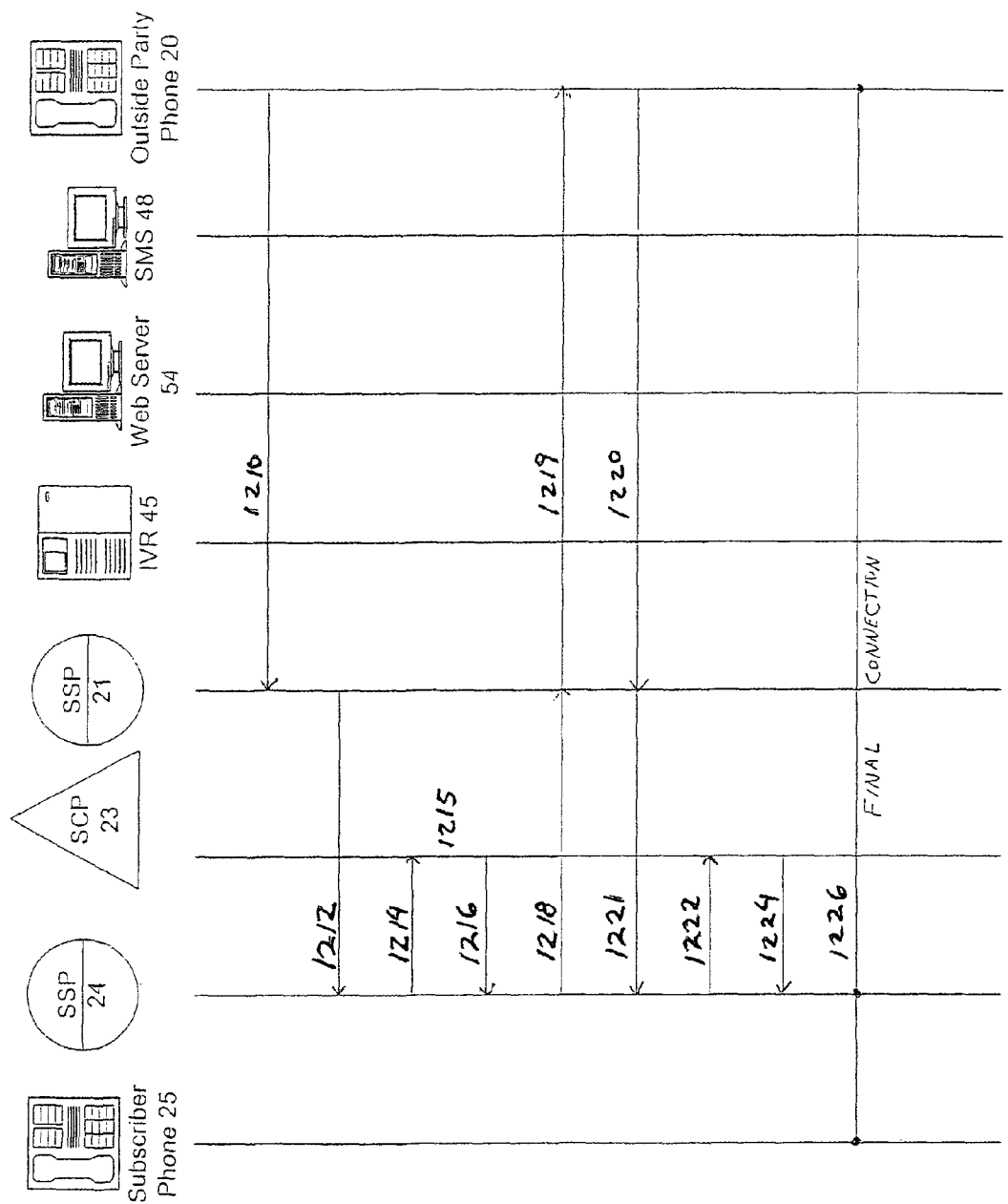
FIG. 12 is an exemplary call monitoring service call flow diagram showing routing of a telephone call incoming to a subscriber's telephone, according to an aspect of the present invention.

FIG. 12 is a call flow diagram depicting an exemplary implementation of the call monitoring service based on an incoming call initiated by a calling party from the outside party telephone 20 to the subscriber telephone 25. In particular, FIG. 12 depicts an exemplary situation in which the attempted telephone call is rejected by the SCP 23, based on a match with the time of day, day of week schedule and the calling party number being an incoming restricted number (e.g., steps s1114-s1116 of FIG. 11), and in which the calling party (e.g., the subscriber) bypasses the call blocking feature implemented by the call monitoring service by entering a blocking override PIN.

In particular, the calling party initiates the call from the outside party telephone 20, connecting to the originating SSP 21 by going off-hook at step 1210. Upon receiving a dial tone, the calling party dials the digits of the called party number, which is the telephone number of the subscriber telephone 25. In response to the dialed digits, the SSP 21 routes the call to the terminating SSP 24 at step 1212, either directly, as shown in FIG. 12, or via any number of intervening switches. The SSP 24 launches a TAT trigger, which includes at least the calling party number and the called party number, via the SS7 network and the appropriate STP 22 (not pictured in FIG. 12) to the subscriber's serving SCP 23 at step 1214.

At step 1215, the SCP 23 executes the SCP service logic depicted, for example, by the flow diagram of FIG. 11. Accordingly, the SCP 23 determines whether the subscriber telephone 25 is associated with the call monitoring service, whether the call blocking feature of the service is active according to the time of day, day of week schedule, whether the calling party number is on the incoming restriction list and whether the calling party number is on the incoming priority list. FIG. 12 depicts the process whenever the SCP 23 determines at step 1215 that the time of day, day of week schedule indicates that the call blocking feature is currently active and that the calling party number is on the incoming restriction list, but not on the incoming priority list. In other words, the call is blocked. Whenever the call is blocked, the SCP 23 stores the associated call data, including the calling party number, the called party number and the date and time of the call. In an alternative embodiment of the invention, the call data is stored in an external database, which reduces the data storage burden on the SCP 23.

Therefore, at step 1216, the SCP 23 instructs the SSP 24 to play an announcement (via the SSP 21) denying the connection and requesting entry of a blocking override PIN, as indicated by steps 1218 and 1219. The calling party receives the announcement and enters a four digit PIN, for example, using the push-button keys of the outside party telephone 20. The numbers are received by the SSP 24 via the SSP 21 at steps 1220 and 1221, and forwarded to the SCP 23 at step 1222. The SCP 23 compares the numbers entered at the outside party telephone 20 with the previously established blocking override PIN, stored in the SCP 23 in association with the subscriber's call monitoring service account. When the SCP 23 determines that the entered numbers match the stored blocking override PIN, it instructs the SSP 24 at step 1224 to complete the telephone call. The result is the connection shown in step 1226 between the outside party telephone 20 and the subscriber telephone 25, via the originating SSP 21 and the terminating SSP 24.

FIGS. 11 and 12 depict exemplary embodiments of the invention in which calls are placed from the outside party telephone 20 to the subscriber telephone 25 (i.e., incoming calls), which is associated with the call monitoring service. In contrast, FIGS. 13 and 14 depict exemplary embodiments of the invention in which calls are placed from the subscriber telephone 25 to the outside party telephone 20 (i.e., outgoing calls), which incorporates a similar process.

Figure 13:
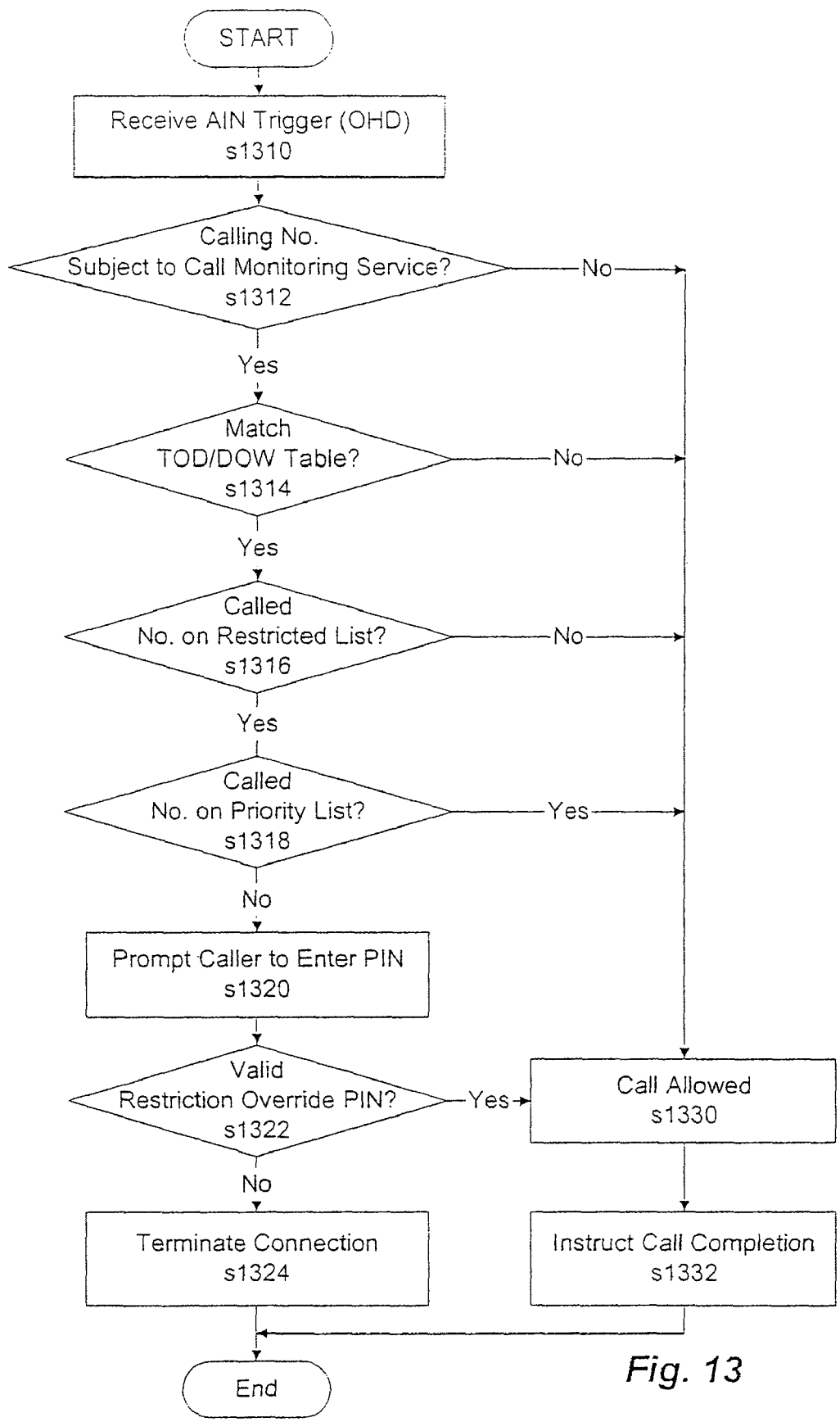
FIG. 13 is a flowchart of exemplary SCP service logic for the call monitoring service, according to an aspect of the present invention.
Figure 14:
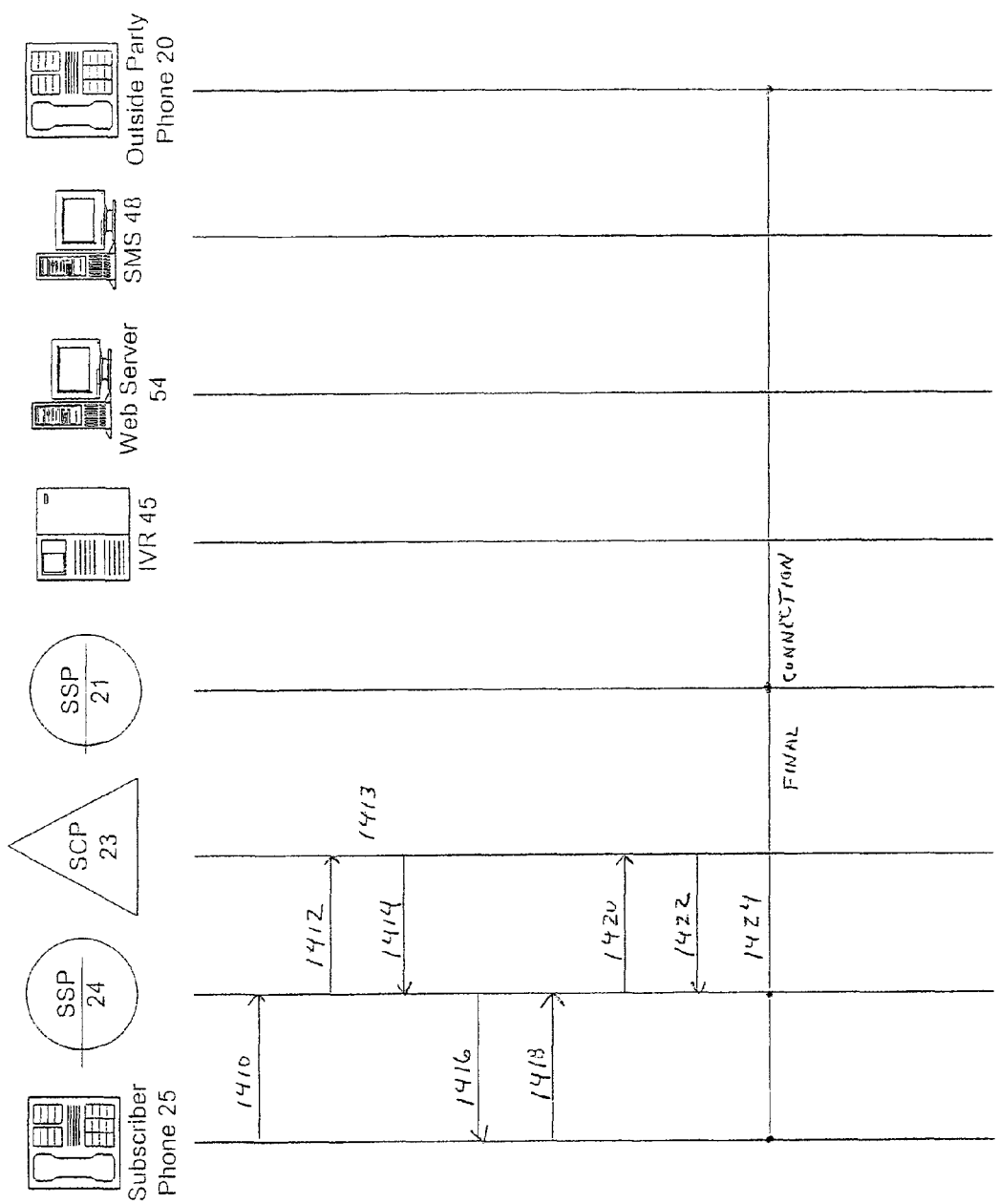
FIG. 14 is an exemplary call monitoring service call flow diagram showing routing of a telephone call outgoing from a subscriber's telephone, according to an aspect of the present invention.

FIG. 13 is an exemplary flow diagram depicting implementation of the call monitoring service with respect to outgoing calls, according to the service logic of the SCP 23. The call originates at the subscriber telephone 25, and is connected to the outside party telephone 20 via the originating SSP 24 and the terminating SSP 21, by known processes. At step s1310, the SCP 23 receives a standard AIN prompt from the originating SSP 24, notifying the SCP 23 that the subscriber telephone 25 has gone off-hook and numbers have been dialed. In an embodiment of the invention, the AIN prompt is the off-hook delay (OHD) trigger and includes at least the calling party number and the called party number, which correlate to the telephone numbers of the subscriber telephone number 25 and the outside party telephone 20, respectively. As the SCP 23 processes the service logic in response to the trigger, the call is suspended at the originating SSP 24.

Based on the calling party number provided by the OHD trigger, the SCP 23 determines at step s1312 whether the subscriber telephone 25 subscribes to the call monitoring service using, for example, an internal look-up table that associates telephone numbers with AIN services. When the SCP 23 determines that the calling party number is not included among the call monitoring service accounts, the call is allowed at step s1330. The SCP 23 accordingly instructs the SSP 24 to complete the call at step s1332. Of course, the call is subject to any other AIN services associated with the subscriber telephone 25 and the outside party telephone 20, as determined by the SCP 23, prior to instruction to complete the call.

When the subscriber telephone 25 is determined to be associated with the call monitoring service, and the call monitoring service is determined to be ON (not pictured), the SCP 23 determines whether the call blocking feature of the call monitoring service is active, according to a schedule previously established by the subscriber. In an embodiment, the schedule is a time of day, day of week table stored at the SCP 23. The schedule includes activation and deactivation times and dates for both incoming and outgoing call blocking, as well as outgoing restricted numbers and outgoing priority numbers associated with the activation periods. In an alternative embodiment of the invention, the subscriber is provided a dedicated schedule for incoming calls and a different schedule for outgoing calls. Separate schedules enable the subscriber to more particularly tailor the call monitoring service. For example, the subscriber may desire to restrict all incoming calls after 9:00 p.m. (other than priority calls) to avoid being disturbed at home in the evening; however, the subscriber may also desire to freely place outgoing calls during the same time period without having to enter the call blocking override PIN each time.

At step s1314, the SCP 23 determines whether there is a match in the time of day, day of week table, based on the time and date of the call. As described above with respect to step s1114 of FIG. 11, the time of day, day of week schedules includes a table of at least one date and time period, during which the call blocking feature of the call monitoring service is active. During the specified date and time period, the SCP 23 blocks all outgoing calls from the subscriber telephone 25, unless otherwise specified, except calls to numbers on the outgoing priority list, discussed below. Alternatively, the caller may provide a list of specific telephone numbers to which outgoing calls are blocked, as discussed below. The date and time information is provided to the SCP 23 through any number of avenues, including through a customer service representative of the service provider or through the SMS 48, via the Internet 44 or the IVR 45, as discussed below.

When there is not a match in the time of day, day of week table, the SCP 23 determines that the call blocking feature of the call monitoring service is not active. Therefore, all outgoing calls are allowed at step s1330. The SCP 23 accordingly instructs the SSP 24 to connect the call from the subscriber telephone 25 at step s1332, subject to any additional AIN services associated with the calling party number and the called party number.

When there is a match in the time of day, day of week table, the SCP 23 determines whether the called party number (i.e., the telephone number of the outside party telephone 20) is specifically identified as an outgoing restricted number by consulting the outgoing restriction list at step s1316. The outgoing restriction list may include any telephone number or group of telephone numbers to which the subscriber wants to prevent outgoing calls during the identified time period. For example, the subscriber may include specific telephone numbers, which are stored, for example, in an outgoing restriction table in the SCP 23. Alternatively, the subscriber may identify types of telephone numbers, such as 900 numbers or numbers to a particular area code, that the subscriber wishes to prevent. The subscriber, however, is not able to include in the outgoing restriction list any designated escape numbers, such as 911, the local police department and fire departments and other emergency numbers identified by the service provider. The outgoing restriction list is stored at the SCP 23. The outgoing restricted numbers are provided to the SCP 23 through any number of avenues, including through a customer service representative of the service provider or through the SMS 48, via the Internet 44 or the IVR 45, as discussed below.

In an embodiment of the invention, the subscriber may build multiple outgoing restriction lists, as well as incoming restriction lists, and identify them numerically, for example. The subscriber may then selectively specify activation and deactivation of different outgoing and/or incoming restriction lists in conjunction with pre-scheduled dates and times, stored in the time of day, day of week table at the SCP 23. Alternatively, the subscriber may identify a master outgoing restriction list, which includes numbers previously identified by the subscriber as those numbers that are blocked regardless of times and dates provided in the time of day, day of week scheduler.

In another embodiment, the outgoing restriction list and the incoming restriction list are the same list (e.g., stored in a single table), thereby reducing the amount of memory occupied in the SCP 23. The limitations of a single restriction list may have little practical effect because subscribers would likely not want incoming calls from telephone numbers which have been blocked for outgoing calls.

When the SCP 23 determines that the called party number is not an outgoing restricted number, the outgoing call is allowed at step s1330. The SCP 23 accordingly instructs the SSP 24 to connect the call from the subscriber telephone 25 at step s1332. When the SCP 23 identifies the called party number as an outgoing restricted number, the SCP 23 determines whether the called party number has been previously identified by the subscriber as a priority number, i.e., a number that is always permitted to be connected from the subscriber telephone regardless of whether the call blocking service is active for all other outgoing numbers. The SCP 23 compares the called party number to an outgoing priority list at step s1318, which may be a table stored at the SCP 23 and associated with the subscriber. When the SCP 23 determines that the called party number is on the outgoing priority list, the call is allowed at step s1330 and the call is completed by the terminating SSP 21 at step s1332.

The outgoing priority list is previously established by the subscriber and includes important telephone numbers to which outgoing calls are never blocked. For example, a subscriber, who has the call monitoring service for his residence, may identify a work telephone number to be on the outgoing priority list. Then, regardless of the time of day or the day of week schedule and the scope of the outgoing restriction list, calls from the subscriber telephone 25 to the office telephone will not be blocked. Use of the outgoing priority list would be useful for assuring that the subscriber's children, for example, would always be able to contact the subscriber's work phone from the subscriber's home without having to enter a call blocking override PIN.

In an embodiment, the same priority list is used to test both outgoing and incoming calls. In an alternative embodiment of the invention, the subscriber has an incoming priority list and an outgoing priority list, which are populated separately by the subscriber. Also, as in the case of the outgoing and incoming restriction lists, the subscriber may build multiple outgoing and incoming priority lists and identify them numerically, for example. The subscriber may then selectively specify activation and deactivation of different outgoing and/or incoming priority lists in conjunction with pre-scheduled dates and times, stored in the time of day, day of week table at the SCP 23.

When the called party number is not on the outgoing priority list, the SCP 23 instructs the SSP 24, at step s1320, to play an announcement advising the calling party that the call monitoring service has blocked the call and providing an option for the calling party to enter a blocking override PIN at the subscriber telephone 25 to bypass the blocking feature. For example, in an embodiment of the invention, the announcement queries the caller: "Please press the pound key followed by your PIN to bypass call blocking; otherwise, please try again later."

At step s1322, the SCP 23 determines whether it has received a valid blocking override PIN associated with the subscriber account. If no PIN is received, or if an invalid PIN is received, the call is terminated at step s1324.

The blocking override PIN for outgoing calls may be the same blocking override PIN used to override call blocking of incoming telephone calls, which enables the subscriber to memorize only a single PIN to control the call monitoring service. Alternatively, separate blocking override PINs may be provided for overriding call blocking of incoming and outgoing calls, respectively. Separate PINs enable the subscriber to control more closely the call monitoring process. For example, when the subscriber is part of a family, the subscriber may want the children to have the PIN for overriding incoming call blocking. The children would therefore always be able to call home, regardless of the time of day or night, and regardless of the telephone number from which they are calling. However, the subscriber may not want the children to be able to override call blocking of outgoing calls, which ability may defeat the purpose of having the call monitoring service. Therefore, the subscriber would not inform the children of the blocking override PIN associated with overriding call blocking of outgoing calls.

In an alternative embodiment of the invention, the SCP 23 may instruct the SSP 24 to play a second announcement whenever an invalid PIN is received, advising the calling party that the entered number is not valid and to please try again. The call is then terminated at step s1324 only after the second attempt to enter a valid blocking override PIN has failed. Whenever a valid blocking override PIN is received by the SCP 23 via the SSP 24, the call is allowed at step s1330 and the SCP 23 instructs the SSP 24 to connect the calling party to the outside party telephone 20 at step s1332.

FIG. 14 is a call flow diagram depicting an exemplary implementation of the call monitoring service based on an outgoing call initiated by a calling party from the subscriber telephone 25 to the outside party telephone 20. In particular, FIG. 14 depicts an exemplary situation in which the attempted telephone call is rejected by the SCP 23, based on a match with the time of day, day of week schedule and the called party number being an outgoing restricted number (e.g., steps s1314-s1316 of FIG. 13), and the caller (e.g., the subscriber) bypasses the call blocking implemented by the call monitoring service by entering a blocking override PIN.

In particular, the calling party initiates the call from the subscriber telephone 25, connecting to the originating SSP 24 by going off-hook at step 1410. Upon receiving a dial tone, the calling party dials the digits of the called party number, which, in this example, is the telephone number of the outside party telephone 20. In response to the dialed digits, the SSP 24 suspends that call and launches an OHD trigger, which includes at least the calling party number and the called party number, via the SS7 network and the appropriate STP 22 (not pictured in FIG. 14) to the subscriber's serving SCP 23 at step 1412.

At step 1413, the SCP 23 executes the SCP service logic depicted, for example, by the flow diagram of FIG. 13. Accordingly, the SCP 23 determines whether the subscriber telephone 25 is associated with the call monitoring service, whether the call blocking feature of the service is active according to the time of day, day of week schedule, whether the called party number is on the outgoing restricted list and whether the called party number is on the priority list (thus enabling access regardless of the time of day, day of week and the scope of the outgoing restricted list). FIG. 14 depicts the process whenever the SCP 23 determines at step 1413 that the time of day, day of week schedule indicates that the call blocking feature is currently active and that the called party number is on the outgoing restriction list, but not on the outgoing priority list. In other words, the outgoing call is blocked. Whenever the call is blocked, the SCP 23 stores the associated call data, including the calling party number, the called party number and the date and time of the attempted call. In an alternative embodiment of the invention, the call data is stored in an external database, which reduces the data storage burden on the SCP 23.

At step 1414, the SCP 23 instructs the SSP 24 to play an announcement to the calling party at the subscriber telephone 25 denying the connection and requesting entry of a blocking override PIN, as indicated by step 1416. The calling party receives the announcement and enters a PIN, for example, using the push-button keys of the subscriber telephone 25. The blocking override PIN is received by SSP 24 at step 1418 and forwarded to the SCP 23 at step 1420. The SCP 23 compares the numbers entered at the subscriber telephone 25 with the previously established blocking override PIN, stored in the SCP 23 in association with the subscriber's call monitoring service account. When the SCP 23 determines that the entered numbers match the stored blocking override PIN, it instructs the SSP 24 at step 1422 to complete the telephone call. The result is the connection shown in step 1424 between the subscriber telephone 25 and the outside party telephone 20, via the originating SSP 24 and the terminating SSP 21.

Figure 15:
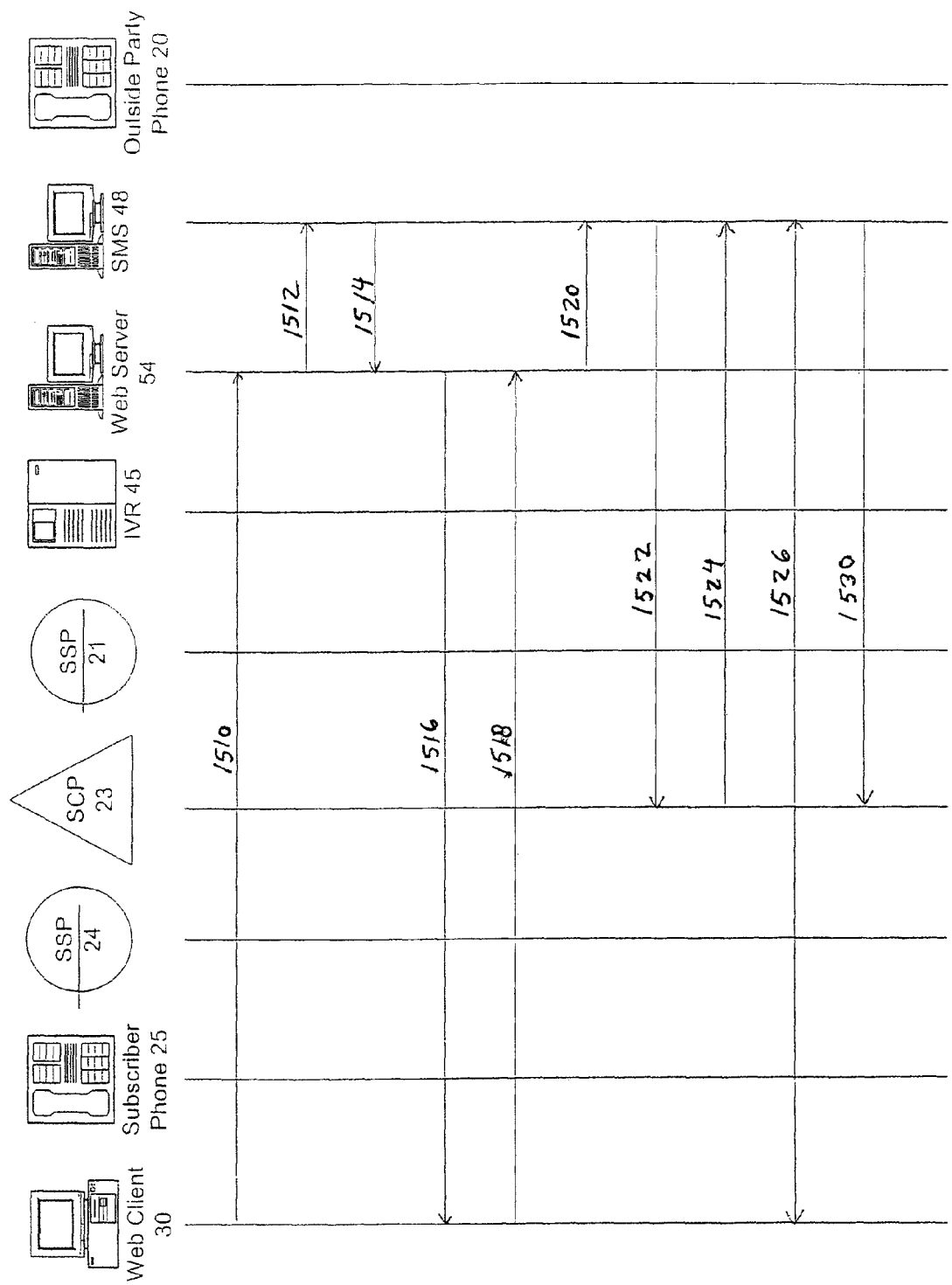
FIG. 15 is an exemplary call flow diagram in which the subscriber accesses the call monitoring service via the Internet, according to an aspect of the present invention.

As stated above, the call monitoring service enables interaction with the subscriber over the Internet 44 and the IVR 45. FIG. 15 is a call flow diagram depicting an exemplary interaction between the subscriber and the call monitoring service by accessing the SMS 48 over the Internet 44. The subscriber accesses a unique uniform resource locator (URL) associated with the service provider. The URL is an address that identifies the appropriate protocol for communicating with the service over the Internet 44. When the subscriber accesses the Internet 44, the web server 54 provides call monitoring service web screens, transmitted from the SMS 48, to be displayed at the GUI 32. Examples of the call monitoring service web screens are shown in FIGS. 16-21.

At step 1510 of FIG. 15, the subscriber connects from the web client 30 to the web server 54 through the Internet 44. The web server 54 then connects to the SMS 48, which stores and updates the call monitoring service data, as well as associated authentication data, at step 1512. Once connected to the SMS 48 via the web server 54, the subscriber must be authenticated to access the corresponding service account. The SMS 48 queries the subscriber for authentication data, which may include an account number and an associated account access PIN, via the web server 54, at steps 1514 and 1516. The account access PIN may be the same series of numbers as the blocking override PIN, which enables the subscriber to bypass the call blocking feature of the call monitoring service. Alternatively, the account access PIN and the blocking override PIN are different to ensure that other individuals who have access to the blocking override PIN are not able to access the account over the Internet 44 and change the various settings, including, for example, the account access PIN. The subscriber is able to interactively change all PIN numbers associated with the call monitoring service account over the Internet 44, as well as through the IVR 45 based on touch tone signals or speech recognition.

The subscriber authentication responses are received at the web server 54 at step 1518, and forwarded to the SMS 48 for authentication at step 1520. Alternatively, web server 54 may perform the authentication step based on information sent from SMS 48. The SMS 48 retrieves the account number and associated account access PIN to confirm that the subscriber is authorized to access the account information.

After a successful authentication, the SMS 48 queries the SCP 23 to retrieve the data associated with the subscriber's call monitoring service account at step 1522. The SCP 23 retrieves the subscriber's data, schedules, incoming and outgoing restriction lists and incoming and outgoing priority lists. The SCP 23 also retrieves the call data associated with the incoming and outgoing calls that were blocked. In an embodiment of the invention, the SMS 48 maintains a database of all of the call monitoring service data related to each subscriber, and merely updates the data from the SCP 23 during each interaction. Alternatively, the SCP 23 periodically transmits all call monitoring service data related to each subscriber regardless of whether the subscribers have actually requested their respective account data from the SMS 48. The SMS 48 would then be able to provide the subscriber with relatively recent data without performing steps 1522 and 1524, which saves additional processing by the SCP 23. Steps 1522 and 1524 would be performed only when the subscriber specifically requests the most recent data or real-time interaction, discussed below.

Once the SMS 48 has the call monitoring service data related to the subscriber's account, an interactive connection is maintained at step 1526 among the SMS 48, the web server 54 and the web client 30. For example, the web server 54 receives HTTP messages from the subscriber at web client 30 and provides HTML web pages in response to the subscriber's input. The web pages relate to the subscriber's call monitoring service, as indicated by the SMS 48. Whenever the subscriber logs off of the call monitoring service web site, disconnecting the web sever 54 from the SMS 48, the SMS 48 automatically updates the SCP 23 at step 1530 with the updated information provided by the subscriber. The SMS 48 may also provide updated information to the SCP 23 while the subscriber is still on-line, either periodically or in response to a specific command by the subscriber to do so. The SCP 23 stores the updated information received from the SMS 48 for immediate implementation in the PSTN.

FIGS. 16-21 are exemplary web pages provided the web client 30 by the SMS 48 by way of web server 54, according to an embodiment of the present invention. The actual layout of the web pages, as well as the specific options made available to the subscriber on the web pages, may vary.

Figure 16:
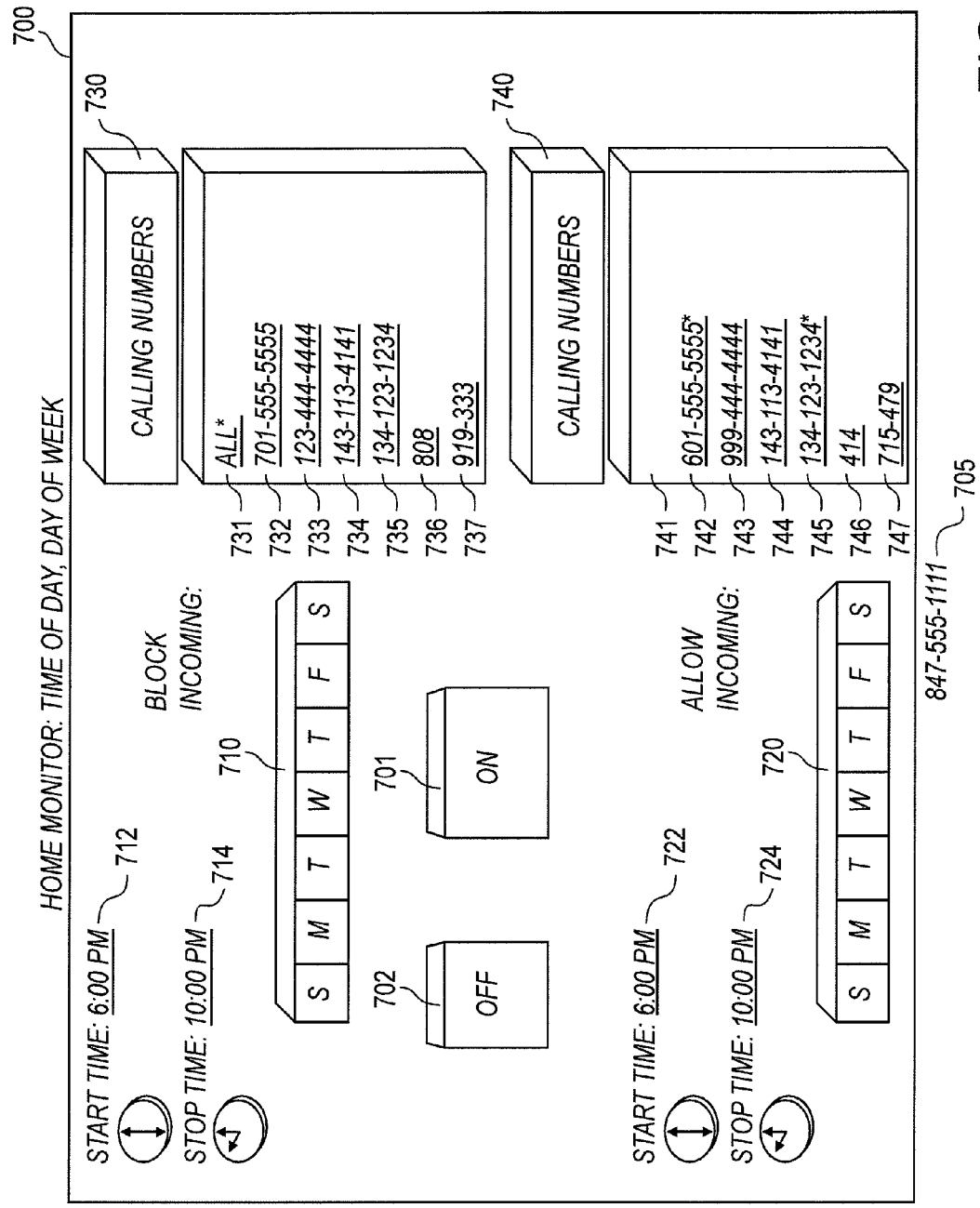
FIG. 16 is an exemplary web page to be displayed at the subscriber's PC showing a scheduler for incoming call blocking during weekdays, according to an aspect of the present invention.

FIG. 16 is an exemplary web page 700 displayed at GUI 32 after the subscriber has been successfully authenticated, as described with respect to steps 1510-1520 of FIG. 15. The web page 700 is a typical layout enabling the subscriber to schedule the call blocking feature for incoming calls to subscriber telephone 25. The telephone number 705 displayed at the bottom of the screen is the telephone number of the subscriber to which the call monitoring service corresponds. A subscriber may have multiple telephone numbers, in the case of a business, for example, which may be controlled and monitored independently or collectively, as desired by the subscriber.

The incoming call blocking feature of the call monitoring service can be turned ON and OFF using buttons 701 and 702, respectively. FIG. 16 indicates that the incoming call blocking feature is ON and therefore active. In an embodiment of the invention, the call blocking feature of the service is implemented separately from the scheduler. In other words, the subscriber may identify telephone numbers (or groups of telephone numbers) from which incoming calls are always blocked whenever the call monitoring service itself is activated.

The web page 700 indicates two sections related to incoming calls: the "Blocking Incoming" section, which is active with respect to the calling numbers list 730 from the start time 712 to the stop time 714, and the "Allow Incoming" section, which is active with respect to the calling numbers list 740 from the start time 722 to the stop time 724. The calling numbers lists 730 and 740 correlate to the incoming restriction list and the incoming priority list, described with respect to FIG. 11, above. According to the example shown in FIG. 16, the incoming restriction list of the "Blocking Incoming" section is active from 6:00 p.m. to 10:00 p.m., as indicated by the start time field 712 and the stop time field 714, respectively. The active period occurs each week day, Monday through Friday, as indicated by the highlighting of the M, T, W, T, F in the day field 710. The incoming priority list of the "Allow Incoming" section is likewise active from 6:00 p.m. to 10:00 p.m., as indicated by the start time field 722 and the stop time field 724, respectively. The active period occurs each week day, Monday through Friday, as indicated by the highlighting of the M, T, W, T, F in the day of the week field 720. The time period for activating the incoming restriction list usually matches the time period for incoming priority list. Therefore, in an embodiment of the invention, the web page 700 would include an option for the subscriber to simply select "same" (not pictured) with respect to the incoming priority list time period. In the example depicted in FIG. 16, the subscriber has instructed the blocking feature of the call monitoring service to block certain incoming calls, each weekday, from 6:00 p.m. through 10:00 p.m.

The subscriber selects the telephone numbers in the incoming restriction list 730 by clicking on the number in the list. The subscriber may add and delete telephone numbers in the incoming restriction list 730, as desired, via the Internet 44 or the IVR 45, as discussed below. Entry 731 of the restricted calling number list 730 is "ALL," which has been selected in the exemplary web page 700, as indicated by highlighting and an asterisk. In response to the selection of entry 731, the call monitoring service blocks all incoming calls to the subscriber telephone 25 during the call blocking period, subject to the parameters set in the "Allow Incoming" section, as discussed below. In an alternative embodiment of the invention, the subscriber is given the option to build a master incoming rejection list that is not subject to the time of day, day of week scheduler. In other words, the subscriber may identify telephone numbers from which calls are always accepted, regardless of the status of the "Block Incoming" and "Allow Incoming" sections of web page 700.

The incoming restriction list 730 includes additional exemplary entries, which are not highlighted in the example of FIG. 16. Entries 732-735 are specific telephone numbers; entry 736 is an area code, only (i.e., the numbering plan area (NPA) of a ten digit telephone number); and entry 737 is an area code plus a local exchange identifier (i.e., the NXX of a seven digit number). Selection of entries 732-735 results in only those specific numbers being blocked. Selection of entry 736 results in all numbers from area code 808 being blocked. Selection of entry 737 results in all numbers from area code 919 and exchange 333 being blocked.

The subscriber selects telephone numbers from the incoming priority list 740, which will be permitted to connect regardless of whether the call blocking feature is active. Telephone number entries 742 and 745 have been selected, as indicated by highlighting and asterisks, according to the example depicted in FIG. 16. Therefore, during the same time period in which the "Block Incoming" section of the web page 700 is active, calls from telephone numbers 742 and 745 will still be permitted to connect, even though calls from all other telephone numbers are blocked. Telephone numbers 742 and 745 may be, for example, the telephone numbers of the subscriber's children's school and the subscriber's work place, calls from which have been deemed by the subscriber as too important to block. In an alternative embodiment of the invention, the subscriber is given the option to build a master incoming priority list that is not subject to the time of day, day of week scheduler. In other words, the subscriber may identify telephone numbers from which calls are always accepted, regardless of the status of the "Block Incoming" and "Allow Incoming" sections of web page 700.

The incoming priority list 740 also includes entry 741, "ALL," which effectively overrides the incoming restriction list 730. In an embodiment of the invention, selection of entry 741 overrides the call blocking of incoming restriction list, except for when specific telephone numbers have been highlighted in the incoming restriction list. Entries 743 and 744 of the incoming priority list 740 are specific telephone numbers; entry 746 is an area code; and entry 747 is an area code plus a local exchange identifier. As in the case of the incoming restriction list 730, the remaining entries of the incoming priority list 740 allow connection of calls from the telephone numbers, the area code or the area code plus exchange when entries 743, 744, 746 and 747 have been selected, respectively. Note that web page 700 has no effect on the ability of the subscriber to bypass any incoming call blocking using the subscriber blocking override PIN.

Figure 17:
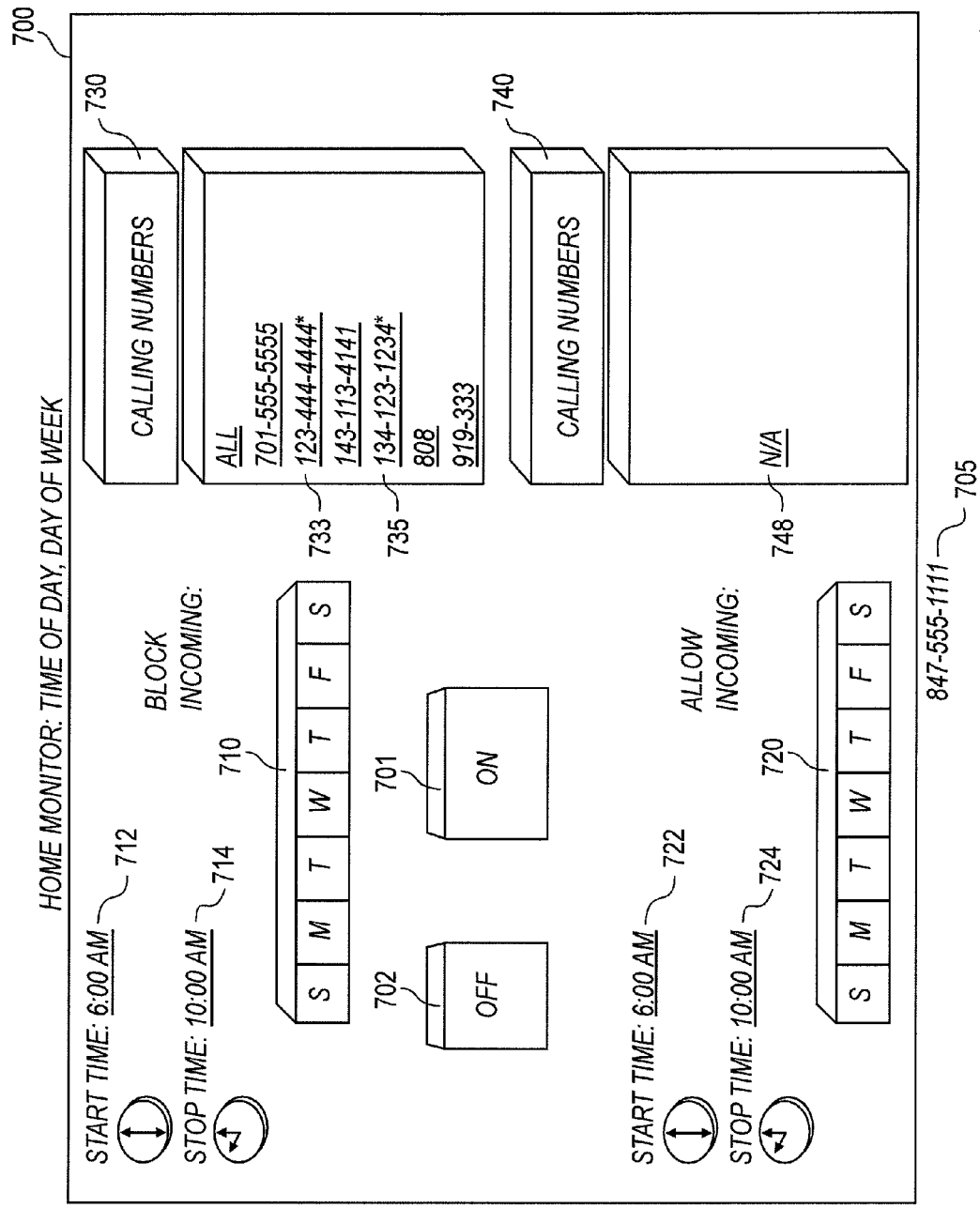
FIG. 17 is an exemplary web page to be displayed at the subscriber's PC showing a scheduler for incoming call blocking on weekends, according to an aspect of the present invention.

FIG. 17 likewise depicts exemplary web page 700, which is displayed at GUI 32 after the subscriber has been successfully authenticated. FIG. 17, however, indicates the call blocking parameters for Saturday and Sunday, as indicated by the highlighting of S and S in the day of the week fields 710 and 720. The start time and the stop time for the call blocking feature on both days is 6:00 a.m. and 10:00 a.m., respectively. During that time period, calls are blocked from telephone numbers 733 and 735 of the incoming restriction list 730. The selected numbers are highlighted and marked by asterisks.

The start time field 722, the stop time field 724 and the day of the week field 720 indicate that the "Allow Incoming" section of web page 700 is active during the same time period on Saturday and Sunday. However, the incoming priority list 740 has an single entry 748, "N/A," meaning "not applicable." In the depicted embodiment of the invention, whenever the subscriber selects only specific telephone numbers to be blocked (e.g., entries 733 and 735) pursuant to the incoming restriction list 730, the incoming priority list 740 automatically displays "N/A" because all other incoming calls are allowed.

Figure 18:
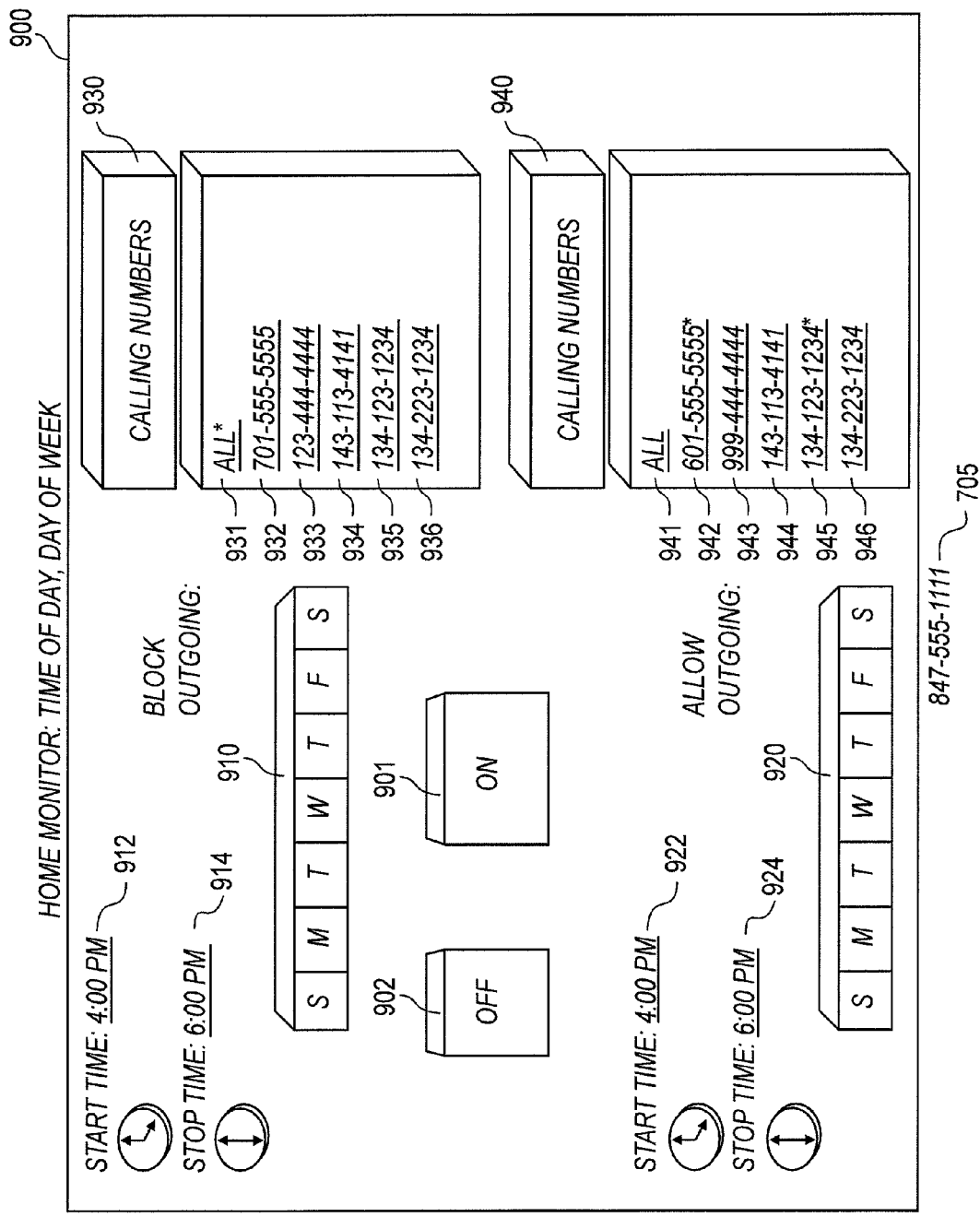
FIG. 18 is an exemplary web page to be displayed at the subscriber's PC showing a scheduler for outgoing call blocking during weekdays, according to an aspect of the present invention.

FIG. 18 is an exemplary web page 900 displayed at GUI 32 after the subscriber has been successfully authenticated, as described with respect to steps 1510-1520 of FIG. 15. The web page 900 is a typical layout enabling the subscriber to schedule the call blocking feature for outgoing calls from the subscriber telephone 25. The telephone number 705 displayed at the bottom of the screen is the same subscriber telephone number to which the call monitoring service corresponds.

The outgoing call blocking feature of the call monitoring service can be turned ON and OFF using buttons 901 and 902, respectively. FIG. 18 indicates the outgoing call blocking feature is ON and therefore active. In an embodiment of the invention, the outgoing call blocking feature of the service is implemented separately from the scheduler. In other words, the subscriber may identify telephone numbers (or groups of telephone numbers) to which outgoing calls are always permitted whenever the call monitoring service itself is activated. Furthermore, certain telephone numbers are always permitted inherently, including emergency numbers, such as 911, and select non-emergency numbers, such as 311.

The web page 900 indicates two sections related to outgoing calls: the "Block Outgoing" section, which is active with respect to the calling numbers list 930 from the start time 912 to the stop time 914, and the "Allow Outgoing" section, which is active with respect to the calling numbers list 940 from the start time 922 to the stop time 924. The calling numbers lists 930 and 940 correlate to the outgoing restriction list and the outgoing priority list, described with respect to FIG. 13, above.

According to the example shown in FIG. 18, the "Block Outgoing" section is active from 4:00 p.m. to 6:00 p.m., as indicated by the start time field 912 and the stop time field 914, respectively. The active period occurs each day, Monday through Friday, as indicated by the highlighting of the M, T, W, T, F in the day field 910. The "Allow Outgoing" section is likewise active from 4:00 p.m. to 6:00 p.m., as indicated by the start time field 922 and the stop time field 924, respectively. The active period occurs each day, Monday through Friday, as indicated by the highlighting of the M, T, W, T, F in the day field 920. The time period for blocking outgoing calls usually matches the time period for allowing outgoing calls. Therefore, in an embodiment of the invention, the web page 900 includes an option for the subscriber to simply select "same" (not pictured) with respect to the time period for allowing outgoing calls. In the example depicted in FIG. 18, the subscriber has instructed the blocking feature of the call monitoring service to block certain outgoing calls, each weekday, from 4:00 p.m. through 6:00 p.m. For example, that time may be designated for children in the household to focus on homework assignments.

The subscriber selects the telephone numbers in the outgoing restriction list 930 by clicking on a number in the list. The subscriber may add and delete telephone numbers in the outgoing restriction list 930, as desired, via the Internet 44 or the IVR 45, as discussed below. Entry 931 of the outgoing restriction list 930 is "ALL," which has been selected in the exemplary web page 900, as indicated by highlighting and an asterisk. In response to the selection of entry 931, the call monitoring service blocks all outgoing calls from the subscriber telephone 25 during the call blocking period, subject to the parameters set in the "Allow Outgoing" section, discussed below.

The outgoing restriction list 930 includes additional exemplary entries, which are not highlighted in the example of FIG. 18. Entries 932-936 are specific telephone numbers. Selection of any one of entries 932-936 results in calls to the corresponding telephone numbers being blocked. The outgoing restriction list 930 may also include entries of an area code and/or an area code plus a local exchange identifier (not pictured). Selection of an area code, only, would result in all numbers to that area code being blocked. In an alternative embodiment of the invention, the subscriber is given the option to build a master outgoing restriction list that is not subject to the time of day, day of week scheduler. In other words, the subscriber may identify telephone numbers to which calls are never permitted, regardless of whether the outgoing call blocking feature has been activated for other telephone numbers or groups of telephone numbers.

The subscriber selects telephone numbers from the outgoing priority list 940, which will be permitted to connect regardless of whether the call blocking feature is active. Telephone number entries 942 and 945 have been selected, as indicated by highlighting and asterisks, according to the example depicted in FIG. 18. Therefore, during the same time period in which the "Block Outgoing" section of the web page 900 is active, calls to telephone numbers 942 and 945 will still be permitted to connect, even though calls to all other telephone numbers are blocked. Telephone numbers 942 and 945 may be, for example, the telephone numbers of close relatives, deemed by the subscriber as too important to block. In an alternative embodiment of the invention, the subscriber is given the option to build a master outgoing priority list that is not subject to the time of day, day of week scheduler. In other words, the subscriber may identify telephone numbers to which calls are always allowed, regardless of the status of the "Block Outgoing" and "Allow Outgoing" sections of web page 900.

The outgoing priority list 940 also includes entry 941, "ALL," which effectively overrides the outgoing restriction list 930. In an embodiment of the invention, selection of entry 941 overrides the call blocking of the outgoing restriction list, except for those specific telephone numbers that have been highlighted in the outgoing restriction list. Entries 943, 944 and 946 are specific telephone numbers, to which outgoing calls would be permitted if they were selected. The outgoing priority list 940 may also include entries of an area code and/or an area code plus a local exchange identifier (not pictured). Selection of an area code, only, would result in all numbers to that area code being allowed. In an alternative embodiment of the invention, the subscriber is given the option to build a master outgoing priority list that is not subject to the time of day, day of week scheduler. In other words, the subscriber may identify telephone numbers to which calls are always permitted, regardless of the outgoing restriction and priority lists otherwise indicated by the scheduler. Note that web page 900 has no effect on the ability of the subscriber to bypass any outgoing call blocking using the subscriber blocking override PIN.

Figure 19:
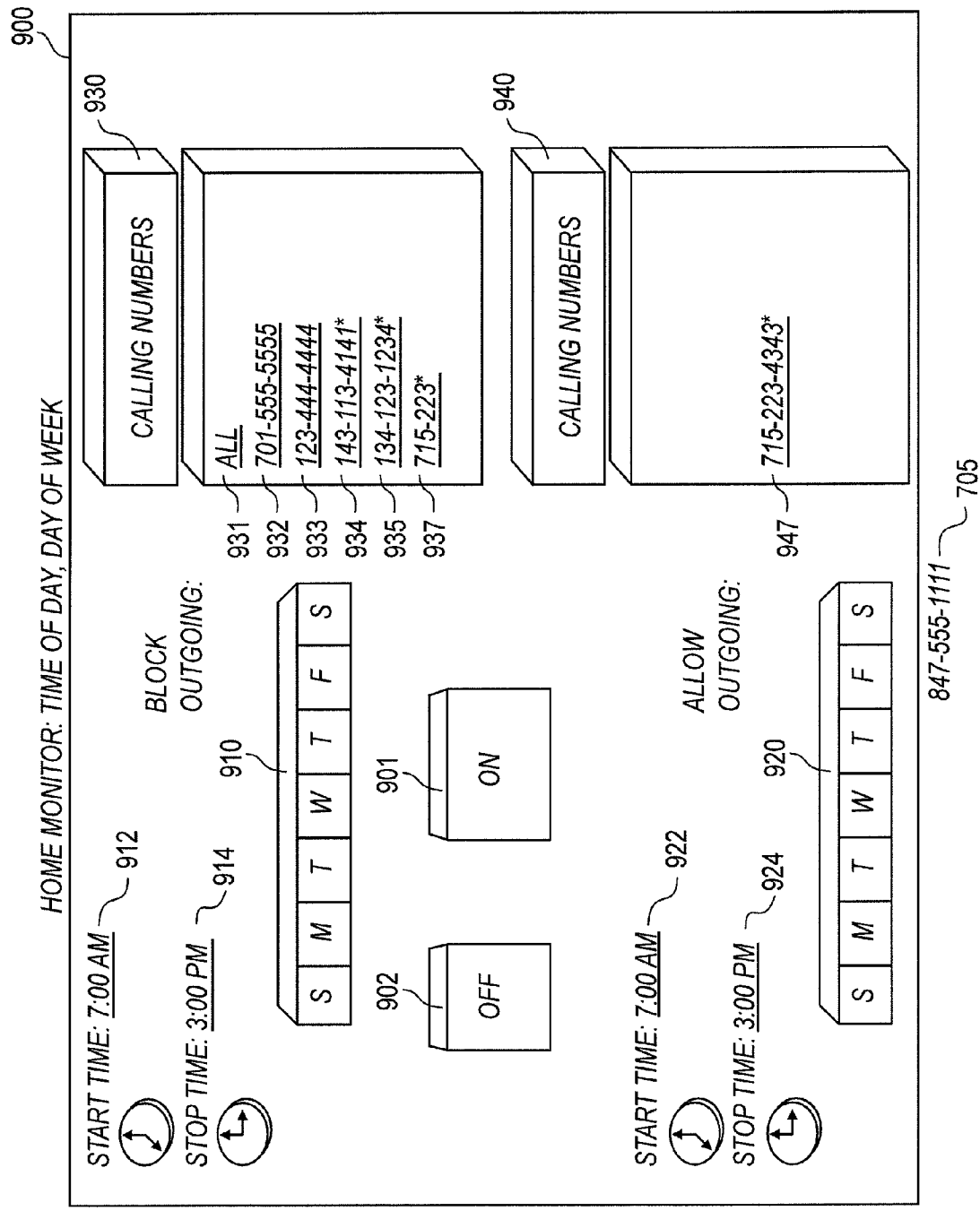
FIG. 19 is an exemplary web page to be displayed at the subscriber's PC showing a scheduler for a single weekday, according to an aspect of the present invention.

FIG. 19 likewise depicts an exemplary web page 900, which is displayed at GUI 32 after the subscriber has been successfully authenticated. FIG. 19, however, indicates the outgoing call blocking parameters for Monday, only, as indicated by the highlighting of M in day fields 910 and 920. The start time and the stop time for the call blocking feature for Monday is 7:00 a.m. and 3:00 p.m., respectively. During that time period, calls are blocked to telephone numbers 934 and 935, as well as to the area code plus exchange identifier 937, of the outgoing restriction list 930. The selected numbers are highlighted and marked by asterisks. The selected time period, applicable only one day a week, may be, for example, a time during which a baby sitter watches children at the subscriber's house and the subscriber wants to prevent inappropriate use of the telephone.

The start time field 922, the stop time field 924 and the day of the week field 920 indicate that the "Allow Outgoing" section of web page 900 is active during the same time period on Monday. However, the outgoing priority list 940 has a single entry 947, which is a telephone number. Note that the telephone number 947 has the same area code and exchange identifier as entry 937 of the outgoing restriction list 930. Listing the telephone number 947 in the outgoing priority list 940 is necessary because calls to telephone number entry 947 would otherwise be blocked. In the baby sitter example, the telephone number entry 947 may be the telephone number of a location where the subscriber expects to be during the designated time period. The baby sitter is therefore able to call the subscriber at the listed number, even though it is in the restricted area code and exchange. Otherwise, the subscriber would have to provide the baby sitter the blocking override PIN to override the outgoing call restrictions.

The subscriber is able to further customize the call monitoring service in response to web screens provided over the Internet 44. For example, FIG. 20 depicts a screening routing list web page 1100, which enables the subscriber to determine the automated announcement played in response to an incoming blocked call, as described, for example, with respect to step s1124 of FIG. 11. The exemplary options include playing an announcement to the caller and forwarding the call to an alternative telephone number. The incoming blocking announcement is shown at balloon 1104, which is activated and deactivated by the ON button 1101 and the OFF button 1102, respectively. In an alternative embodiment of the invention, the web page 1100 provides the subscriber multiple announcements from which to choose.

The telephone number to which a blocked call is forwarded is shown as forwarding number 1134, indicated by NPA-NXX-XXX. The forwarding number 1134 can be any telephone number, including the telephone number of the subscriber's answering service or a location where the subscriber expects to be during the active call blocking time period. The forwarding option is activated and deactivated by the ON button 1131 and the OFF button 1132, respectively.

FIG. 20 depicts the situation in which the subscriber elects to play the incoming blocking announcement 1104, as indicated by selection of the ON button 1101. The OFF button 1132 has also been selected by the subscriber, so a caller is not given the option to leave a message or have the call forwarded elsewhere. In one embodiment of the invention, the subscriber may select both the ON button 1101 and the ON button 1131. The caller would then hear the designated announcement, but also be presented a choice of calling back or having the call forwarded to the pre-designated number 1134.

As indicated above, the call data related to blocked telephone calls, including blocked calls subsequently bypassed by entry of a proper blocking override PIN, is stored at the SCP 23. When the subscriber accesses the SMS 48 via the web server 54 over the Internet 44, the SMS 48 retrieves the stored data from the SCP 23, as indicated in step 1522 of FIG. 15, enabling the subscriber to review the call data related to the blocked calls, to delete the call data, to save the call data in alternate databases, to design and populate reports based on the call data, and to display and print the call data reports.

FIG. 21 is an exemplary web page 2100, displaying a report of blocked call data on a specific date (e.g., Sep. 1, 2001). The report on web page 2100 includes three columns of information. Column 2110 is the incoming blocked calls column, which includes the calling number of each telephone call that was blocked by the incoming call blocking feature of the call monitoring service. Column 2130 is the outgoing blocked calls column, which includes the called number of each telephone call that was blocked by the outgoing call blocking feature. Column 2120 is the Time/Date column, which includes the time and date the calls from both column 2110 and column 2130 were blocked in chronological order. In the example depicted by FIG. 21, the report is limited to Sep. 1, 2001, so the date parameter is the same for every blocked call. However, the subscriber may select a report covering any time period, such as an entire week or month. Furthermore, in an embodiment of the invention, the subscriber is able to create graphical representations, including bar charts and pie charts, summarizing various blocked call reports.

The subscriber is also able to monitor the call blocking activity of the call monitoring service in near real-time at the GUI 32 via the Internet 44. The web client 30 is connected to the SMS 48, via the web server 54, when the incoming and/or outgoing call blocking features of the service are active. The subscriber views a web screen similar to web screen 2100 of FIG. 21 and indicates that real-time updates are desired. In response, the SMS 48 periodically queries the SCP 23 to determine whether additional call data has been stored since the preceding query. The frequency of the queries (e.g., once per minute versus once per 10 minutes) depends in part on the capabilities of the SMS 48 and the SCP 23. In an alternative embodiment of the invention, the SCP 23 updates the SMS 48 automatically at a predetermined rate, regardless of whether the subscriber has specifically requested such updates. The SMS 48 would thus have current call monitoring information and need not query the SCP 23 (e.g., step 1522 of FIG. 15) whenever the subscriber logs on to the Internet 44 and requests access to the call monitoring service.

Figure 22:
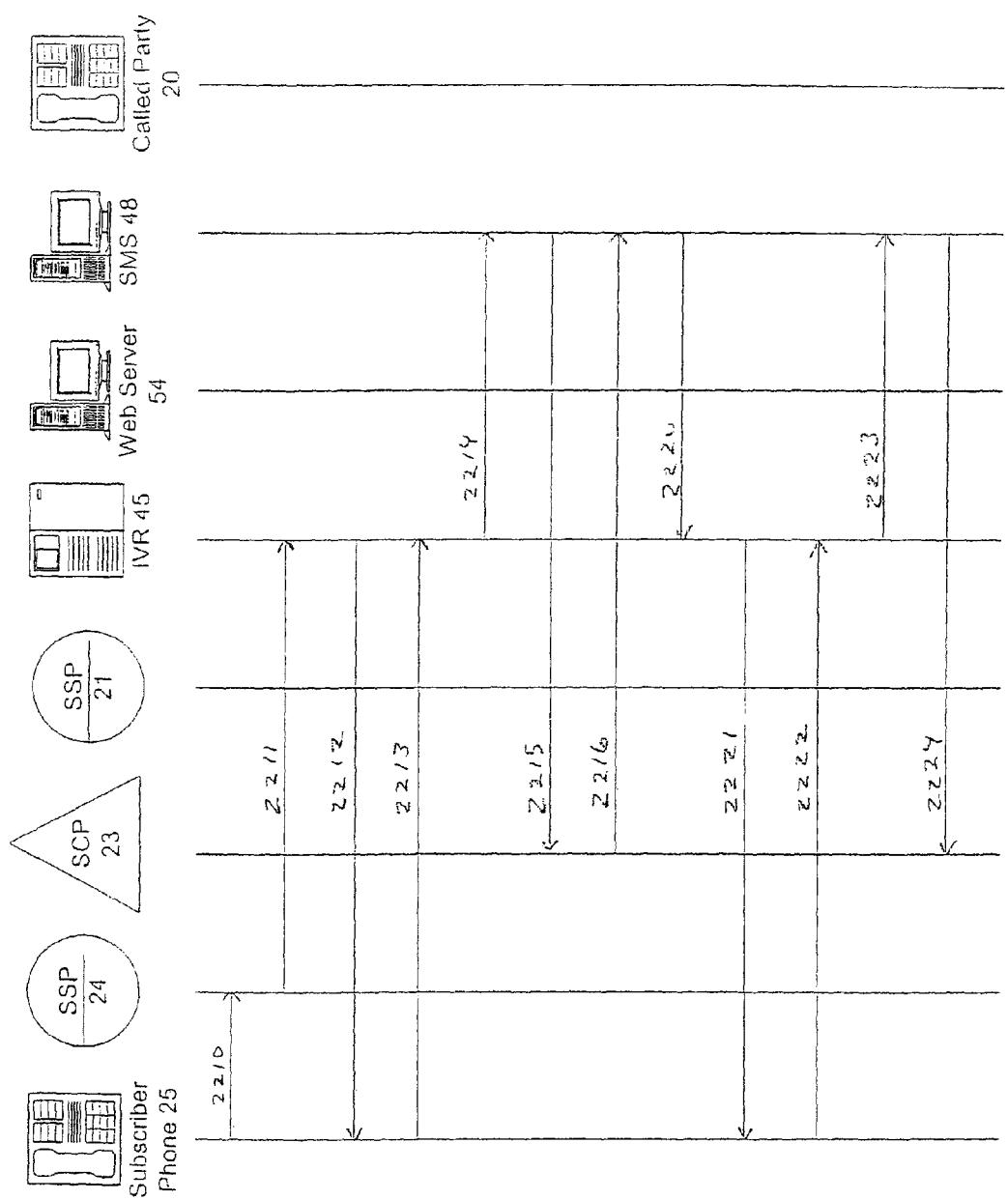
FIG. 22 is an exemplary call flow diagram in which the subscriber accesses the call monitoring service via an interactive voice response system, according to an aspect of the present invention.

All of the information and related iterations available to the subscriber over the Internet 44, described with respect to FIGS. 16-21 are likewise available to the subscriber over the IVR 45 of FIG. 10, as well as the intelligent peripheral 40 (and associated IVR 45) of FIG. 1. Exemplary steps by which the subscriber interacts with the call monitoring service through the IVR 45 are shown in FIG. 22. Access through the IVR 45 is limited in that the subscriber cannot actually build, edit or view reports using the IVR 45. However, the subscriber can access all other features of the call monitoring service, including changing the account access PIN, changing the blocking override PIN, toggling the service ON or OFF and building, editing, activating and deactivating schedules, restriction lists and priority lists. In an embodiment of the invention, the subscriber also receives a voice generated report of blocked calls, along with the respective dates and times. When the IVR 45 is included in the functionality of an intelligent peripheral 40, it may include speech recognition capability to enable the subscriber to verbally interact with the service, as described above.

Referring to FIG. 22, the subscriber calls a toll free number from the subscriber telephone 25, which accesses the IVR 45 via the SSP 24, shown at steps 2210 and 2211. Although FIG. 22 depicts the call originating from the subscriber telephone 25, the subscriber may access the IVR 45 from any telephone that can access the PSTN. The IVR 45 receives the call and initiates a request for various authentication information, such as the subscriber account number and a related account access PIN number, at step 2212. (Although communications between the subscriber telephone 25 and the IVR 45 pass through the SSP 24, and possibly additional switches in the PSTN, this step is omitted for convenience.) The account number and the account access PIN, which may be the same as the account number and account access PIN used to access the call monitoring service via the Internet 44, are entered by the subscriber using the touch tones or speaking into the receiver of the subscriber telephone 25 at step 2213. The pre-programmed voice announcements for this aspect of the invention reside in the IVR 45, and implementation of the voice announcements is well known. The IVR 45 forwards the information to the SMS 48 at step 2214 for authentication.

After authentication, the SMS 48 retrieves the current service data for the identified call monitoring service account, including the current schedules and restriction and priority lists, from the SCP 23 at steps 2215 and 2216. The SMS 48 then provides the IVR 45 with the data specific to the subscriber account at step 2220. The IVR 45 verbally recites a menu of options to the subscriber at step 2221 based on the information received from the SMS 48. For example, the subscriber may have previously built a variety of schedules designated "1" for the weekday incoming call schedule (including restricted and priority number lists), "2" for the weekday outgoing call schedule, "3" for the weekend incoming call schedule, "4" for the weekend outgoing call schedule and "5" for the weekday schedule when a baby sitter is at the subscriber's house. The subscriber selectively activates one or more of the schedules, pressing or speaking the number associated with the desired option. The information is provided by the subscriber in response to the voice generated options of the IVR 45 at step 2222. The IVR 45 forwards the information to the SMS 45 at step 2223, which updates the subscriber's account at the SCP 23 at step 2224, accordingly. The SCP 23 then handles telephone calls to and from the subscriber telephone 25 according to the updated account information.

Flexible Call Forwarding

Figure 23:
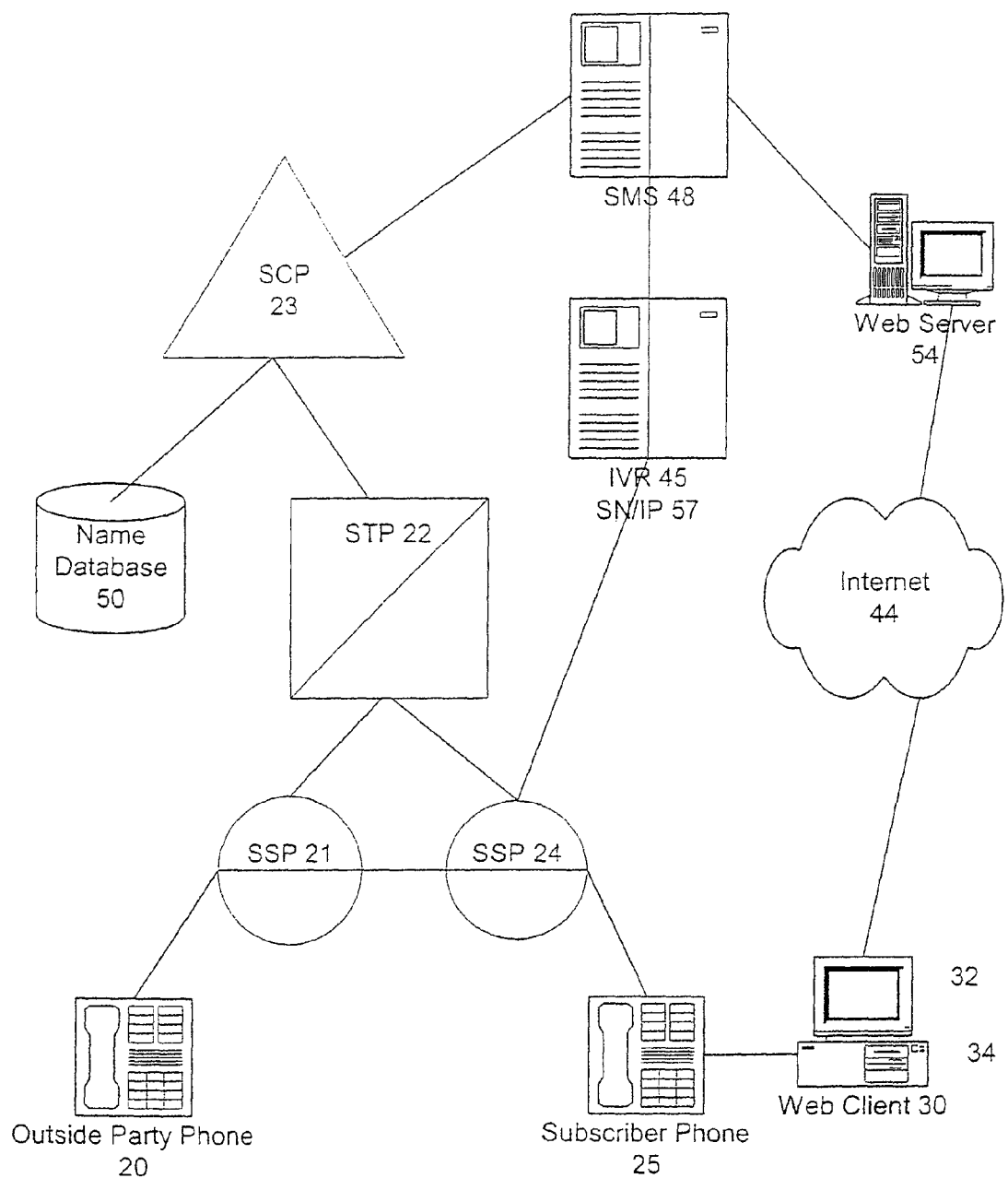
FIG. 23 is a block diagram showing an exemplary telecommunications network for Flexible Call Forwarding and Intelligent Call Forwarding, according to an aspect of the present invention.

Flexible Call Forwarding is an AIN based service that allows a subscriber connected to a communications network, including the Internet and other packet switched type data networks, as well as through conventional IVR or and/or SN/IP systems, to customize and execute call forwarding services with near real-time access to the service data. Flexible Call Forwarding may be implemented as an independent service or part of a PCM portfolio of AIN services. FIG. 23 illustrates an exemplary telecommunications network in association with Flexible Call Forwarding. FIG. 23 is the same as FIG. 10, with the addition of an optional names database 50 connected to the SCP 23, which can be, for example a line information database (LIDB). Furthermore, for purposes of discussion, the exemplary network may further include an SN/IP 57 in place of the intelligent peripheral 40 and/or the IVR 45, as discussed above. (The SN/IP 57 is specifically utilized in the Intelligent Call Forwarding aspects of the invention, as discussed below.)

Generally, Flexible Call Forwarding enables a subscriber to direct incoming calls to alternative telephone numbers. In an embodiment, Flexible Call Forwarding further includes several optional features that the subscriber customizes. Among these features is an "automatic-off" function, which is a preset day and time when Flexible Call Forwarding will deactivate without further instruction from the subscriber. Also, there is a priority screening list, in which the subscriber designates priority names and telephone numbers. When the priority screening list is activated, only calls received from the telephone numbers on the list are forwarded. Flexible Call Forwarding also includes a weekly scheduler, in an embodiment, which enables the subscriber to schedule up to a week in advance the time when the service is on or off, the associated telephone numbers to which calls are forwarded and whether the priority screening list is ON or OFF. Other embodiments allow scheduling further in advance.

As in the call monitoring service, discussed above, the subscriber can access and modify the call forwarding service status via two methods. First, from any telephone, the subscriber dials a toll-free number, e.g., an 800 number, to access the IVR 45 and/or the SN/IP 57. The subscriber is prompted to enter an account number, along with a PIN, further discussed below. The subscriber then has the ability to change the PIN, change the forwarding phone number, toggle the service ON and OFF, specify a day and time when the service will be deactivated and activate or deactivate the priority screening list and the preset weekly schedule. The subscriber may provide the information requested by the voice prompts of the IVR 45 by using the touch tones of a DTMF telephone key pad or, when the IVR 45 is included in an SN/IP having speech recognition functionality, such as the SN/IP 57, by simply speaking into the telephone receiver, as discussed above. Second, the subscriber has the option to access the Flexible Call Forwarding service using a GUI via the Internet 44. Over the web connection, the subscriber is able to implement all of the IVR functions identified above, as well as build the priority screening list and design the weekly scheduler.

In order to implement Flexible Call Forwarding, a TAT is set in the terminating SSP 24. The trigger launches when a call terminates to the subscriber telephone 25. Therefore, when the subscriber receives a call, the call is suspended at the terminating SSP 24 and a termination attempt query is sent to the SCP 23 for instructions via the STP 22. Upon receiving the query, the SCP 23 verifies whether the subscriber telephone 25 subscribes to the Flexible Call Forwarding service. If a Flexible Call Forwarding subscription is found, the service logic at the SCP 23 determines the status of the call forwarding service. In other words, it determines whether Flexible Call Forwarding is ON or OFF and whether various features have been activated. After making these determinations, the SCP 23 instructs the SSP 24 where to send the suspended call, i.e., whether to terminate the call to the subscriber telephone 25 or to forward the call to an alternative telephone number previously specified by the subscriber.

As stated above, Flexible Call Forwarding may include an automatic-off function, a priority screening list and a scheduler. These exemplary features can be routinely and efficiently customized by the subscriber without involvement of the account provider, which conventionally is time consuming and inconvenient.

The automatic-off function enables the subscriber to designate a time for Flexible Call Forwarding to deactivate automatically once the service has been activated. The automatic-off function option is presented to the subscriber each time Flexible Call Forwarding is activated. If an OFF time is entered, the service stops forwarding calls (i.e., the calls are terminated at the subscriber's telephone 25) after the designated time. If no OFF time is entered, the call forwarding service remains active until the subscriber instructs otherwise. If the subscriber elects to activate the weekly scheduler, the automatic-off function is disabled to prevent interference with the scheduler.

The priority screening list is available for use at the subscriber's option. The list contains the names and telephone numbers of priority callers, as designated by the subscriber. In an embodiment, if the priority screening list has been activated, the SCP 23 will only forward calls originating from phone numbers included in the list. All other calls are terminated at the subscriber telephone 25. The priority screening list is implemented through a screening table, which is stored at the SCP 23 and the SMS 48 and is accessible by the subscriber via the Internet 44, as discussed in detail below.

The scheduler provides a weekly schedule of times for activating and deactivating Flexible Call Forwarding, as well as any features associated with Flexible Call Forwarding. For example, the scheduler indicates the times at which the priority screening list is on or off, which times do not necessarily correspond to the Flexible Call Forwarding service activation. The scheduler also designates the telephone numbers to which calls are to be forwarded corresponding to the various on and off times. The scheduler is implemented through a time of day and day of week ("tod/dow") table, which is stored at the SCP 23 and accessible by the subscriber by the Internet 44, discussed in detail below.

In another embodiment, a rejection screening list feature is available. This feature is related to the priority screening list feature, except the rejection screening list includes names and phone numbers which are to be rejected. Calls from numbers on the rejection screening list are terminated to the subscriber's number (i.e., not forwarded) or forwarded to an alternative number designated for rejected calls.

Figure 24:
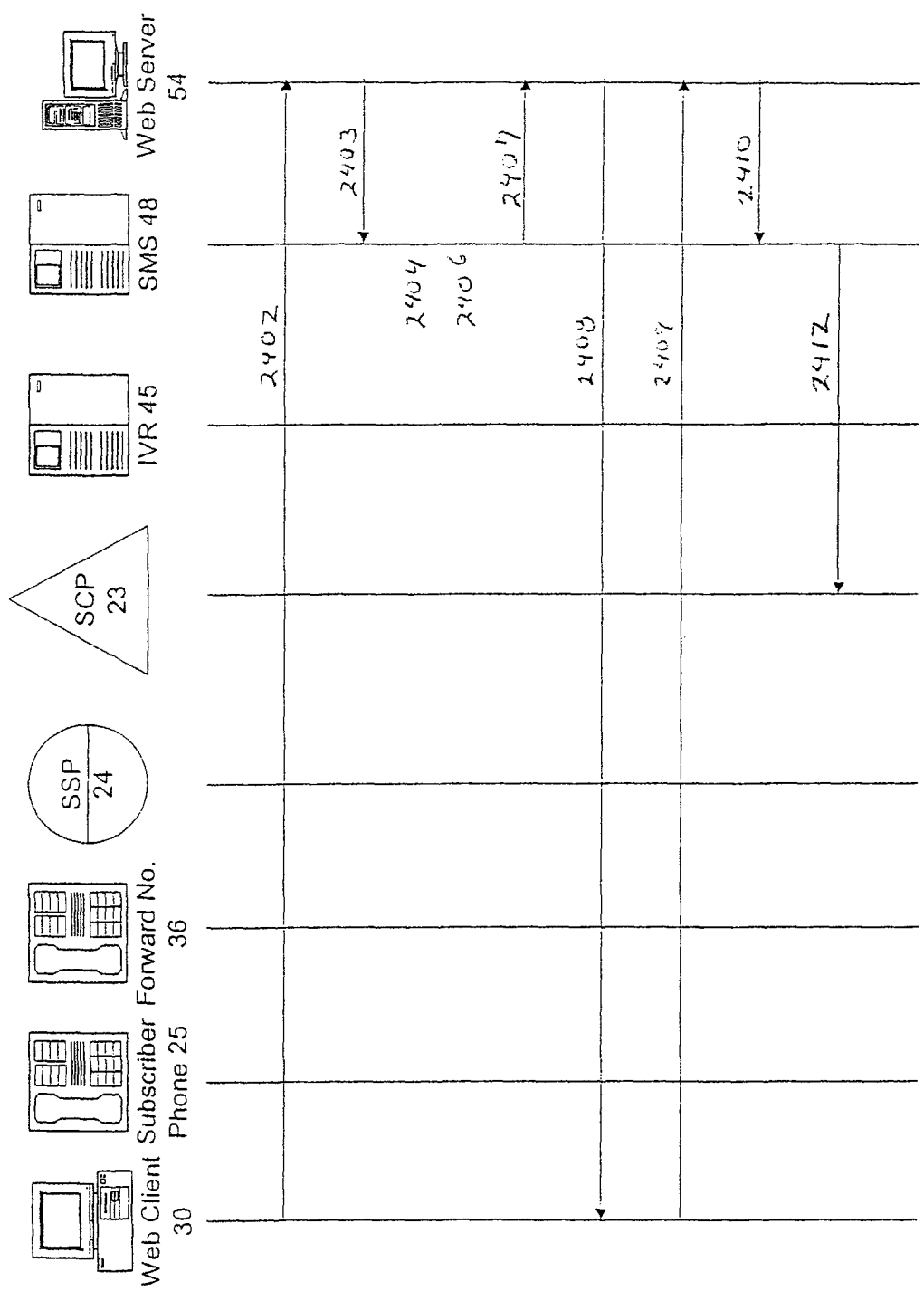
FIG. 24 is an exemplary call flow diagram in which the subscriber accesses the Flexible Call Forwarding data via the Internet, according to an aspect of the present invention.

A subscriber's exemplary interaction with Flexible Call Forwarding is depicted in the call flow diagram of FIG. 24. The subscriber is able to access the Flexible Call Forwarding service via an intelligent peripheral, an IVR or the Internet, thereby greatly increasing flexibility and convenience. FIG. 24 depicts interaction with Flexible Call Forwarding over the Internet, using a GUI, for accessing and updating the more complicated procedures for customizing the service, including building the priority screening lists and weekly schedules, discussed above. In order for the subscriber to access Flexible Call Forwarding via the Internet 44, the subscriber accesses a URL associated with the service provider. The URL is an address and identifies the appropriate protocol for communicating with the service over the web. When the subscriber accesses the Internet, the web server 54 provides Flexible Call Forwarding web screens, transmitted from the SMS 48, examples of which are shown in FIGS. 25-30. In an embodiment, an alternative manner for accessing the Flexible Call Forwarding data via the Internet is through the PCM service, described below.

At step 2402 of FIG. 24, the subscriber accesses Flexible Call Forwarding data by connecting from the web client 30 to the web server 54 through the Internet 44. The web server 54 then connects to the SMS 48, which stores and updates the Flexible Call Forwarding data, as well as authentication data, at step 2403. The web server 54 receives HTTP messages from the subscriber web client 30 and provides HTML web pages in response to the subscriber's input. The web pages relate to the subscriber's Flexible Call Forwarding service, as indicated by the SMS 48.

Once connected to the SMS 48 via the web server 52, the user must provide authentication information to access the corresponding account. The SMS 48 performs the authentication at step 2404. The SMS 48 queries the subscriber for an account number and associated password, which confirms the user's identity. The SMS 48 then retrieves the account number and associated password information to confirm that the subscriber is an authorized user. After successful authentication, the SMS 48 retrieves at step 2406 the current service data for the Flexible Call Forwarding service, including current priority screening lists and schedules, and makes the service data available to the subscriber. The SMS 48 forwards the service data information to the web server 54 at step 2407, which forwards the data to web client 30 via the Internet 44 at step 2408.

The subscriber is presented with a number of options for each telephone number in the account. For example, the subscriber can change the PIN, toggle the various Flexible Call Forwarding features ON or OFF, set the automatic-off function day and time, and activate or deactivate the priority screening list and the weekly web schedule. In addition, the subscriber can build or edit the priority screening lists and weekly schedules.

Figure 25:
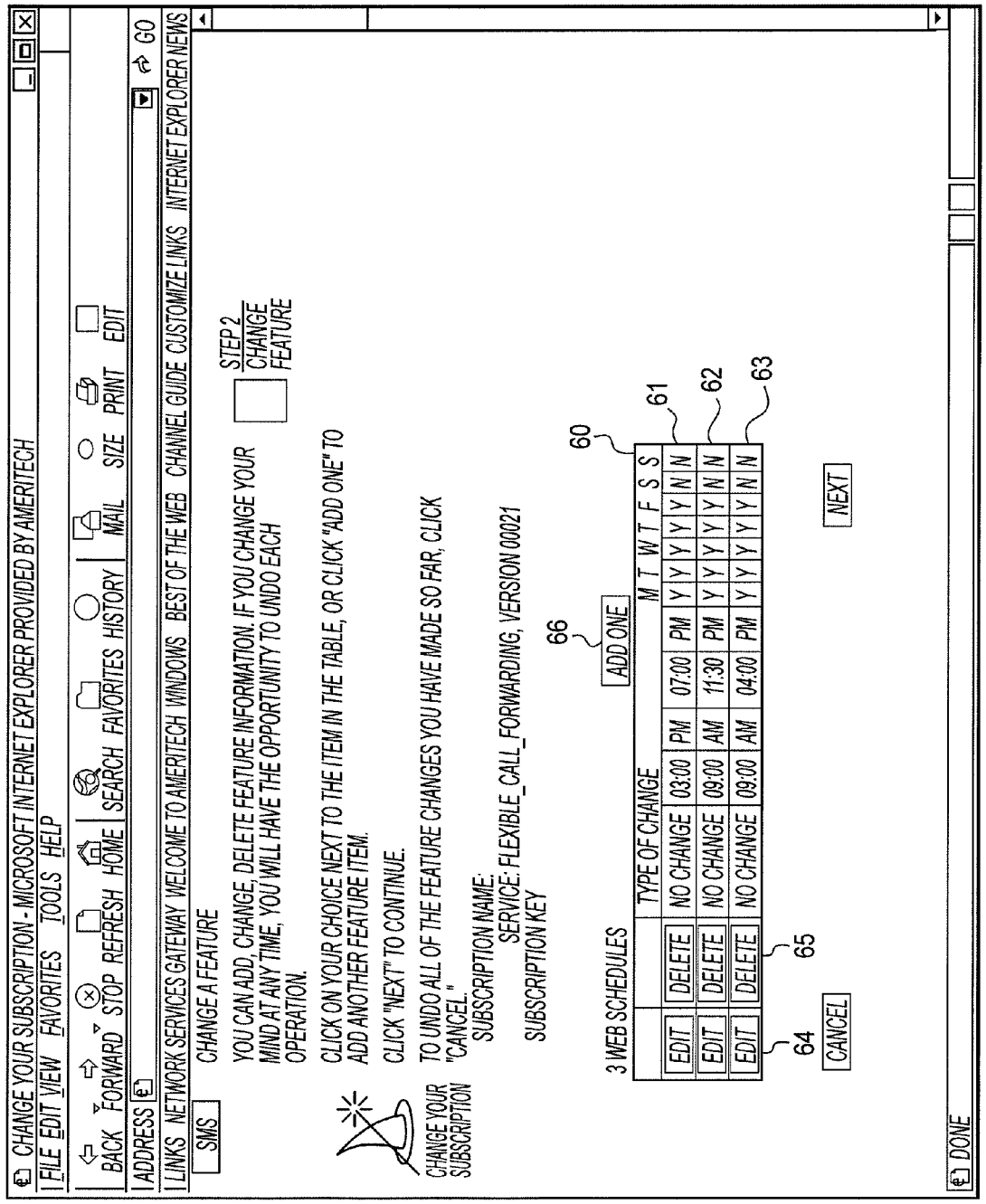
FIG. 25 is an exemplary web page to be displayed at the user's PC showing a weekly scheduler, according to an aspect of the present invention.

For example, FIG. 25 depicts an exemplary web page, displayed on the monitor of PC 32 at the web client 30, showing the weekly scheduler according to an embodiment of the invention. The scheduling table 60 contains data entries from left to right for a Flexible Call Forwarding on-time, off-time and applicable days of the week, which are indicted by MTWTFSS (i.e., Monday, Tuesday, Wednesday, Thursday, Friday, Saturday and Sunday). The first entry 59, for instance, shows an on-time of 3:00 p.m. and an off-time of 7:00 p.m. This period of Flexible Call Forwarding activation is applied Monday through Friday. Similarly, the second activation period 62 is set for 9:00 a.m. to 11:30 p.m. on Monday, Wednesday and Friday. The third activation period 63 is scheduled for Saturday, only, beginning at 9:00 a.m. and ending at 4:00 p.m. In one embodiment, the days and times provided in the scheduler table must be within one week of the time the subscriber populates the table, although alternate embodiments are not limited to the one week schedule. The subscriber can easily edit the weekly schedule, in real-time, by simply selecting the Edit button or the Delete button, included in columns 64 and 65, respectively.

Figure 26:
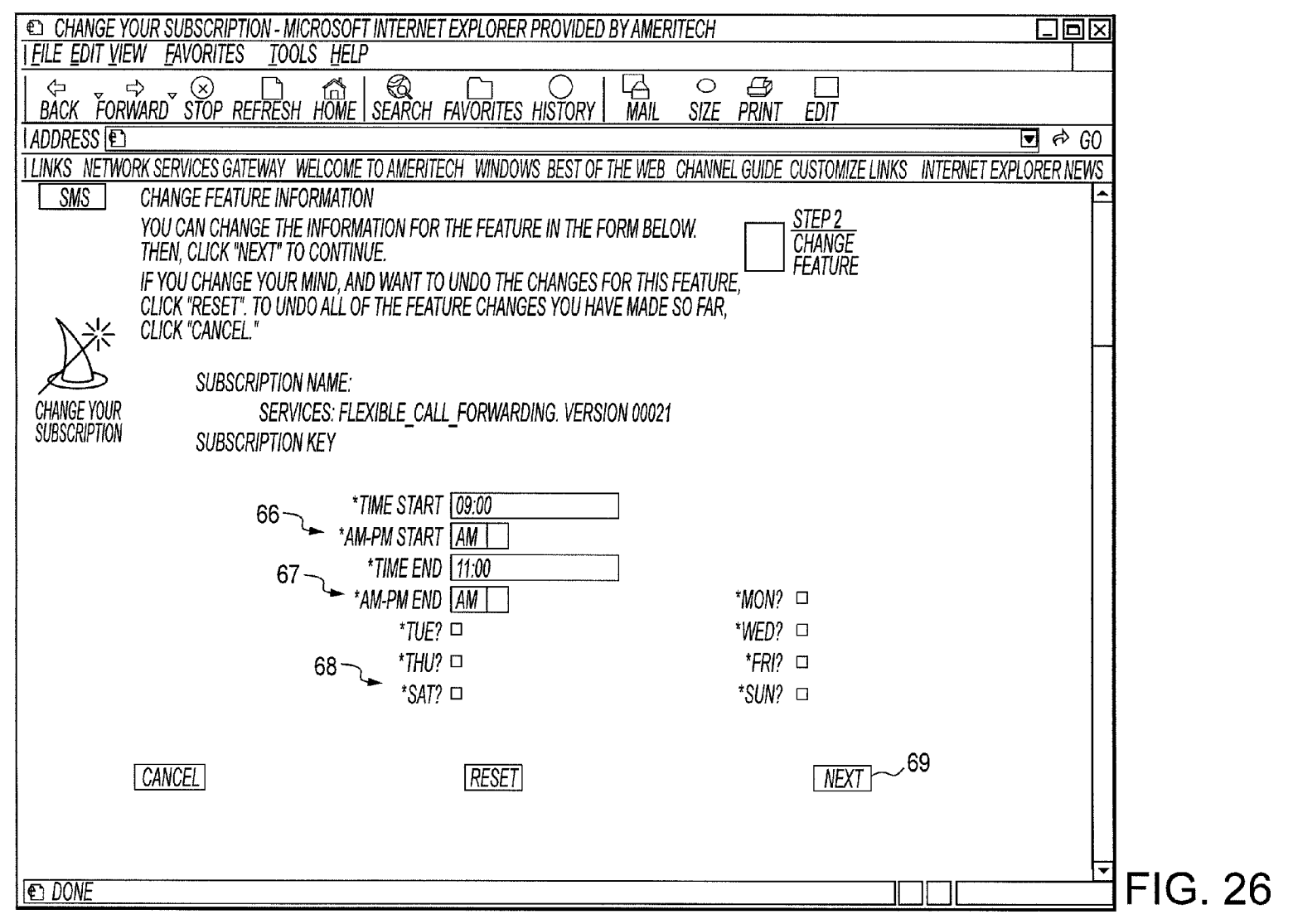
Figure 27:
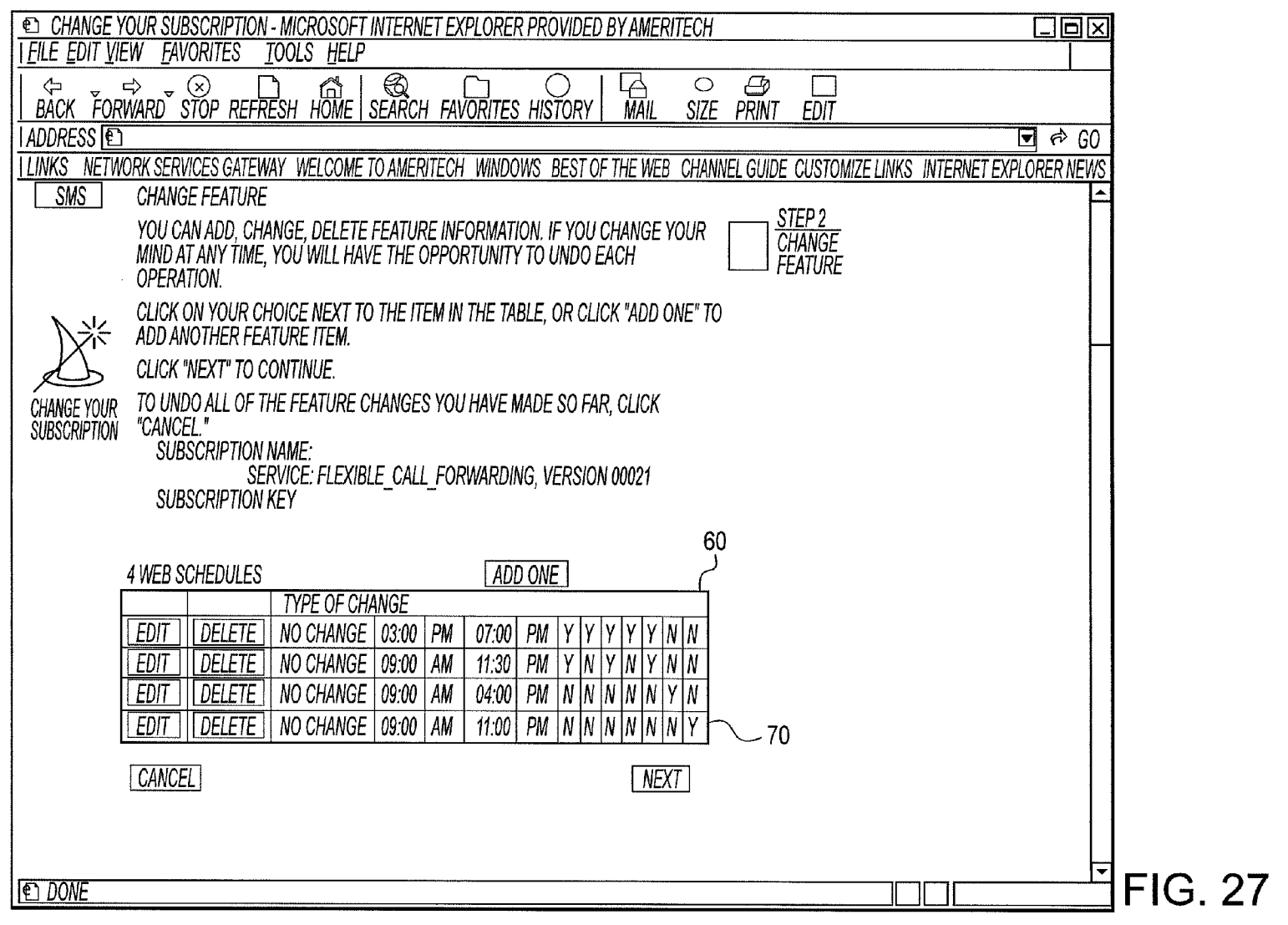

If the subscriber desires to build the schedule by adding another activation period, he or she simply selects the Add One button 66, located directly above scheduling table 60. Upon selecting the Add One button, the subscriber is presented with a new web page at web client 30, an example of which is shown in FIG. 26. The subscriber fills in the blank data fields to indicate the desired additional activation period. The Time Start field 66 is the on-time for Flexible Call Forwarding, including an AM or a PM designation. In this example, the subscriber chooses an on-time of 8:00 a.m. Likewise, the subscriber specifies the Time End 67, which is 11:00 a.m. The subscriber then assigns the days of the week to which the new activation period applies by simply checking the corresponding boxes 68. In this case, the Flexible Call Forwarding period of 8:00 a.m. to 11:00 a.m. will automatically activate on Sunday. The subscriber enters the new activation period by choosing the Next indication 69. The SMS 48 responds by sending the updated weekly schedule screen to the Web client 30, an example of which is shown in FIG. 27. The new activation period 70 is now listed in scheduling table 60, acknowledging to the subscriber that the instructions have been received and implemented.

Figure 28:
FIG. 28 is an exemplary web page to be displayed at the user's PC showing a priority screening list, according to an aspect of the present invention.

FIG. 28 shows an exemplary web page for the priority screening list, according to an embodiment of the invention. The priority screening list 72 contains data entries for priority telephone numbers and corresponding names. As described in detail below, the SMS 48 stores these telephone numbers and names, and forwards the telephone numbers to the SCP 23. Whenever the priority screening list is active, only telephone calls from the numbers on the list will be forwarded according to the subscriber's Flexible Call Forwarding instructions. Edits and additions to the priority screening list 72 are implemented substantially the same to the weekly schedule edits and additions. An existing entry can be edited or deleted using the Edit buttons 73 and the Delete buttons 74, respectively. Selecting the Add One button 75 causes the SMS 48 to send another web page dedicated to building the priority screening list. The subscriber populates the fields for telephone number and name, selects Next and is returned to the priority screening web page of FIG. 28, which would include the additional entry in list 72.

Figure 29:
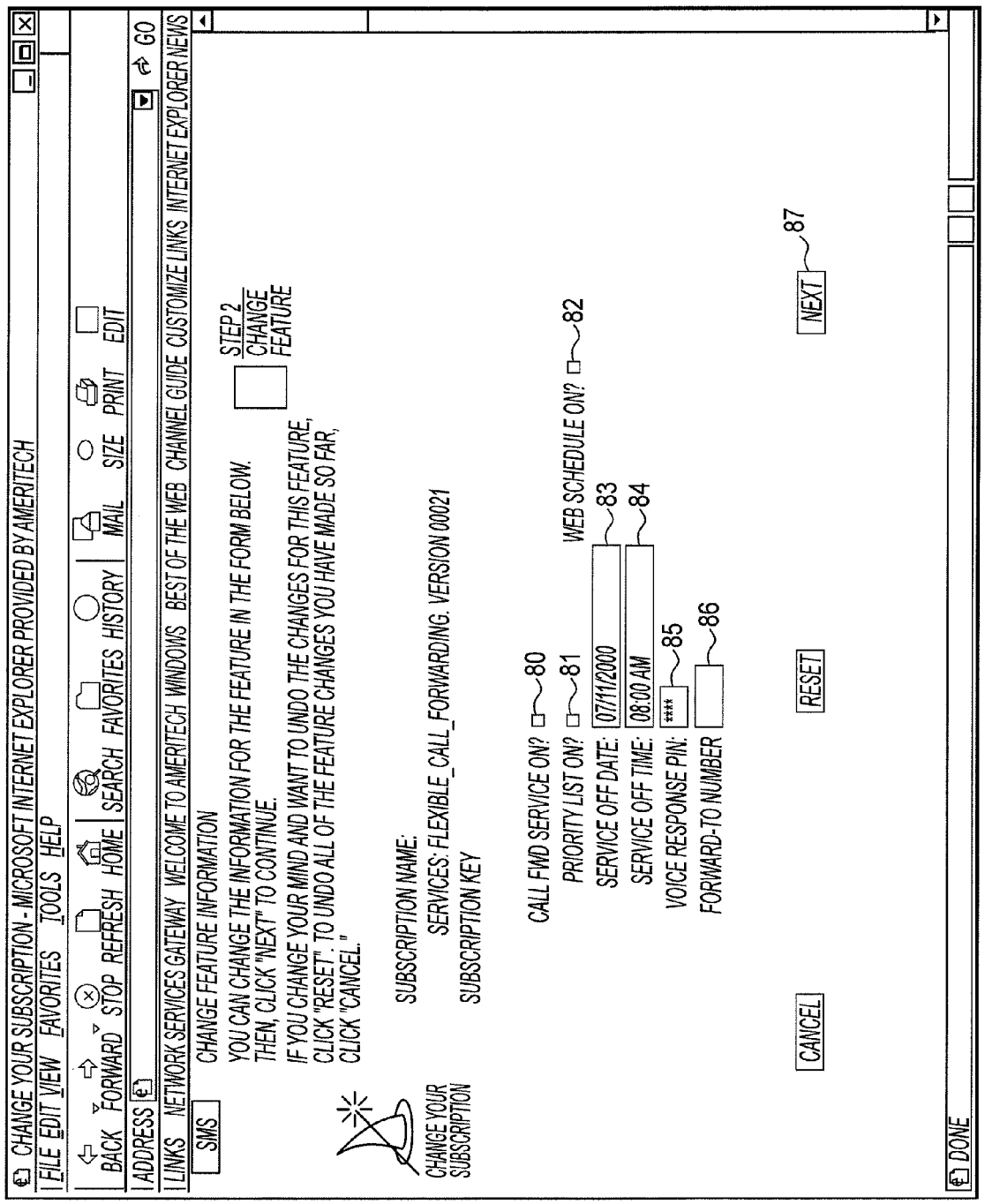
FIG. 29 is an exemplary web page to be displayed at the user's PC showing activation and scheduling data for Flexible Call Forwarding, according to an aspect of the present invention.

In addition to editing and building the weekly schedule and the priority screening list, the subscriber can specify the call forwarding times and service to be applied. FIG. 29 shows an exemplary web page presented to the web client 30 by the SMS 48 for basic Flexible Call Forwarding implementation. Box 80 is for indicating whether Flexible Call Forwarding is ON or OFF. A check mark placed in box 80 activates the service upon pressing the Next button 87. Boxes 81 and 82 relate to the priority screening list and the weekly schedule, respectively. By checking the boxes, the subscriber indicates a desire to activate the respective features (which previously have been built and/or edited).

Boxes 83 and 84 of FIG. 29 pertain to the automatic-off function, discussed above. The boxes 83 and 84 provide fields for the off date and time, respectively, to stop forwarding calls placed to the subscriber telephone 25 once Flexible Call Forwarding has been activated, indicted at box 80. This OFF date and time is over-ridden by the weekly schedule of FIGS. 25 and 27, so that the automatic-off function will not interrupt the customized scheduling featured set up by the subscriber.

The web page of FIG. 29 also requests a voice response PIN at box 85. This is the same PIN that the user uses to access Flexible Call Forwarding by telephone, using IVR 45. In an embodiment, the PIN may also be used in lieu of a password to initially access the Flexible Call Forwarding data over the web.

FIG. 29 also displays a forward-to-number box 86, which is the telephone number to which incoming calls are forwarded. In an embodiment, this is limited to a ten-digit number, although alternative embodiments may include additional digits to accommodate international calls. Further, in the depicted embodiment of the invention, Flexible Call Forwarding allows for one number to which the calls are forwarded any time the service is active, including activation through the weekly scheduler. In alternative embodiments, the weekly scheduler includes a forward-to-number column in the weekly schedule table 60, so that the subscriber can redirect incoming calls to alternative forwarding numbers at different days and times.

The instructions input by the subscriber in FIG. 29 are entered when the subscriber selects the Next button 87, at which time they are sent from the web client 30 through the web server 56 to the SMS 48, indicated respectively at steps 2409 and 2410 of FIG. 24. The exemplary web page of FIG. 28 is then displayed at the web client 30. Substantially simultaneously with entry of these instructions, along with the weekly schedule and priority screening data, the SMS 48 updates the data stored at the SCP 23, according to the information entered by the subscriber, for implementation at step 2412, accordingly. The data stored at the SMS 48 is therefore duplicated by the data stored at the SCP 23.

Figure 30:
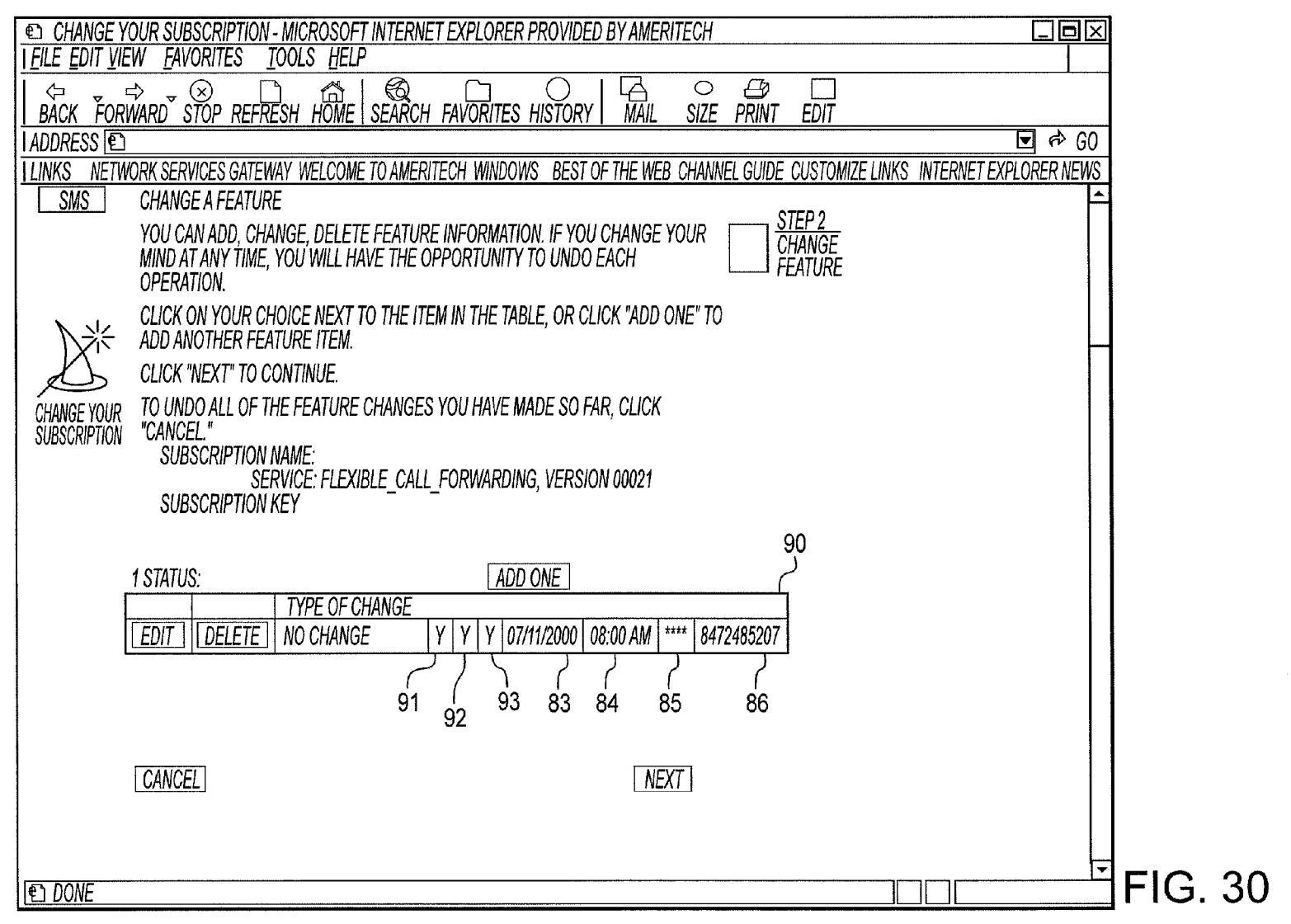

Referring to FIG. 30, the status table 90 presents a summary of the entered information, including the automatic-off date 83, the automatic-off time 84, the PIN number 85 and the forwarding phone number 86. In addition, entries 91-93 indicate the respective status of the service and optional features. The Y in entry 91 indicates that the Flexible Call Forwarding service is on. The Ys in entries 92 and 93 indicate that the priority screening list and the weekly scheduler are active, respectively.

In alternative embodiments, Flexible Call Forwarding forwards telephone calls to alternative numbers, depending on the priority screening list. For example, a calling party number on the priority screening list is forwarded to the current location of the subscriber and a calling party number not on the list is terminated at the original called party number. Furthermore, an embodiment includes a rejection screening list for the subscriber to identify specific directory numbers from which he or she does not wish to accept as forwarded calls, or directory numbers that are forwarded to an alternative telephone number or message center.

FIG. 31 shows an exemplary web page, entitled Call Status Screen, that displays summary information from a weekly schedule integrated with a priority screening list and a rejection screening list. The directory number 99 at the bottom of the screen is the telephone number of the subscriber using the service. Boxes 94-98 display scheduling options created and edited by the subscriber using the web client 30, as described above. Each box includes ON and OFF icons, which can be selected after the particular schedule and associated screening lists have been created, using the web client 30 via the Internet 44 or the IVR 45 and/or SN/IP 57 via the PSTN.

Box 94 is the basic call forwarding function in which, when activated, all calls are forwarded to telephone number 312-555-1616. (As shown, this number coincides with the subscriber's voice mail, which in an embodiment may be a call control option available through PCM, discussed below.) All calls continue to be forwarded to this number until the subscriber deactivates this function, i.e., selects the OFF icon, or until the day and time set in the automatic-off function (not shown) is reached.

Box 95 of FIG. 31 is a summary of essentially the same type of information shown in the exemplary Web page of FIG. 25. From the start time of 7:00 a.m. to the stop time of 3:00 p.m., Monday through Friday, all calls are automatically forwarded to the previously identified directory number, 312-555-1616, with no further action by the subscriber (other than activating box 95). Box 96 is similar to box 95, except that box 96 incorporates a priority screening list. Therefore, from 3:00 p.m. to 7:00 p.m. on Saturday, the Flexible Call Forwarding service forwards only calls from the two numbers on the priority screening list, i.e., 601-555-5555 and 224-123-1234, to a priority forwarding number, i.e., 312-338-8353.

Box 97 shows an example of using a rejection screening list in conjunction with a priority screening list. Assuming that the subscriber desires to return calls from those directory numbers on a second priority screening list, i.e., calls from 701-555-5555 and 123-444-4444, callers associated with the directory numbers on the second priority list will hear an announcement to that effect whenever they call the subscriber's number while box 97 is activated. However, calls from the directory numbers on the rejection screening list, i.e., 608-555-8282 and 312-555-9999, will hear an announcement instructing the caller to attempt the call at a later time.

Box 98 shows another embodiment of the invention in which the Flexible Call Forwarding service provides another priority screening list, referred to, for example, as the special forward list. This list may be built by the subscriber using the web client 30 in the same manner described with respect to the priority screening list. Once created and implemented, i.e., activated by selecting the ON icon on the GUI of web client 30 or sending the appropriate touch tone or voice instruction over the IVR 45, calls from the special forward list directory numbers are sent to another optional telephone number (or played an alternative announcement) according to the subscriber's instructions.

Figure 32:
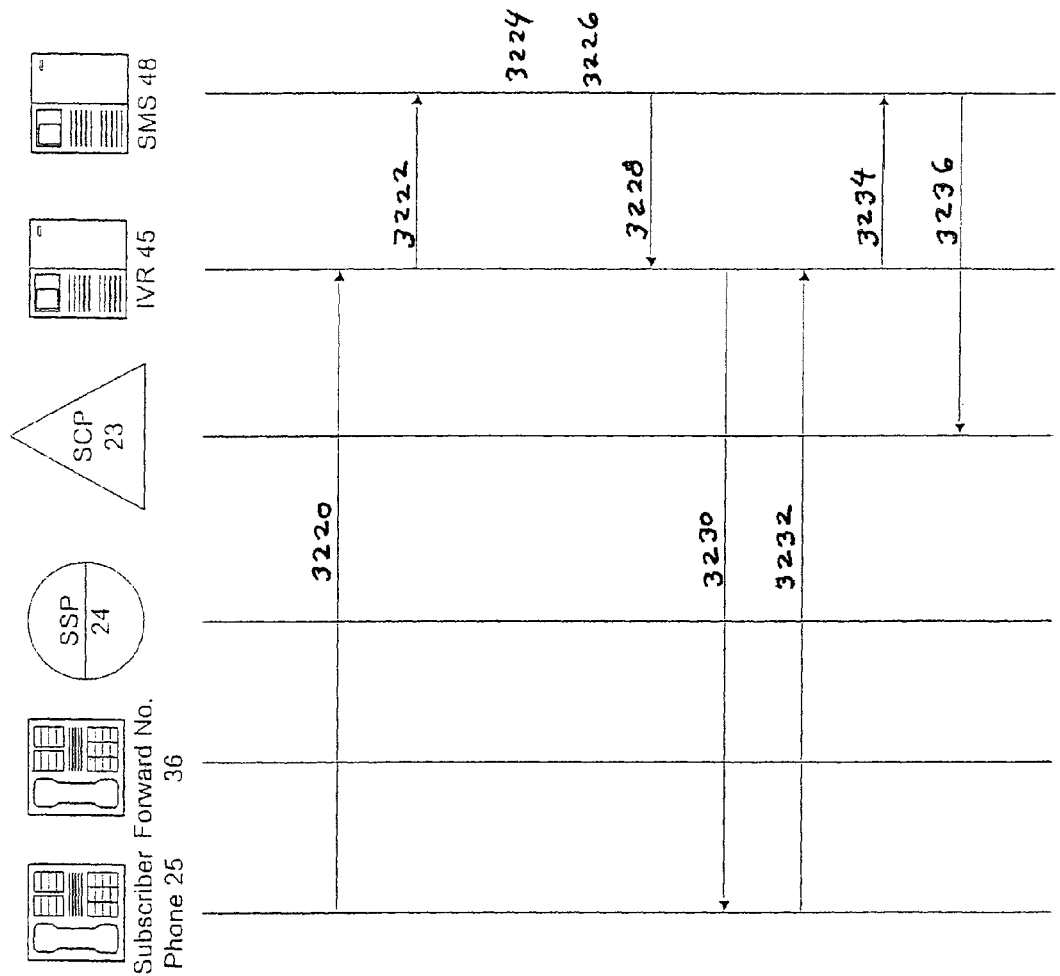
FIG. 32 is an exemplary call flow diagram in which the subscriber accesses Flexible Call Forwarding data via an IVR, according to an aspect of the present invention.

Exemplary steps through which the subscriber can alternatively interact with Flexible Call Forwarding using the IVR 45 are shown in FIG. 32. As stated above, access through the IVR 45 is slightly limited in that the subscriber cannot actually build or edit priority screening lists and weekly schedules. However, the subscriber can access all other features of Flexible Call Forwarding, including changing the PIN, toggling the Flexible Call Forwarding service ON or OFF, setting the automatic-off function day and time, and activating/deactivating the priority screening list and weekly schedule.

Referring to FIG. 32, the subscriber calls a toll free number from any DTMF telephone, which directly accesses the IVR 45, shown at step 3220. FIG. 32 depicts, for example, the call originating from the subscriber telephone 25. The IVR 45 receives the call and initiates a request for various authentication information, including the account and PIN numbers. These numbers coincide with the account and PIN numbers used to access the Flexible Call Forwarding service via the Internet 44. The pre-programmed voice announcements for this aspect of the invention reside in the IVR 45, and implementation of the voice announcements is well known. The authentication information is provided using the touch tones of the DTMF telephone 25. When the IVR 45 is included in the SN/IP 57, which supports speech recognition functionality, the authentication intervention may alternatively be provided by the subscriber speaking the appropriate numbers into the subscriber telephone 25. When the SN/IP 57 is programmed with speaker dependent software, the subscriber's voice print may be used for the authentication. The IVR 45 forwards the information to the SMS 48 at step 3222 for verification at step 3224, or alternatively notifies the SMS 48 of successful authentication.

After verification, the system operates in much the same way as described above with respect to a GUI and the Internet. The SMS 48 retrieves at step 3226 the current service data for the Flexible Call Forwarding service, including current priority screening lists and schedules, and provides the IVR 45 with the call forwarding data specific to the subscriber at step 3228. The IVR 45 then verbally recites a menu of options to the subscriber at step 3230 based on the information received from the SMS 48. For example, if the subscriber has previously built a priority screening list, activation of this list will be included among the options provided to the user over the telephone. The subscriber listens to the options and inputs various choices at step 3232 via the telephone touch tone key pad, including, for example turning on Flexible Call Forwarding or selecting and activating a predefined priority list or weekly schedule. The subscriber can also set the automatic-off function date and time.

These commands are forwarded from the IVR 45 to the SMS 48 at step 3234, which updates the Flexible Call Forwarding data contained in the SCP 23 at step 3236. Once stored at the SCP 23, Flexible Call Forwarding is set with respect to incoming calls in accordance with the customizing instructions from the subscriber.

Figure 33:
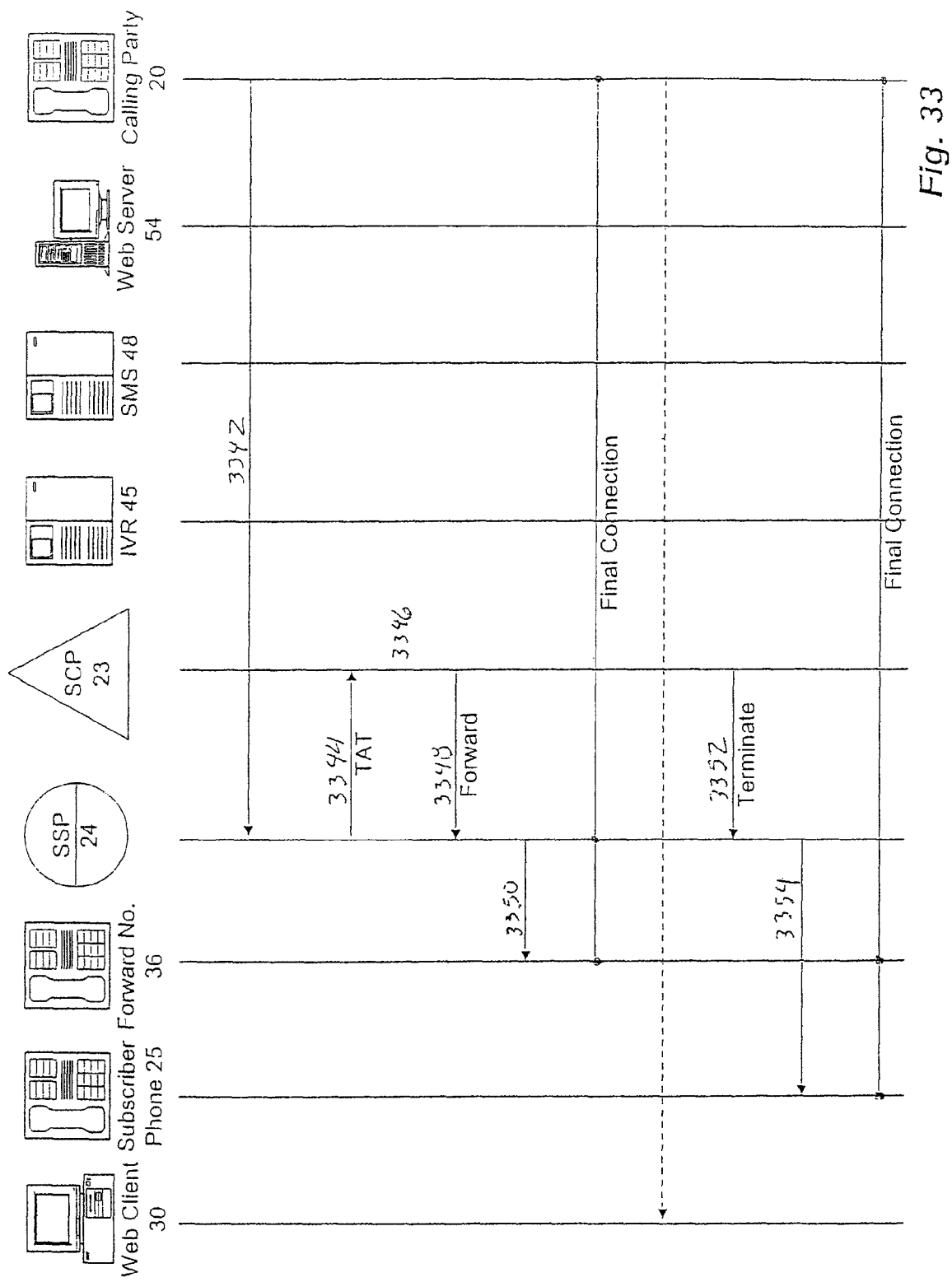
FIG. 33 is an exemplary Flexible Call Forwarding call flow diagram showing routing of an incoming telephone call, according to an aspect of the present invention.

FIG. 33 is a call flow diagram depicting an exemplary implementation of Flexible Call Forwarding in response to an incoming telephone call. At step 3342, a calling party 20 places a call to the telephone number of the subscriber telephone 25. The call proceeds through the originating SSP 21 (not pictured) to the terminating SSP 24, which launches an AIN Terminating Attempt Trigger (TAT) query to the SCP 23 at step 3344. Once the trigger has been assigned and activated, every call terminating to the subscriber's line will cause the SSP 24 to launch the TAT query via the existing SS7 network.

Figure 34:
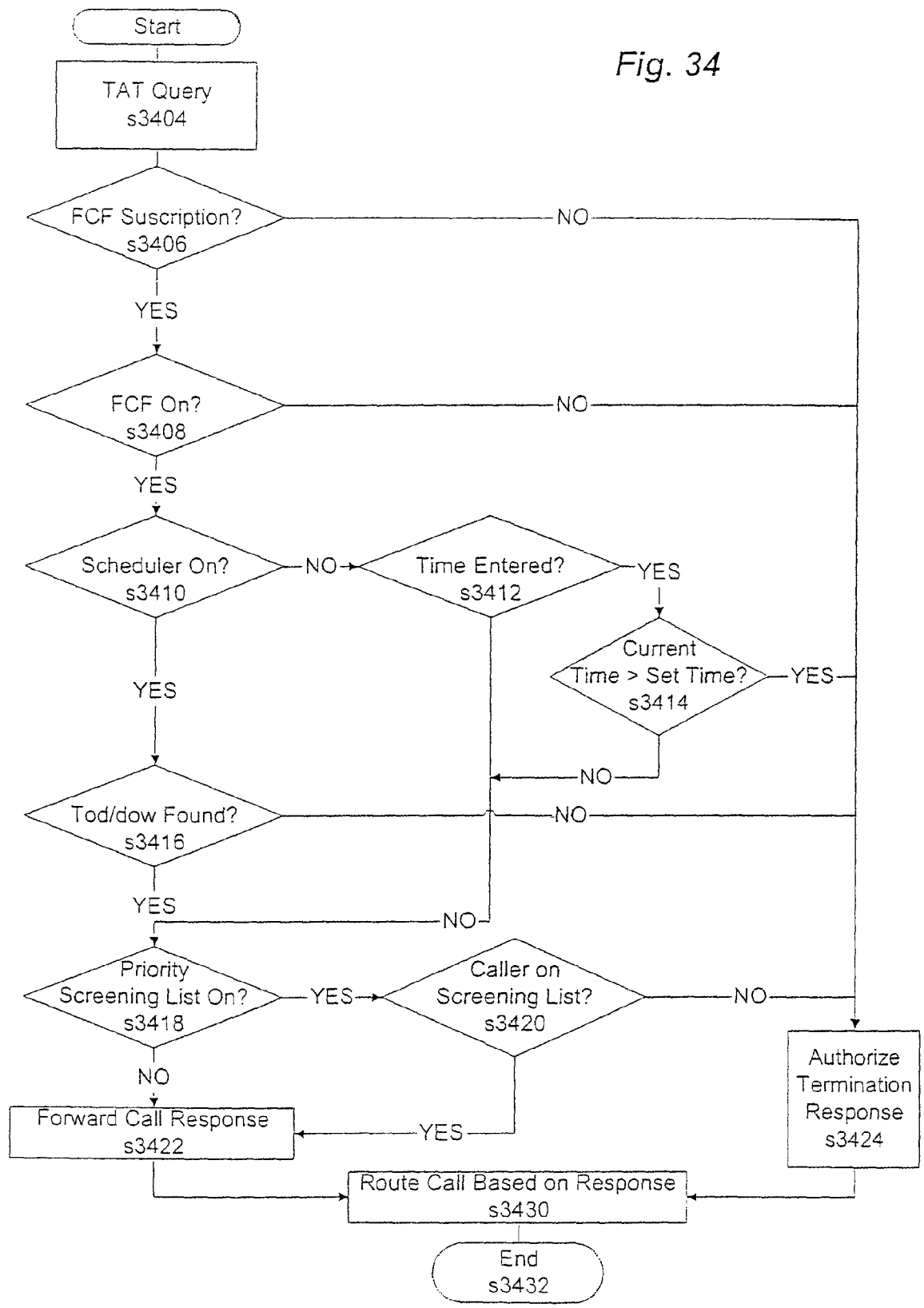
FIG. 34 is an exemplary flow chart of Flexible Call Forwarding call routing service logic, according to an aspect of the present invention.

Step 3344 of FIG. 33 coincides with step s3404 of FIG. 34, which is a flow diagram depicting the logical flow of handling an exemplary call according to an embodiment of the invention. In particular, at step s3404, the SSP 24 sends a termination attempt query message to the SCP 23. The data corresponding to the termination attempt query includes standard AIN parameters, such as a called party identification number and a calling party identification number.

After receiving the TAT query, the SCP 23 internally processes the data at step 3346 of FIG. 33. The SCP 23 first determines at step s3406 of FIG. 34 whether the called party is a Flexible Call Forwarding subscriber. The determination is accomplished by comparing the query parameters from the SSP 24 to a list of subscribers in the SCP 23's Flexible Call Forwarding database. If there is no match, the SCP 23 concludes that the called party is not a Flexible Call Forwarding subscriber and sends an authorize termination instruction to SSP 24, which terminates the call to the dialed telephone number, as indicated at steps s3424 and s3430, ending the process at step s3432. In other words, the SCP 23 instructs the SSP 24 to simply complete the call as dialed with no further processing.

If the SCP 23 finds a match at step s3406, indicating that the called party is a subscriber to Flexible Call Forwarding, the process proceeds to step s3408, which determines whether the Flexible Call Forwarding service is ON or OFF. The ON/OFF status is indicated by a data flag, for example. If the Flexible Call Forwarding service is OFF, the logic proceeds to steps s3424 and s3430, as described above. That is, the SCP 23 sends the authorize termination instruction to SSP 24, which terminates the call to the called party number. If Flexible Call Forwarding service is ON, then the SCP 23 must determine which functions have been activated by the subscriber.

At step s3410, the SCP 23 determines whether the scheduler is ON or OFF. The scheduler status is also indicated by a data flag, for example. If the scheduler is OFF, the SCP 23 proceeds to step s3412, which represents the automatic-off function of Flexible Call Forwarding. As previously described, and as shown in FIG. 34, the automatic-off function is entirely bypassed whenever the scheduler is activated, thereby preventing conflicting instructions from the two features. With respect to the automatic-off function, the SCP 23 first determines whether a time has been entered into the Data Counter field, which indicates the time at which the subscriber wishes call forwarding to be discontinued. If there is no time entered, the SCP 23 assumes that call forwarding is still active and proceeds to step s3418 to determine whether the priority list is activated. If there is a time in the Data Counter field, which indicates the automatic shut-off time, the current time of day, provided by a timer of the SCP 23, is checked against the shut-off time at step s3414. If the current time is later than the shut-off time, the SCP 23 instructs SSP 24 to terminate the call to the called party number 25, at step s3424. Otherwise, the SCP 23 proceeds to step s3418.

If it is determined at step s3410 that the scheduler is on, the SCP 23 accesses the scheduler table to execute call forwarding accordingly. In an embodiment, the weekly scheduler includes a time of day/day of week ("tod/dow") table, which may have the multiple entries. As discussed above, at a minimum, the tod/dow table contains multiple sets of start times and end times, as well as fields for identifying the days of the week for activation. The fields, for example, contain data indicating which days of the week have been designated activation periods. In an embodiment of the invention, the table also stores telephone numbers corresponding to the various activation periods of Flexible Call Forwarding.

At step s3416, the SCP 23 determines whether the tod/dow table is found and populated. If there is no such table or the table exists but is unpopulated, the SCP 23 proceeds to step s3424, where the call is terminated to the called telephone number 25. Otherwise, the SCP 23 determines the forwarding instruction according to the current time, the times and days indicated by the tod/dow table and, in one embodiment, the forwarding telephone numbers. If the table indicates that the current time falls within a period during which call forwarding is not active, then the SCP 23 instructs the SSP 24 to terminate the call to the called party number.

Otherwise, the process proceeds to step s3418, where the SCP 23 determines whether the priority screening list feature is ON or OFF. If the list feature is off, the SCP 23 simply instructs the SSP 24 to forward the telephone call to the designated forwarding number 36, at step s3422. If the list feature is on, the calling party number 20 is used to determine whether the caller is on the priority screening list, indicated at step s3420. The list accommodates multiple entries for priority calls (e.g., 75, in one embodiment) and is populated with telephone numbers associated with whomever the subscriber has previously identified as a priority caller. When the priority screening list feature is on and the calling party number 20 does not appear on that list, the SCP 23 instructs SSP 24 to terminate the call to the called party number 25, at step s3424. Otherwise, the SCP 23 instructs the SSP 24 to forward the call to the designated forwarding phone number 36, indicated at step s3422. The call is then routed accordingly at step s3430, ending the process at step s3432.

Referring back to FIG. 33, in order to instruct the SSP 24 to forward a call, the SCP 23 sends a forward call message to the SSP 24 at step 3348. In an embodiment of the invention, the forward call message sent by the SCP 23 to SSP 24 includes standard AIN parameters. The SSP 24 then completes the connection between the calling party 20 and the forwarding number 36 at step 3350, resulting in a final connection between the two. In the alternative, if the SSP 24 is instructed to terminate the call to the called party number 25, the SCP 23 sends the authorize termination message, previously discussed, to the SSP 24 at step 3352. The SSP 24 then completes the connection between the calling party 20 and the subscriber telephone 25 (i.e., called party number) at step 3354, resulting in a final connection between the two.

System errors that occur while processing a call under Flexible Call Forwarding generally result in the call being terminated to the subscriber's line 25. For example, if the SSP 24 does not receive a response to the termination attempt query from the SCP 23 within a predetermined time, e.g., 3 seconds, the call is terminated to the subscriber's line 25. Other errors resulting in termination to the subscriber's line 25 include the SSP 24 receiving any report of an application error after sending a termination attempt query and the SSP 24 detecting a protocol or application error in an authorize termination message from the SCP 23.

Intelligent Call Forwarding

An additional embodiment of the present invention will be referred to as Intelligent Call Forwarding. Intelligent Call Forwarding is an AIN based call control service that is closely related to Flexible Call Forwarding and provides complementary features. Flexible Call Forwarding is implemented to forward telephone calls to at least one pre-designated number whenever the subscriber anticipates not being available at the subscriber telephone 25, but Flexible Call Forwarding does not provide call processing whenever the caller encounters a busy signal at the subscriber's line. The inability to forward calls is particularly problematic when the subscriber is connected to the Internet via the telephone line to which incoming calls are attempting to connect. Conventionally, the calling party simply receives a busy signal (or is sent to a message mailbox) and the subscriber has no notice of the incoming call.

An embodiment of the invention addresses two related services. One of the services is referred to as Intelligent Call Forwarding, which enables the subscriber connected to the Internet to direct incoming calls to alternative telephone numbers, including numbers that play announcements or accept messages, without interrupting the Internet session. For example, the announcements may include a message informing the calling party that the party they are trying to reach is busy and that the caller should call back later, or a message informing the calling party that the party they are trying to reach is busy and will call them back later. Intelligent Call Forwarding includes several optional features similar to Flexible Call Forwarding that the subscriber may customize. Among these features are a weekly scheduler, which allows the subscriber to schedule up to a week in advance activation and deactivation times, as well as associated forwarding phone numbers. Another feature is a priority screening list, in which the subscriber designates priority names and telephone numbers. Related to the priority screening feature is a screening rejection list feature, which terminates an incoming call to the called number or forwards the rejected call to a pre-designated number having an appropriate announcement (switch-based, or otherwise).

As in the case of the call monitoring and Flexible Call Forwarding services, discussed above, the subscriber can access and modify the Intelligent Call Forwarding service status via two methods. First, from any telephone, the subscriber dials a toll-free number, e.g., an 800 number, to access the IVR 45 and/or the SN/IP 57. The subscriber is prompted to enter an account number, along with a PIN, further discussed below. The subscriber then has the ability to change the PIN, change the forwarding numbers, toggle the service ON/OFF, specify a day and time when the service will be deactivated and activate or deactivate the priority screening list, the rejected call list and the weekly schedule. Second, the subscriber has the option to access the Intelligent Call Forwarding service using a GUI via the Internet. Over the web connection, the subscriber is able to implement all IVR functions, as well as build the screening lists and design weekly schedules. The Intelligent Call Forwarding service, when active, automatically takes effect whenever the subscriber accesses the Internet from a telephone number included in the service.

The other service for responding to busy signals on the subscriber's phone line is Internet Caller ID (ICID). Like Intelligent Call Forwarding, ICID enables the subscriber connected to the Internet via a dial-up connection to contemporaneously receive caller identification information concerning an incoming telephone call, without interrupting the connection with the Internet. The caller information is provided in a pop-up dialog box on the subscriber's display, which includes but is not limited to, a PC monitor. The information displayed to the subscriber includes the name and number of the calling party, if available. In addition, several disposition options are presented to the subscriber which, upon selection, determine handling of the incoming call.

In an embodiment, the disposition options available to the subscriber include accepting the call, forwarding the call to a voice mail system, redirecting the call to another telephone line (e.g., a cellular telephone or a second telephone line), and playing an announcement to the calling party. The announcement played to the calling party is selected by the subscriber and may be either a message informing the calling party that the party they are trying to reach is busy and that the caller should call back later, or a message informing the calling party that the party they are trying to reach is busy and will call them back later. Additionally, the subscriber has the option in all of the service described herein of selecting the language in which the messages plays, e.g., English or Spanish.

FIG. 23 illustrates an exemplary telecommunications network, for implementing the Intelligent Call Forwarding aspects of the invention. As in the case of Flexible Call Forwarding, the subscriber is able to access to the Intelligent Call Forwarding service by GUI via the Internet 44 and by telephone via an IVR 45 or SN/IP 57, through a common SMS 48.

Figure 35:
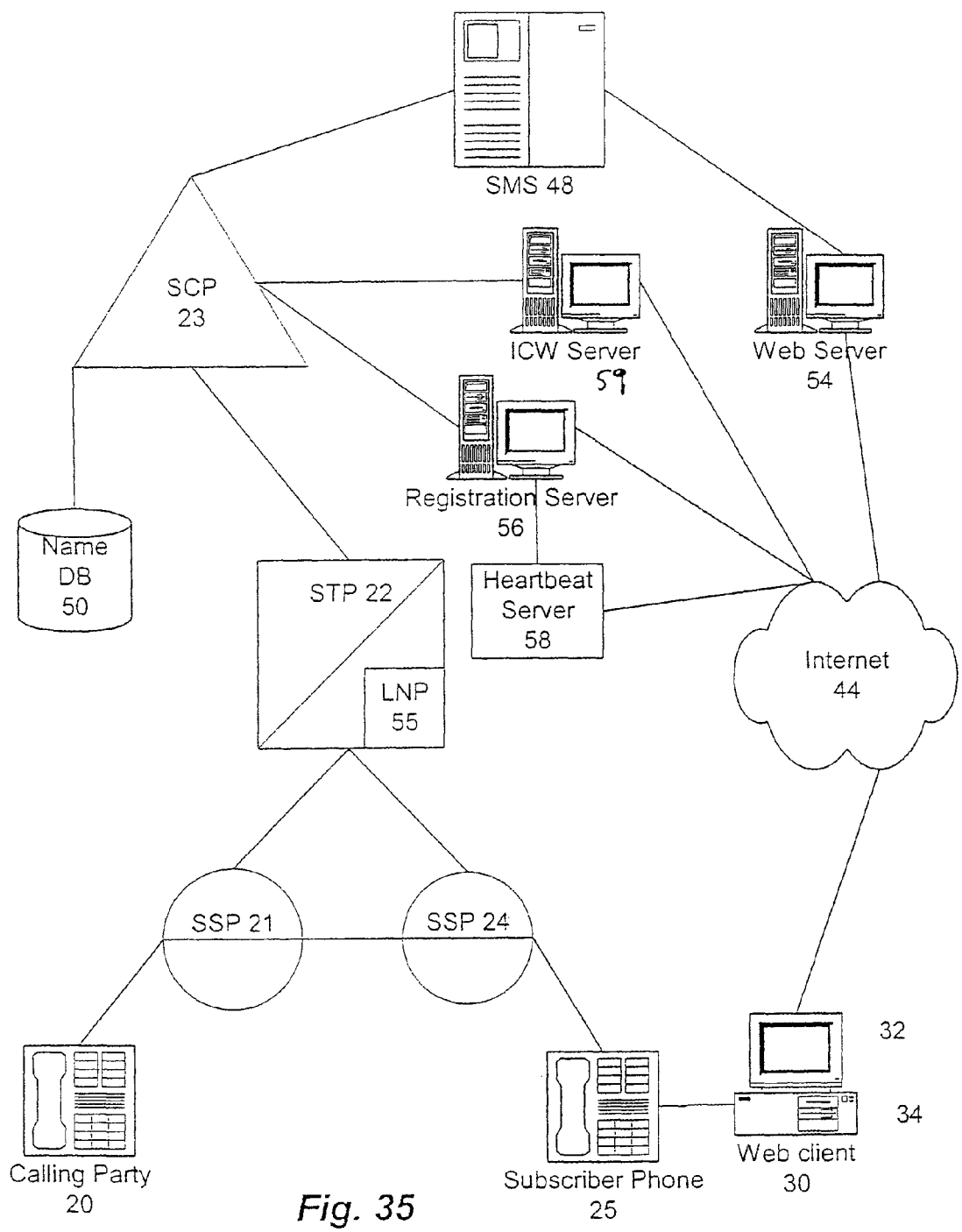
FIG. 35 is a block diagram showing an exemplary Intelligent Call Forwarding and ICID telecommunications network, according to an aspect of the present invention.

FIG. 35 illustrates an exemplary telecommunications network of the present invention, including ICID, in an alternative embodiment of the invention. As in FIG. 23, the network of FIG. 35 includes a calling party 20, an originating SSP 21, a terminating SSP 24, a subscriber telephone 25, an SMS 48, an STP 22 and an SCP 23, examples of which have been previously described. The network also includes a local number portability (LNP) database 55, a registration server (RS) 56, a heartbeat server 58 and an Internet Call Waiting (ICW) server 61. An associated data network of the invention includes a web client 30 and a web server 54, connectable through the Internet 44. The web client 30 includes a PC 32 operating client software 34.

Generally, Intelligent Call Forwarding enables a subscriber to direct incoming calls to alternative telephone numbers, both when the subscriber telephone 25 is busy or not busy. In an embodiment, Intelligent Call Forwarding further includes several optional features that the subscriber customizes. Among these features is a weekly scheduler, which enables the subscriber to construct a weekly schedule of multiple times for activating and deactivating Intelligent Call Forwarding, as well as any features associated with Intelligent Call Forwarding. For example, the scheduler indicates the times at which the priority screening list and screening rejection list are ON/OFF, which times do not necessarily correspond to the Intelligent Call Forwarding service activation. The scheduler also designates the telephone numbers to which calls are to be forwarded corresponding to the various services and their various ON/OFF times. The scheduler is implemented through a tod/dow table, which is stored at the SCP 23 and accessible by the subscriber via the Internet 44.

The priority screening list is available for use at the subscriber's option. The list contains the names and telephone numbers of priority callers, as designated by the subscriber. In an embodiment, if the priority screening list has been activated, the SCP 23 will only process calls originating from phone numbers included in the list. All other calls are terminated at the subscriber telephone 25. The processing includes either sending a message to the subscriber engaged in the Internet session, notifying the subscriber of the priority caller, or forwarding the priority callers to a priority, alternative telephone number, where they hear a voice announcement and are provided the option to leave a message. The priority screening list is implemented through a screening table, which is stored at the SCP 23 and accessible by the subscriber via the Internet, as discussed in detail below.

Similarly, the rejection screening list is available for use at the subscriber's option. This list contains the names and telephone numbers of callers from which the subscriber does not want to accept calls. If a number is on the rejection screening list, and the list is active, then the call is terminated at the subscriber telephone 25, or it is terminated to a directory number specifically reserved to respond to rejection screening list callers. In an embodiment, this alternative number provides a voice announcement and an option for the screened caller to leave a message. As in the case of the priority screening list feature, the rejection screening list is implemented through a rejection screening table, which is stored at the SCP 23 and accessible for update by the subscriber via the Internet 44 and the Web server 54.

Figure 36:
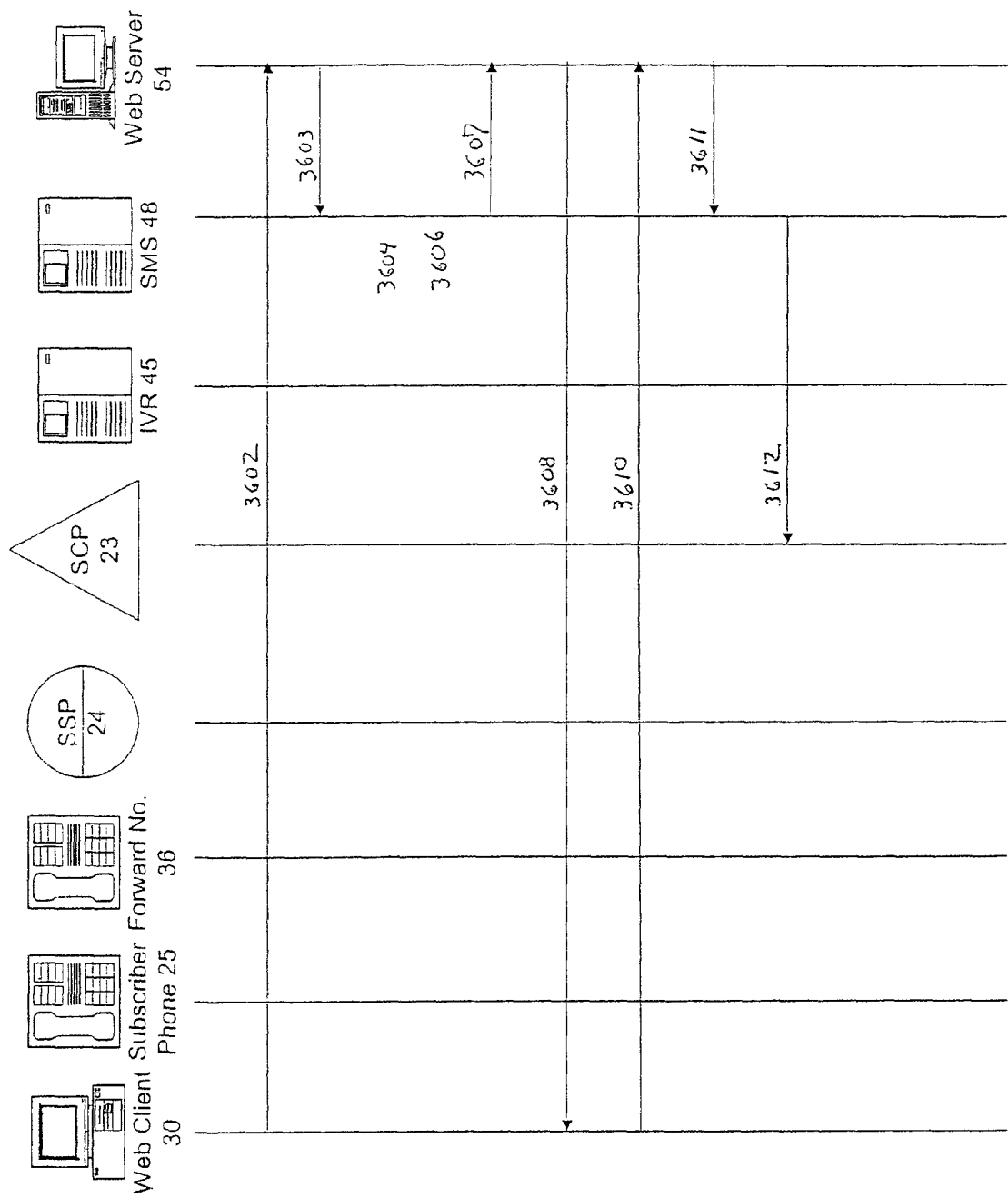
FIG. 36 is an exemplary call flow diagram in which the subscriber accesses the Intelligent Call Forwarding data via the Internet, according to an aspect of the present invention.

A subscriber's exemplary interaction with Intelligent Call Forwarding is depicted in the call flow diagram of FIG. 36. As with the Flexible Call Forwarding service, the subscriber is able to access the Intelligent Call Forwarding service via the Internet or IVR 45, thereby greatly increasing flexibility and convenience. FIG. 36 depicts interaction with Intelligent Call Forwarding over the Internet, using a GUI, which includes the more complicated procedures for customizing the service, such as building the screening lists and weekly schedules. In the Internet interface, the subscriber accesses a unique URL associated with the service provider to obtain the web screens of Intelligent Call Forwarding, provided by the SMS 48. In an embodiment, an alternative manner for accessing the Intelligent Call Forwarding data via the Internet is through the PCM service, described above.

As shown at step 3602 of FIG. 36, in order to access Intelligent Call Forwarding, the subscriber must log-on to the web server 54 from the web client 30 through the Internet 44. This step incorporates use of any compatible web browser, discussed above. Once on the Internet 44, the subscriber connects to the web server 54, which receives HTTP messages from the subscriber web client 30 and provides HTML web pages in response to the subscriber's input. The web pages relate to the subscriber's Intelligent Call Forwarding service.

Once connected to the web server 54, the user must provide authentication information to access the corresponding account, through the web server 54 at step 3603. The SMS 48 performs the authentication. After receiving the account number and associated PIN from the subscriber via the web server 54, the SMS 48 retrieves the authentication data at step 3604 to confirm that the subscriber is an authorized user.

After successful authentication, the SMS 48 retrieves at step 3606 the current service data for Intelligent Call Forwarding, including current screening lists and weekly schedules. The SMS 48 transmits the information, along with a list of additional services and phone numbers, if any, corresponding to the subscriber, to the web server 54 at step 3607. The web server 54 forwards the information to the web client 30 at step 3608, via the Internet 44. The subscriber is presented with a number of options for each telephone number in the account. For example, the subscriber can change the PIN, enter the forwarding directory number, toggle the Intelligent Call Forwarding service ON or OFF, and activate or deactivate the priority screening list, the rejection screening list and the weekly schedule. In addition, the subscriber can build or edit the priority screening lists and weekly schedules. Once the changes have been entered by the subscriber and forwarded to the web server 54 at step 3610, the web server 54 forwards the updated data to the SMS 48 at step 3611. The SMS 48 stores the data and also updates the SCP 23 at step 3612 for implementation.

Figure 37:
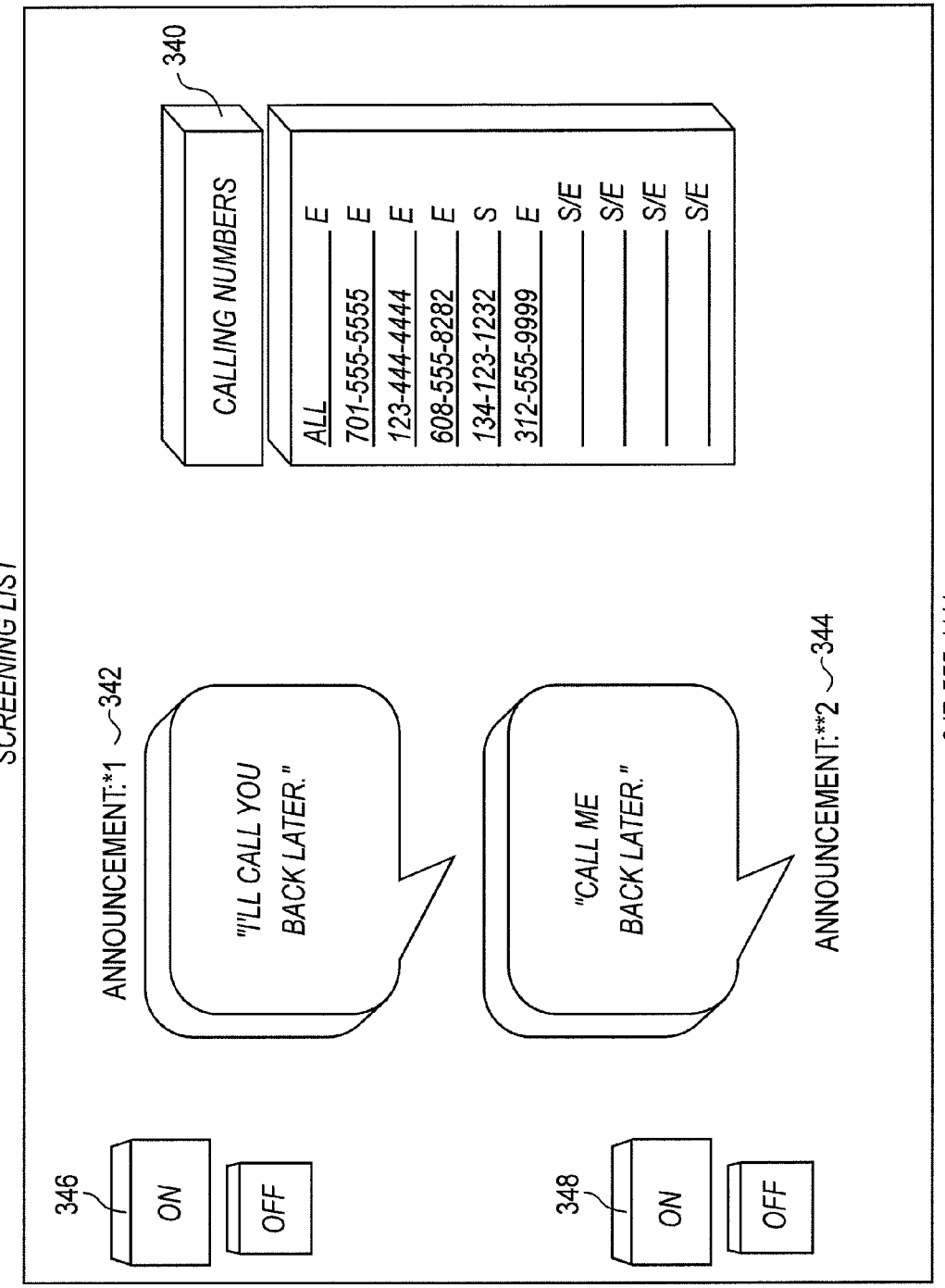
FIG. 37 is an exemplary web page to be displayed at the user's PC showing a rejection screening list for Intelligent Call Forwarding, according to an aspect of the present invention.

The web pages and associated prompts for input by the subscriber are similar to those shown in FIGS. 25-31 in reference to Flexible Call Forwarding. In addition, FIG. 37 depicts an exemplary web page related to the rejection screening list (which may also be included in the Flexible Call Forwarding service). The web page is displayed on the monitor of PC 32 at the web client 30 and includes the subscriber's telephone number 350, which in this example is 847-555-1111. The subscriber may enter the telephone numbers of calls to be accepted and rejected by building the priority and rejection screening lists, respectively. Box 340 of FIG. 37 shows various directory numbers that the subscriber has identified for special treatment. It also contains the ALL calling numbers options, which when selected by the subscriber, causes the Intelligent Call Forwarding service to process all incoming calls to the subscriber's phone number 350 the same.

In this example, the calling numbers on the subscriber's priority screening list are indicated by a single asterisk and calling numbers on the rejection screening list are indicted by double asterisks. In an embodiment of the invention, the calling numbers on the screening lists can be highlighted in different colors, for example, to aid the subscriber in visually distinguishing priority calling number from rejection calling numbers. The subscriber can then select the announcement to be played for each screening list. In this example, announcement 342, i.e., "I'll call you back later," is played in response to calling numbers on the priority screening list and announcement 344, i.e., "Call me back later," is played in response to calling numbers on the rejection screening list. The ON/OFF icons 346 and 348 activate and deactivate the announcements 342 and 344, respectively. As in all embodiments of the invention, the activation and deactivation may be accomplished by the GUI at web client 30 via the Internet or by DTMF touch tones or voice interaction through a telephone in conjunction with the IVR 45 via the PSTN.

Of course, numerous other options are available to the subscriber, such as message playback language. The "S" and "E" indicators show that the message will be played in Spanish and English, respectively. Other languages are of course possible. Moreover, the subscriber may elect to be notified at the web client 30 of calls from numbers on the priority screening list during the Internet session, while calls from numbers on the rejection screening list are not notified to the subscriber. Instead, the rejected calls may hear a busy signal or may be forwarded to a number or prerecorded message reserved for rejected calls. The exemplary web page of FIG. 31 also depicts a typical summary screen of the Intelligent Call Forwarding service.

Figure 38:
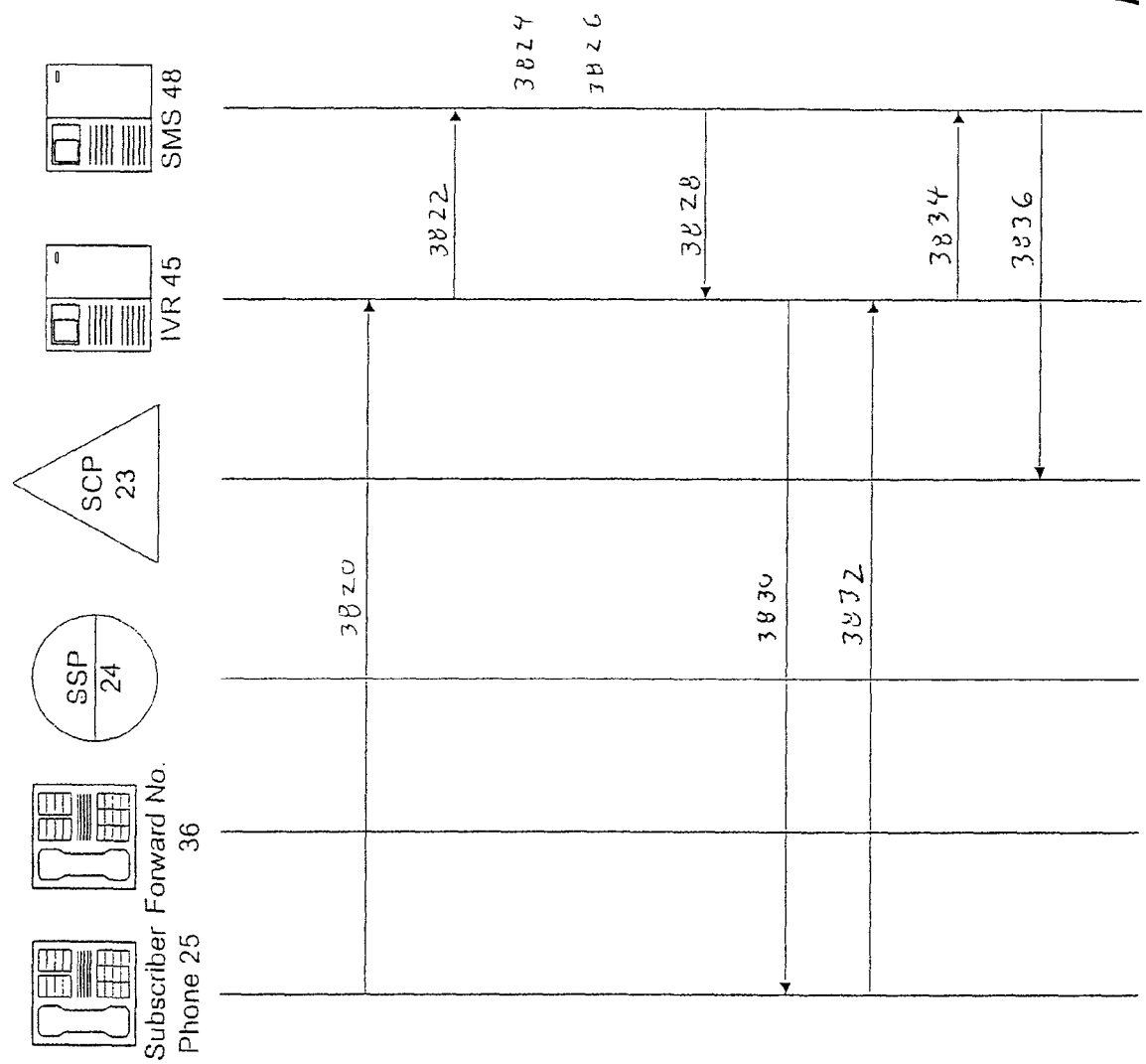
FIG. 38 is an exemplary call flow diagram in which the subscriber accesses Intelligent Call Forwarding data via an IVR, according to an aspect of the present invention.

The subscriber can alternatively interact with Intelligent Call Forwarding using the IVR 45, exemplary steps of which are shown in FIG. 38. Access through the IVR 45 is slightly limited in that the subscriber cannot actually build or edit screening lists and weekly schedules, in an embodiment of the invention. However, the subscriber can access all other features of Intelligent Call Forwarding, including changing the PIN, toggling the service ON or OFF, and activating/deactivating the priority screening list, the rejection screening list and the weekly schedule.

Referring to FIG. 38, the subscriber calls a toll free number from any telephone, which directly accesses the IVR 45 (or the SN/IP 57, if applicable), shown at step 3820. FIG. 38 depicts, as an example, the call originating from the subscriber telephone 25. The IVR 45 receives the call and initiates a request for various authentication information, including the account and PIN number. These numbers coincide with the account and PIN numbers used to access the Flexible Call Forwarding service via the Internet 44. The pre-programmed voice announcements for this aspect of the invention reside in the IVR 45, and implementation of the voice announcements is well known. The authentication information is provided using touch tones from the key pad of the subscriber telephone 25 or, when speech recognition functionality is available, speaking to the receiver of the subscriber telephone 25. The IVR 45 forwards the information to the SMS 48 at step 3822, which in turn verifies the authorization at step 3824. In an alternative embodiment involving speaker dependent speech recognition, the authentication may include identifying the subscriber's voice print at the IVR 45 (or SN/IP 57).

After verification, the system operates in much the same way as described above with respect to a GUI and the Internet. Specifically, the SMS 48 retrieves account information, including the status of Intelligent Call Forwarding service, at step 3826. At step 3828, the SMS 48 provides the account information to the IVR 45, which verbally recite a menu of options to the subscriber at step 3830 based on the information received from the SMS 48. For example, if the subscriber has previously built a priority screening list, activation of this list will be included among the options provided to the user over the telephone. The subscriber listens to the options and inputs various choices at step 3832 by depressing the touch tone keys or speaking into the telephone receiver. The choices may include, for example, turning on Intelligent Call Forwarding or selecting and activating a predefined priority screening list, rejection screening list or weekly schedule. The subscriber can also set the automatic-off function date and time.

The commands are forwarded from the IVR 45 to the SMS 48 at step 3834. The SMS 48 then updates the Intelligent Call Forwarding data contained in the SCP 23 at step 3836. Once the data is stored at the SCP 23, the Intelligent Call Forwarding service is set with respect to incoming calls, in accordance with the customizing instructions from the subscriber.

Once Intelligent Call Forwarding is customized and activated, it is implemented in much the same way as ICID, as described below. In an embodiment of the invention, a TAT is assigned to the subscriber's directory number or line, depending upon the type of switch. Once the trigger has been assigned and activated, every terminating call to the subscriber telephone 25 will cause the terminating SSP 24 to suspend the call and send an AIN query message, via the existing SS7 network and the appropriate STP 22, to the subscriber's serving SCP 23 for instructions. The SCP 23 stores a call processing record for each subscriber and requests information from the other network elements. In particular, the SCP 23 receives the TAT query from the SSP 24 and responds to the SSP 24 with routing instructions for calls to subscribers.

In one embodiment, as depicted in FIG. 35, the RS 56 receives registration requests from the client software 34 when the subscriber logs on to the Internet 44 and activates the service. The RS 56 stores information related to the subscriber's on-line Internet status. The RS 56 is the first database accessed by the SCP 23 during the processing of an Intelligent Call Forwarding or an ICID call. Based upon the information provided in a GetData query, the RS 56 returns a response containing information associated with requested data elements to the SCP 23. For example, the RS 56 responds to the GetData query from the SCP 23 with information about the subscriber's Internet session status. Alternatively, the SCP 23 itself can determine the subscriber's on-line Internet status.

A GetData query, sent via TCP/IP, includes an identifier, a service key, and a data element. The identifier indicates that the query is a GetData query, the service key contains an indication of the subscriber for which information is requested and, optionally, security information. The data element is the calling party's name being retrieved.

Additionally, the SCP 23 uses the name database 50 database to retrieve calling party name information associated with the calling party's telephone number for transmission to the subscriber. The interface between the name database 50 and the SCP 23 may be the Bellcore GetData query provided over the SS7 network. With this interface, the SCP 23 can receive data from the name database 50. To support the GetData query, the SCP 23 accesses the name database 50 with the directory number of the calling party in order to obtain the calling party name. Detailed information about the GetData interface may be obtained in Bellcore GR-2838-CORE, Generic Requirements for GetData, the disclosure of which is expressly incorporated by reference herein in its entirety. Alternatively, depending on the capabilities of the SCP 23, the calling party name can be stored and retrieved at the SCP 23 without an external database.

If it is determined that the subscriber is on-line, the SCP 23 queries the LNP database 55, in a known manner, to determine if the calling party number received in the TAT query has been ported. The telephone number received in a response from the LNP database 55 is used to determine the calling party name, when it is available.

In this embodiment of the invention, the ICW server 61 is the communications interface between the SCP 23 and the client software 34 at the web client 30. Specifically, the ICW server 61 receives information related to incoming calls from the SCP 23 and passes this information directly to the subscriber via TCP/IP utilizing the Internet 44. Further, the ICW server 61 passes de-registration requests from the client software 34 to a heartbeat server 58.

Additionally, the SCP 23 provides the ICW server 61 with the client software version number running on the subscriber's PC 32. Subsequently, the ICW server 61 determines if the subscriber has the latest version of the client software. If the ICW server 61 determines that the subscriber does not have the latest version of the client software, it notifies the subscriber that they need to update their client software. This notification is given when the ICW server 61 passes the caller identification information to the subscriber.

During the course of an active Internet session with the Intelligent Call Forwarding or the ICID service turned on, the client software 34 periodically transmits heartbeat messages via the Internet 44 utilizing TCP/IP to the heartbeat server 58, in one embodiment of the invention. In response, the heartbeat server 58 updates the RS 56 via TCP/IP with the subscriber's on-line status, and notifies the RS 56 in situations where there is an interruption of heartbeat messages from the client software 34, indicating a possible undesired disconnection of the Internet session. Additionally, if the subscriber currently connected to the Internet 44 elects to accept an incoming telephone call (as will be discussed later), the client software 34 sends a de-registration request, which is passed to the heartbeat server 58.

After the RS 56 receives a registration request from the client software 34, the RS 56 sends a heartbeat setup message to the heartbeat server 58 via TCP/IP to alert it to expect to receive heartbeat messages from the client. As a result, the heartbeat server 58 begins to receive keep-alive messages from the client after the registration is completed. If the client sends a keep-alive message that does not match the information in the heartbeat server 58 memory, then the heartbeat server 58 sends a registration database query to the RS 56 via TCP/IP. If the query results match the data received, the copy in memory is updated. If the results of the query do not match, the heartbeat server 58 opens a TCP/IP session to send a message instructing the client to re-register with the RS 56.

The interface between the SCP 23 and the RS 56 and between the SCP 23 and the ICW server 61 is, for example, the Bellcore GDI for TCP/IP. This interface provides the capability to send/receive transactions to and from external systems over TCP/IP using Transaction Capabilities Application Part (TCAP) messages. The SCP 23 can get data, send data, or invoke an application (InvokeApp) from a database such as the RS 56 or ICW server 61. More information may be obtained from Bellcore SR-3389, SCP Generic Data, Interface Specification for TCP/IP, Version 5.0, Issue 2, January 1997, the disclosure of which is expressly incorporated by reference herein in its entirety.

The client software 34 is the subscriber interface for the Intelligent Call Forwarding and the ICID services. As discussed above, the client software 34 permits the subscriber to turn the services ON and OFF, choose preset options, and select call disposition options. An InvokeApp message is used to invoke the applications on the ICW server 61 and to return the subscriber's selected disposition options. Additionally, the client software 34 provides a visual and audible alert to the subscriber of an incoming telephone call, sends Internet registration and de-registration requests, sends the subscriber's option selection to the ICW server 61, and sends heartbeat messages to the heartbeat server 58. An InvokeApp message, sent via TCP/IP, may include standard AIN parameters, well known in the art.

Figure 39:
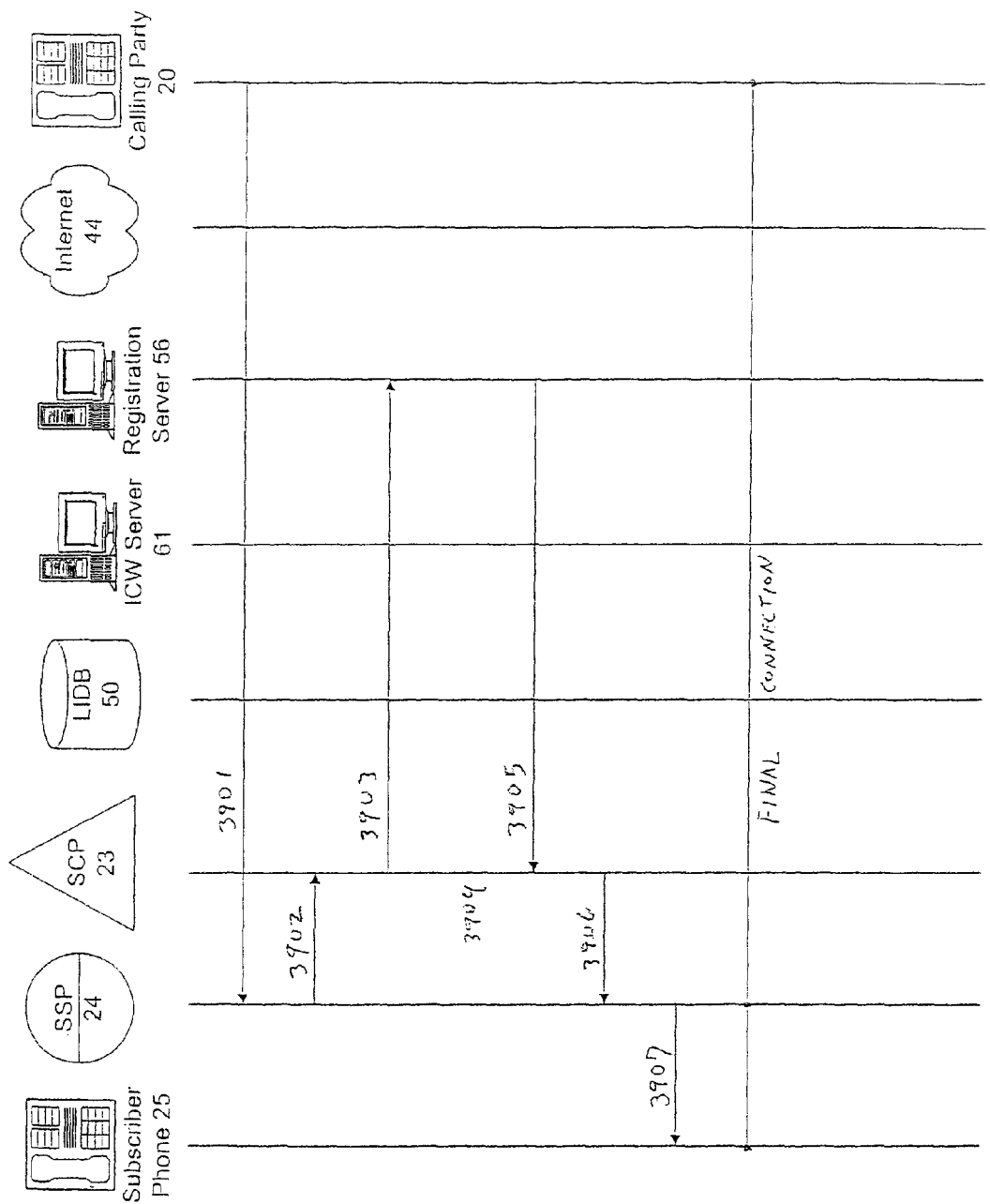
FIG. 39 is an exemplary call flow diagram in which Intelligent Call Forwarding and ICID have been deactivated, or no active Internet session exists, according to an aspect of the present invention.

The exemplary telecommunications network depicted in FIG. 35 handles incoming calls according to various options invoked by the subscriber, as depicted in exemplary call flow diagrams of FIGS. 39-46. FIG. 39 is a call flow diagram in which neither the Intelligent Call Forwarding nor the ICID service has been turned on, or in which no active Internet session exists, although in an embodiment, the Intelligent Call Forwarding service can be active even when there is no active Internet session. At step 3901, a telephone call is placed to the subscriber. A TAT in the terminating SSP 24 causes the call to be suspended at the SSP 24. The trigger also causes the SSP 24 to transmit an AIN query message including the calling party number (if available) and called party number via the SS7 network and the appropriate STP 22 to the subscriber's serving SCP 23 at step 3902. At step 3903, the SCP 23 sends a GetData query to the RS 56 with the called party's telephone number to request the on-line status of the subscriber. At step 3904, the SCP 23 sets a timer equal to a predetermined time, e.g., 2 seconds. In the event that the RS 56 does not respond within the predetermined time (indicating a timeout condition) or responds with an error, the SCP 23 sends an authorize termination response to the SSP 24. As a result, the SSP 24 terminates the suspended telephone call at the subscriber's line and the call may encounter features programmed on the line, e.g., call waiting.

If it is determined at the RS 56 that the subscriber is not currently on-line or has the services turned off, the RS 56 responds with a "0" at step 3905. The SCP 23 then sends an authorize termination response to the SSP 24 at step 3906, which terminates the call to the subscriber's telephone line at step 3907. As a result, a connection is made between the calling party and the subscriber. As the call attempts to terminate, it encounters any features programmed on the subscriber's telephone line, e.g., call waiting.

Figure 40:
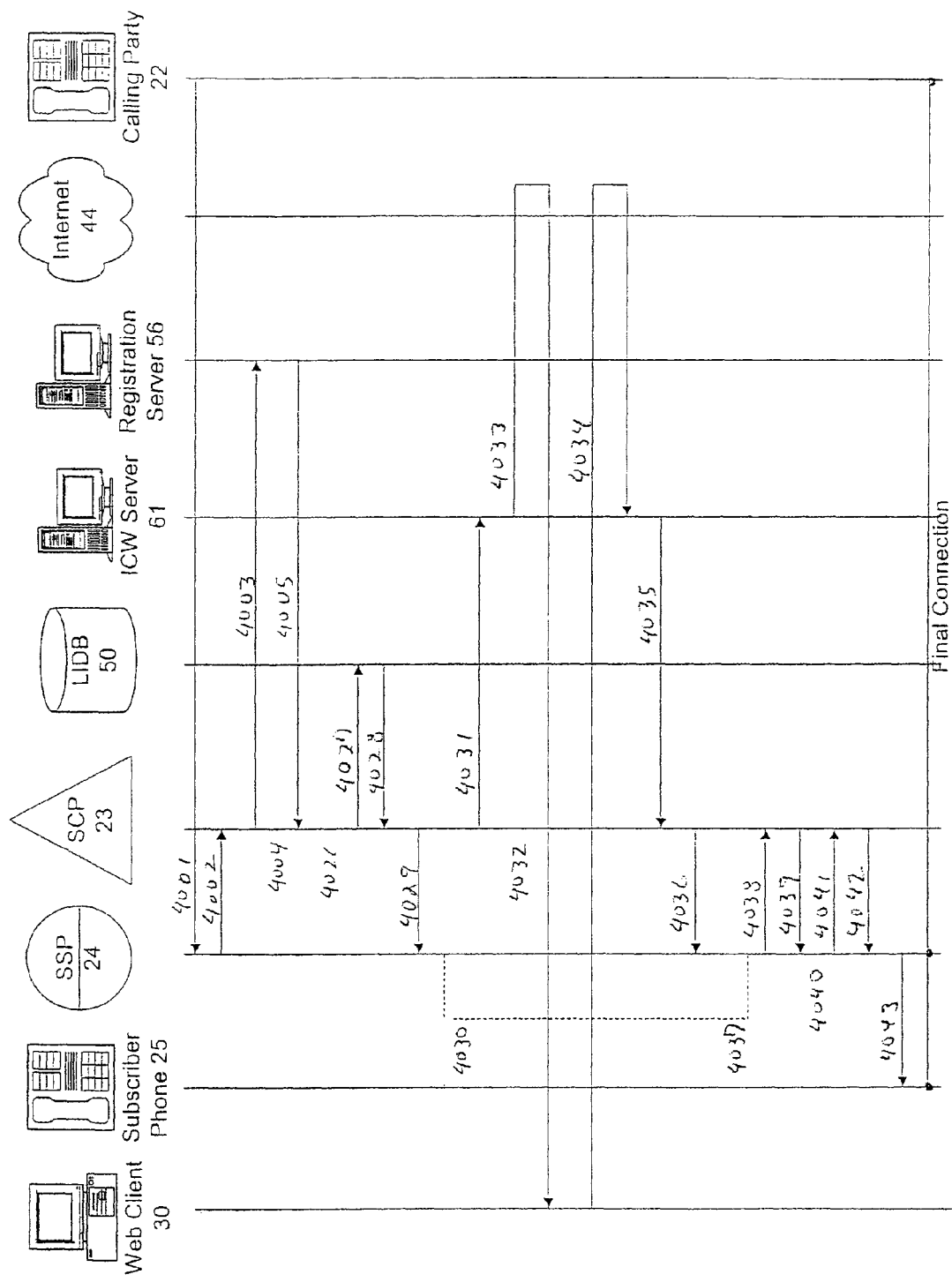
FIG. 40 is an exemplary call flow diagram in which the subscriber elects to accept the incoming telephone call, according to an aspect of the present invention.

FIG. 40 is a call flow diagram in which the subscriber elects to accept the incoming telephone call. The telephone call is placed by the calling party 20 and handled according to steps 4001-4004, described above. If the subscriber is on-line and the Intelligent Call Forwarding or the ICID service is active, the RS 56 responds with a "1" at step 4005. The RS 56 also responds with the IP address, port number and subscriber key information for the subscriber's Internet session.

At step 4026, a check is performed at the SCP 23 to confirm that the subscriber has voice mail service. Also, the SCP 23 determines whether the presentation restriction value is restricted or unavailable. If the presentation restriction value is restricted and the called party subscribes to the Anonymous Call Rejection (ACR) service, an authorize termination response is sent to the SSP 24 allowing the call to be rejected. ACR prevents calls to subscribers when a calling party blocks their number.

If the calling party number is delivered with the query and the presentation restriction indicator for the incoming call is allowed, the SCP 23 launches a query to the local number portability database 55 to determine whether the received calling party number is ported. The telephone number returned in the response is either equal to the calling party number sent in the query if the telephone number is not ported or the local routing number if the telephone number is ported. The telephone number from the response is used as the calling party number and checked against entries in a table to determine if the NPA-NXX belongs to a participating local exchange carrier (LEC). A participating LEC is one that provides data from its LIDB, or allows access to its LIDB.

If the calling party number is found to be a participating LEC, a GetData query is launched to the name database 50 at step 4027 to retrieve the calling party's name. If the calling party number was not delivered with the query, or there is no participating LEC, or the presentation restriction indicator for the incoming call is anonymous or unavailable, the SCP 23 will not launch a GetData query to the name database 50 to retrieve the calling party's name. In this event, the calling party name is null in the InvokeApp query to the ICW server 61. If available, the calling party's name is sent to the SCP 23 from the name database 50 at step 4028.

At step 4029, the SCP 23 instructs the SSP 24 to play a "please hold" announcement to the calling party to request the calling party to hold the line (step 4030). At step 4031, the SCP 23 sends an InvokeApp request to the ICW server 61. The request contains the called party number, the calling party number (if available and not presentation restricted), the calling party name (if available and not presentation restricted), an associated IP address, the port number, the client software version, and an indicator as to whether or not the subscriber has voice mail service.

At step 4032, the SCP 23 sets a timer equal to a predetermined time, e.g., 25 seconds. In the event that the ICW server 61 does not respond within the predetermined time (indicating a timeout condition) or responds with an error, the SCP 23 instructs the SSP 24 to stop playing the "please hold" announcement to the caller. Then, the SSP 24 begins playing an announcement to the caller or forwarding the call in accordance with the Intelligent Call Forwarding instructions. When voice mail is available, the message informs the caller that the call is being forwarded to a voice mail service. Lastly, the SCP 23 sends an authorize termination response to the SSP 24. If the subscriber does not have voice mail service, an error is reported and the SCP 23 sends an authorize termination response to the SSP 23. As a result, the SSP 23 terminates the suspended telephone call to the subscriber's telephone line and the call encounters any other features programmed on the line.

If no timeout occurs, at step 4033 the ICW server 61 sends a message via the Internet 44 to the subscriber, which appears on the subscriber's display at Web client 30, informing the subscriber of the incoming call and presenting the subscriber with disposition options for the call. The message displayed may be a pop-up dialog box.

At step 4034, the subscriber elects to accept the telephone call, and as a result, the client software 34 responds to the ICW server 61 with option 1 and will send a de-registration message to the RS 56, and begin to terminate the subscriber's Internet session. The ICW server 61 passes the subscriber's option 1 selection to the SCP 23 at step 4035. At step 4036, the SCP 23 instructs the SSP 24 to stop playing the "please hold" announcement to the caller. At step 4037, the "please hold" announcement is terminated by the SSP 24 and at step 4038, the SSP 24 sends a resource clear message to the SCP 23 confirming that the message is no longer playing. At step 4039, the SCP 23 instructs the SSP 24 to begin playing a "will take your call" announcement to the caller (step 4040). At step 4041, the SSP 24 sends a resource clear message to the SCP 23. At the conclusion of the "will take your call" announcement, the SCP 23 sends an authorize termination response to the SSP 24 which terminates the suspended call to the subscriber's telephone line (steps 4042-4043). That is, the calling party 20 is connected to the subscriber telephone 25.

Figure 41:
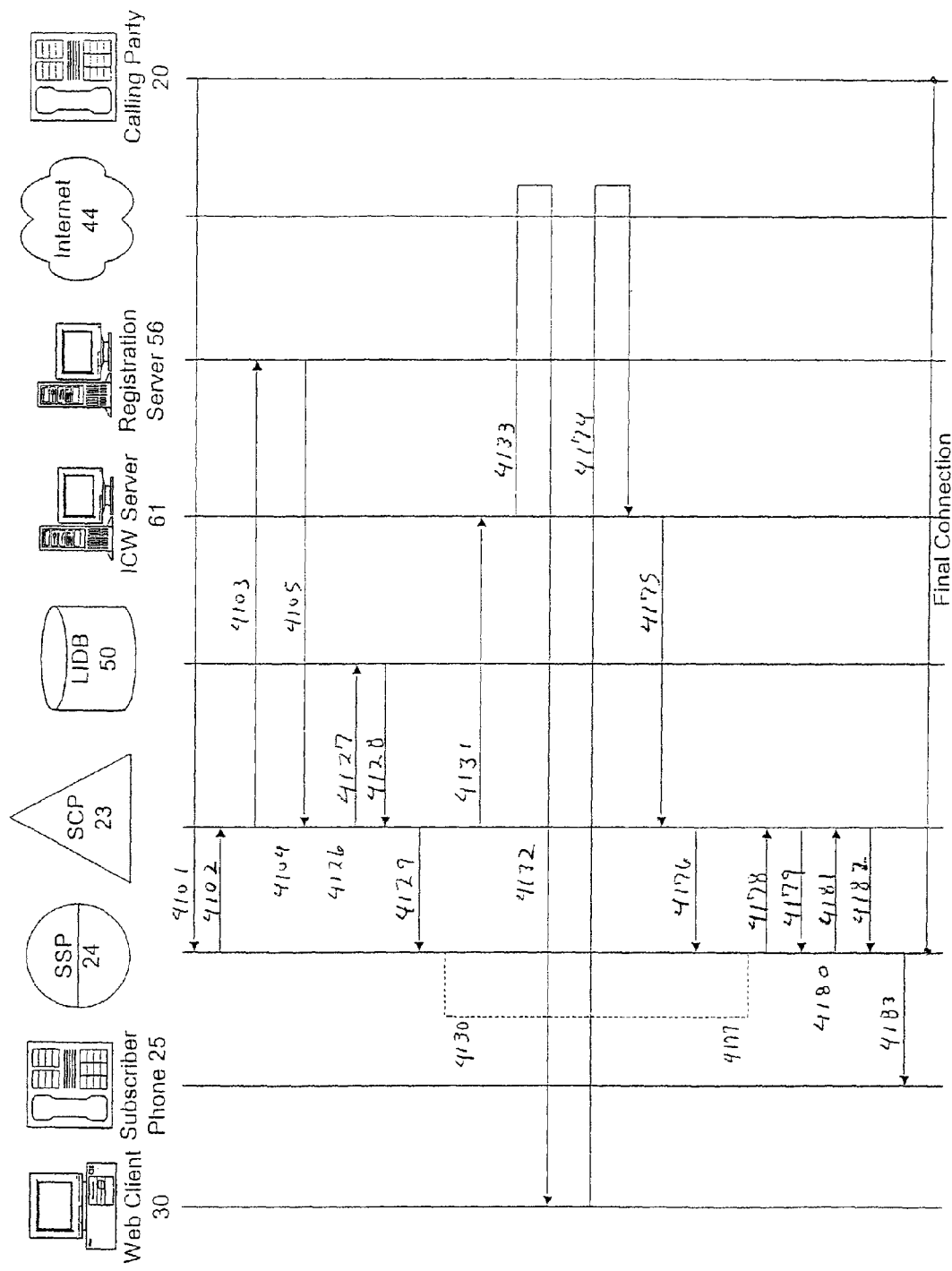
FIG. 41 is an exemplary call flow diagram in which the subscriber elects to forward the incoming telephone call to voice mail, according to an aspect of the present invention.

FIG. 41 is a call flow diagram in which the subscriber is on-line and elects to forward an incoming telephone call to voice mail service. The telephone call placed to the subscriber is processed at steps 4101-4133 in the same manner indicated by steps 4001-4033, discussed above. In response to the query from the ICW server 61 (at step 4133), the subscriber elects option 2 at step 4174 to send the incoming telephone call to voice mail service. As a result, the client software 34 responds to the ICW server 61 and will not terminate the subscriber's Internet session.

The ICW server 61 passes the subscriber's option 2 selection to the SCP 23 at step 4175. At step 4176, the SCP 23 instructs the SSP 24 to stop playing the "please hold" announcement to the caller. At step 4177, the "please hold" announcement is terminated by the SSP 24 and at step 4178, the SSP 24 sends a resource clear message to the SCP 23 confirming that the message is no longer playing. At step 4179, the SCP 40 instructs the SSP 24 to begin playing a "forwarding to voice mail service" announcement to the caller (step 4180). At step 4181, the SSP 24 sends a resource clear message to the SCP 23.

At the conclusion of the "forwarding to voice mail service" announcement, the SCP 23 sends an authorize termination response to the SSP 24 which terminates the suspended call to the subscriber's busy telephone line (steps 4182-4183). As the call attempts to terminate at the subscriber's line, the call encounters programming associated with voice mail service and the call is forwarded accordingly. Ultimately, the calling party is connected with the subscriber's voice mail box and has the option of leaving a message.

Figure 42:
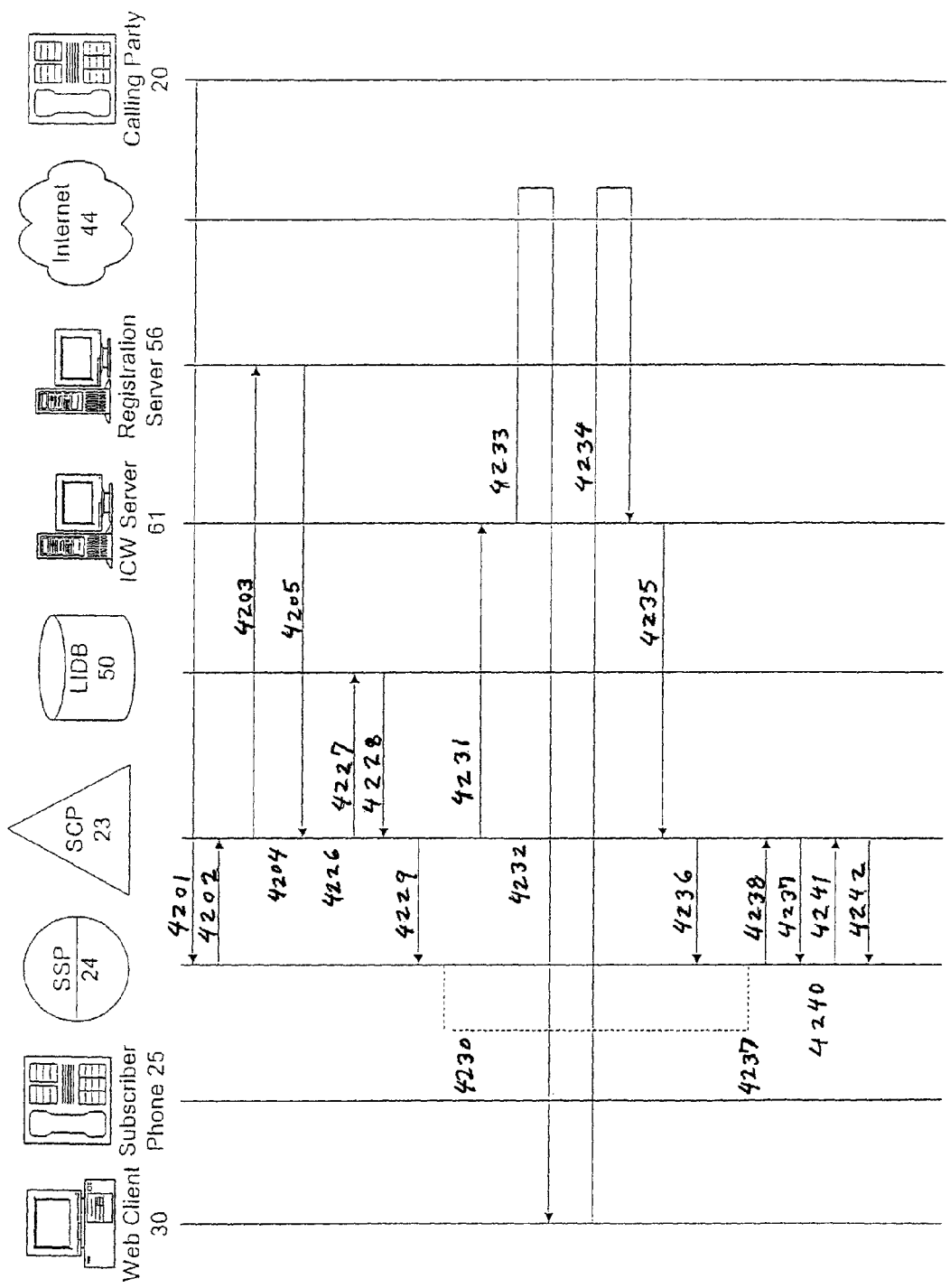
FIG. 42 is an exemplary call flow diagram in which the subscriber elects to play an announcement to the caller, according to an aspect of the present invention.

FIG. 42 is a call flow diagram in which the subscriber is on-line and elects to send an incoming telephone call to an announcement. The telephone call placed to the subscriber is processed at steps 4201-4233 in the same manner indicated by steps 4001-4033, discussed above. In response to the query from the ICW server 61, the subscriber elects to send the telephone call to an announcement at step 4234. As a result, the client software 34 responds to the ICW server 61 with the announcement selection number, which includes two choices. The first message that may be played advises the caller that the subscriber is busy and that the caller should call back later. The second option advises the caller that the subscriber is busy and that the subscriber will return the call to the caller at a later time.

The ICW server 61 passes the subscriber's selection to the SCP 23 at step 4235. At step 4236, the SCP 23 instructs the SSP 24 to stop playing the "please hold" announcement to the caller. At step 4237, the "please hold" announcement is terminated by the SSP 24 and at step 4238, the SSP 24 sends a resource clear message to the SCP 23 confirming that the message is no longer playing. At step 4239, the SCP 23 instructs the SSP 24 to begin playing the selected announcement (step 4240). At step 4241, the SSP 24 sends a resource clear message to the SCP 23. At the conclusion of the selected announcement, the SCP 23 instructs the SSP 24 to disconnect the call at step 4242.

Figure 43:
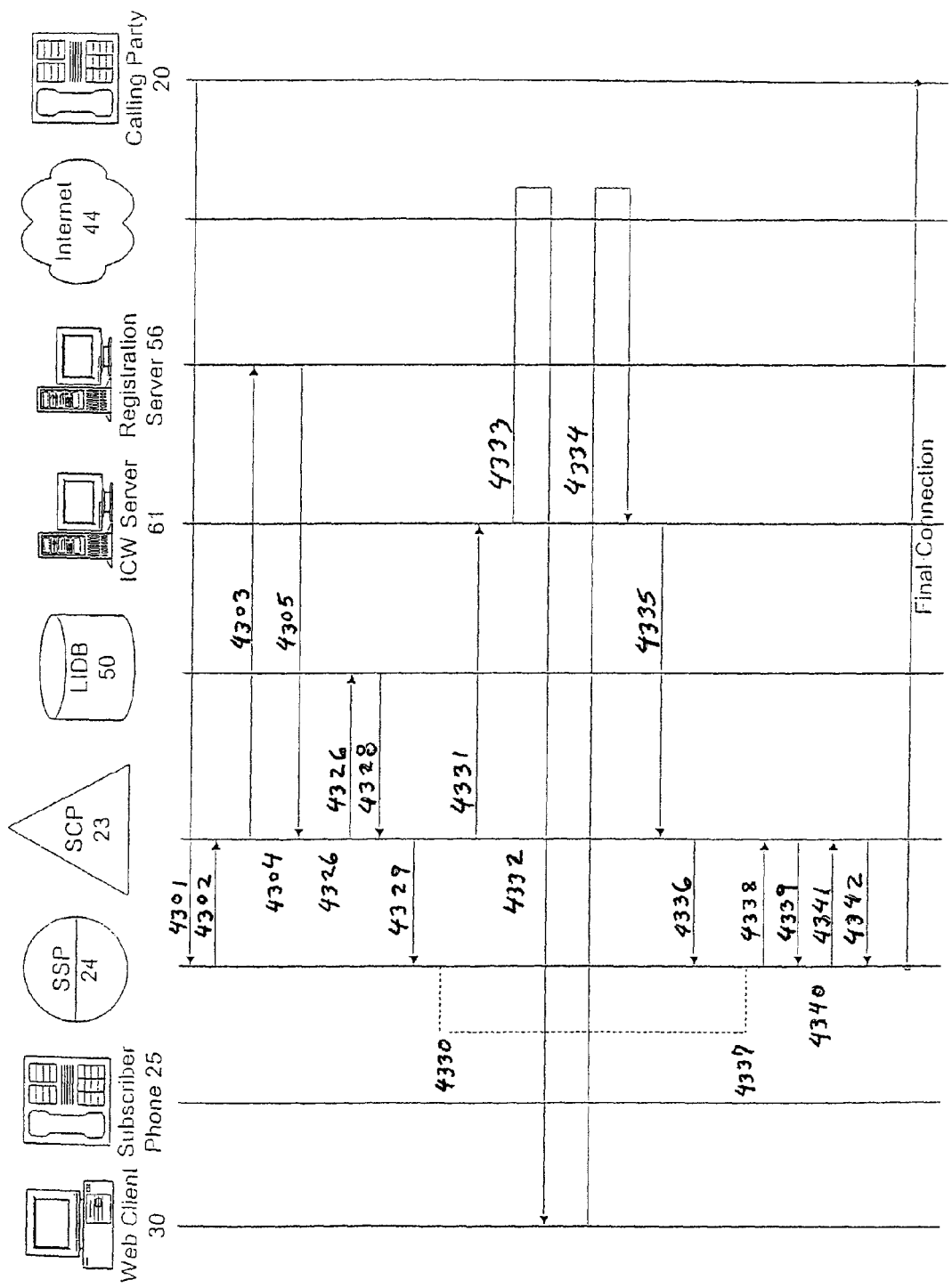
FIG. 43 is an exemplary call flow diagram in which the subscriber elects to redirect the incoming telephone call to an alternate telephone number, according to an aspect of the present invention.

FIG. 43 is a call flow diagram in which the subscriber is on-line and elects to forward an incoming telephone call to another telephone line. The telephone call placed to the subscriber is processed at steps 4301-4333 in the same manner indicated by steps 4001-4033, discussed above. In response to the query from the ICW server 61, the subscriber elects option 3 to redirect the call to another telephone number at step 4334. As a result, the client software 34 responds to the ICW server 61 with option 3 and a ten digit "forward to" telephone number as selected by the subscriber. The ICW server 61 passes the subscriber's option 3 selection and the selected ten digit "forward to" telephone number to the SCP 23 at step 4335.

At step 4336, the SCP 23 instructs the SSP 24 to stop playing the "please hold" announcement to the caller. At step 4337, the "please hold" announcement is terminated by the SSP 24 and at step 4338 the SSP 24 sends a resource clear message to the SCP 23 confirming that the message is no longer playing. At step 4339, the SCP 23 instructs the SSP 24 to begin playing a "forwarding to another number" announcement to the caller (step 4340). At step 4341, the SSP 24 sends a resource clear message to the SCP 23. At the conclusion of the "forwarding to another number" announcement, the SCP 23 sends a Forward Call response to the SSP 24 which initiates the process of forwarding the call to the specified telephone number (step 4342). Ultimately, the calling party is connected to the forwarded number through the SSP 24.

In FIGS. 41-43, if the subscriber does not respond to the query from ICW server 61, or if the RS 56 indicates that the subscriber is no longer on-line, the SCP 23 processes the incoming call in accordance with the subscriber's previously built and stored call forwarding data. In one embodiment of the invention, the subscriber can specifically choose to instruct the SCP 23 to process the call in accordance with previously built and stored call forwarding data, in response to the query from ICW server 61. Processing calls in accordance with previously built and stored call forwarding data is discussed in detail in regard to FIGS. 47-49, below.

Figure 44:
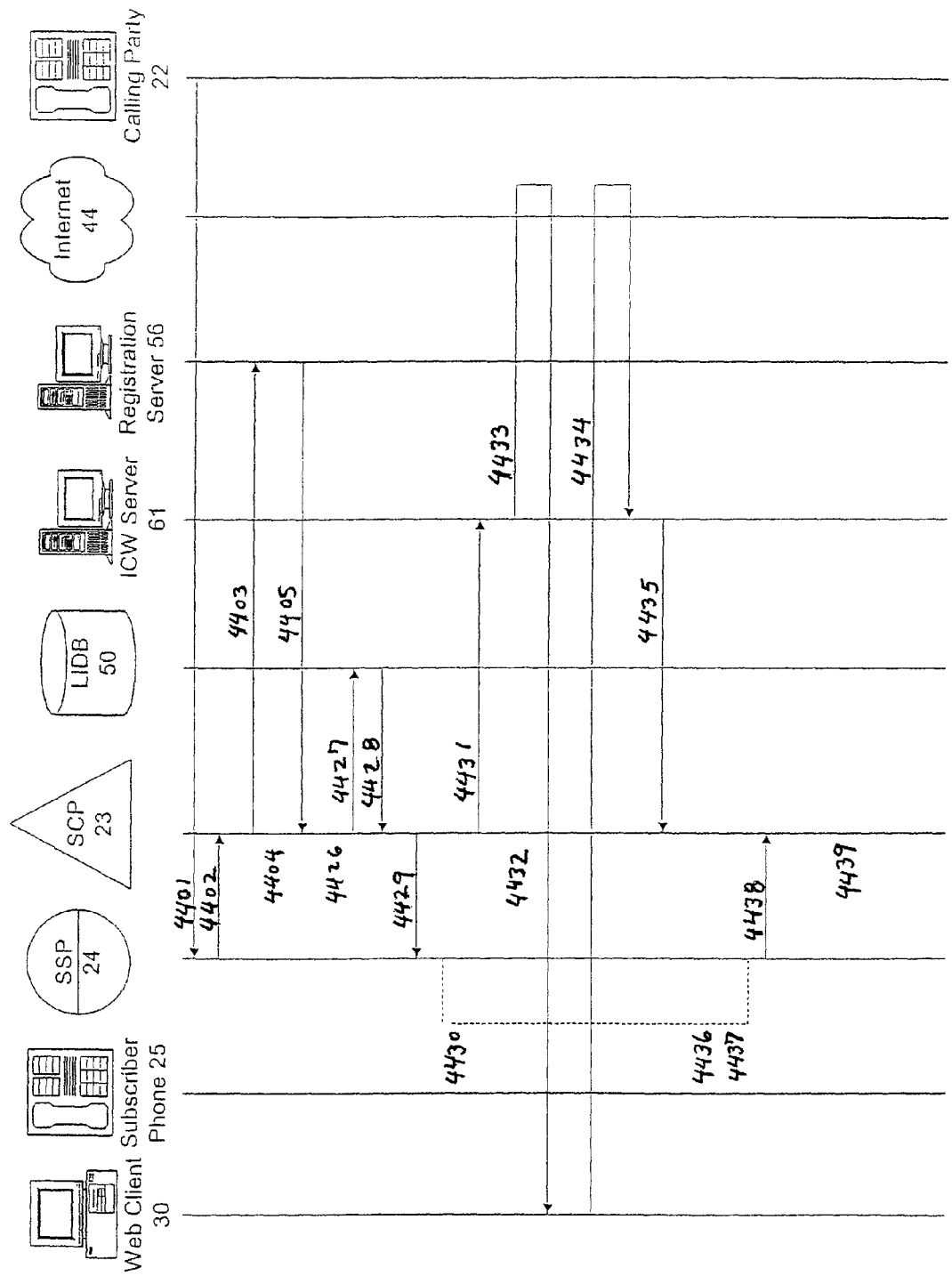
FIG. 44 is an exemplary call flow diagram in which the calling party abandons the telephone call to the subscriber after a response from the web server, according to an aspect of the present invention.

FIG. 44 is a call flow diagram in which the caller abandons a telephone call after a response from the ICW server 61. The telephone call placed to the subscriber is processed at steps 4401-4433 in the same manner indicated by steps 4001-4033, discussed above. In response to the query from the ICW server 61, the subscriber elects a call disposition option described herein in order to control the incoming telephone call. As a result, the client software 34 responds to the ICW server 61 with the option at step 4434. The ICW server 61 passes the subscriber's option selection to the SCP 23 at step 4435.

At step 4436, the caller abandons the telephone call by hanging up, in which case the SSP 24 stops playing the "please hold" announcement to the caller at step 4437 and at step 4438, the SSP 24 sends resource clear message to the SCP 23 due the abandonment of the telephone call by the caller. At step 4439, the SCP 23 terminates call processing record (CPR) processing.

Figure 45:
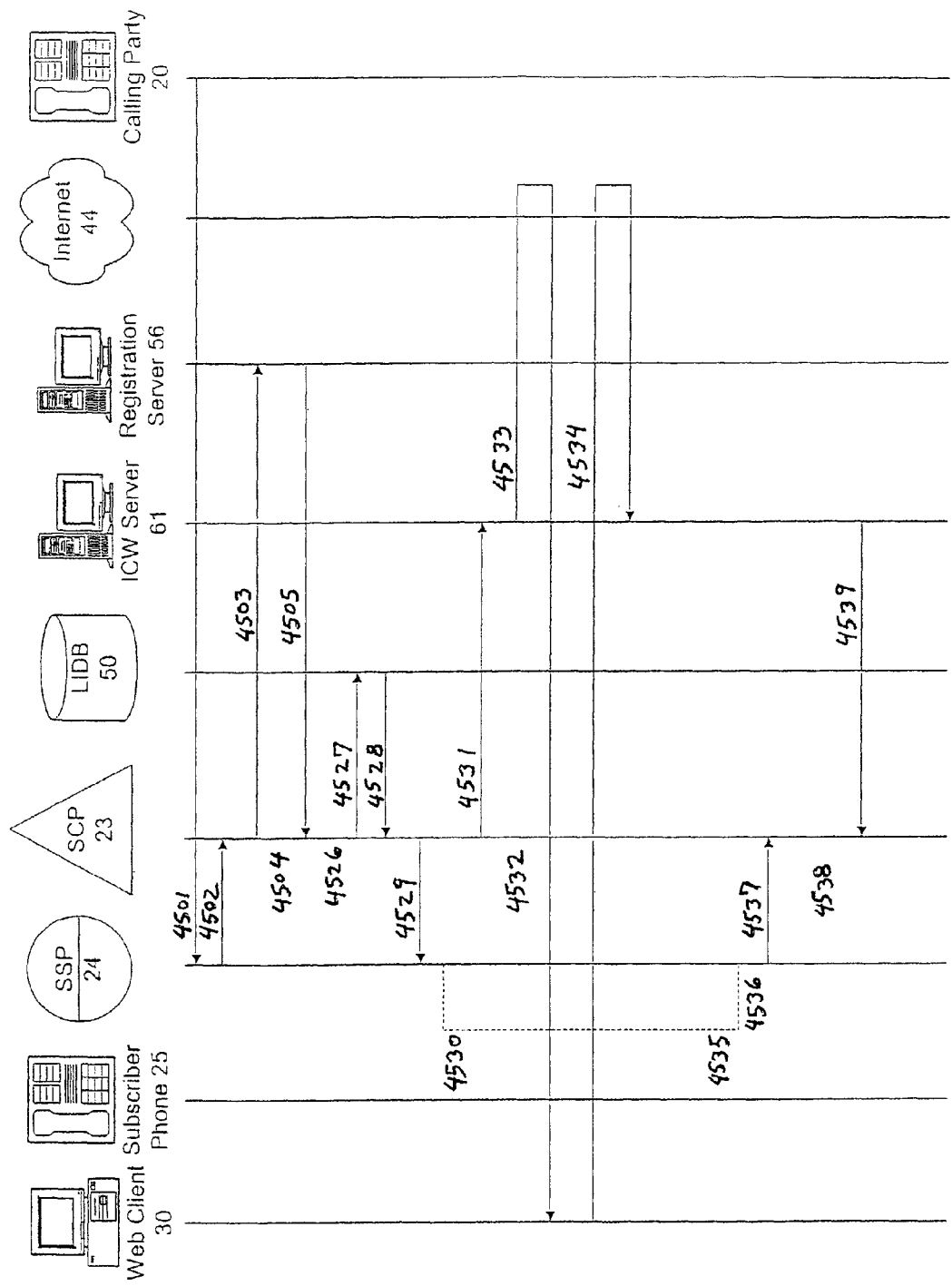
FIG. 45 is an exemplary call flow diagram in which the calling party abandons the telephone call to the subscriber before receiving a response from the web server, according to an aspect of the present invention.

FIG. 45 is a call flow diagram in which the caller abandons the telephone call before a response from the ICW server 61 is received. The telephone call placed to the subscriber is processed at steps 4501-4533 in the same manner indicated by steps 4001-4033, discussed above. In response to the query from the ICW server 61, the subscriber elects a call disposition option to control the call at step 4534. As a result, the client software 34 responds to the ICW server 61 with the selected option. At step 4535, the caller abandons the telephone call by hanging up, in which case the SSP 24 stops playing the "please hold" announcement to the caller at step 4536 and at step 4537, the SSP 20 sends a resource clear message to the SCP 23 due the abandonment of the telephone call by the caller. At step 4538, the SCP 23 terminates CPR processing, ignoring any responses from the ICW server 61 related to this disconnected call at step 4539.

In an alternative embodiment of the invention, as depicted in FIG. 23, a service node (e.g., the SN/IP 57) essentially replaces the combination of the ICW server 61, the RS 56 and the heartbeat server 58. In particular, whenever the subscriber connects to the Internet 44, the SN/IP 57 is automatically notified of the on-line status. The SN/IP 57 contemporaneously forwards the subscriber's on-line status to the SCP 23, regardless of whether a call to the subscriber's number is being processed. The SCP 23 stores the on-line status data in conjunction with the other data related to the subscriber. The data is stored as a YES indication in the subscriber Internet provider (SIP) field. Likewise, when the subscriber exits the Internet session, the SN/IP 57 is notified that the subscriber is no longer on-line. The SN/IP 57 likewise transmits this information to the SCP 23, which changes the SIP indication to NO. Therefore, when a telephone call to the subscriber telephone 25 is processed according to the embodiment depicted in FIG. 23, the SCP 23 determines the on-line status without having to query an external server.

Figure 46:
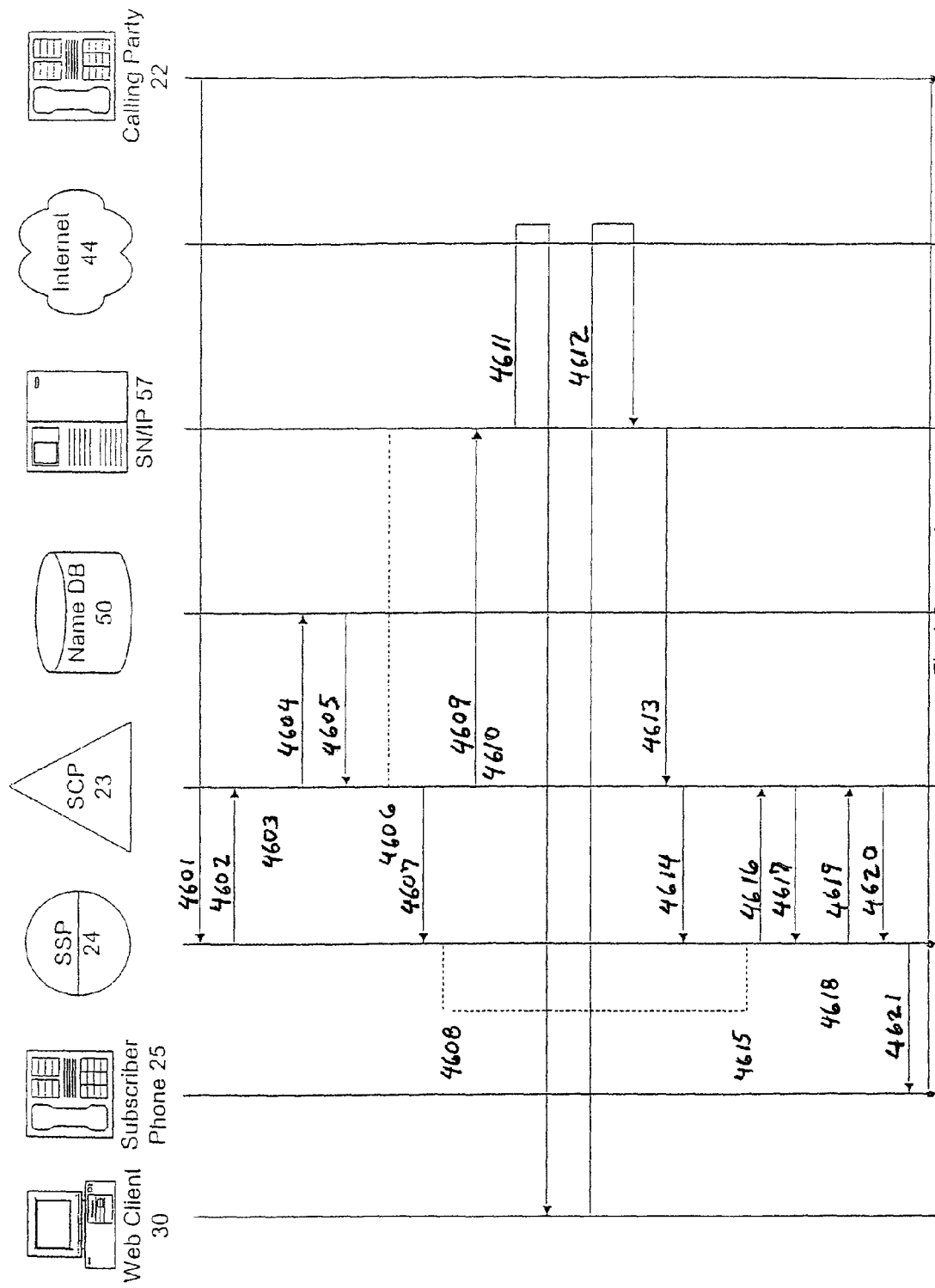
FIG. 46 is an exemplary call flow diagram of an alternative embodiment of the invention, in which the subscriber elects to accept the incoming telephone call.

FIG. 46 is a call flow diagram depicting the process by which the subscriber elects to accept the incoming telephone call, according to the embodiment of FIG. 23. At step 4601, a telephone call is placed by the calling party 20 to the subscriber telephone 25. A TAT in the terminating SSP 24 causes the call to be suspended at the SSP 24. The trigger also causes the SSP 24 to transmit an AIN query message including the calling party number (if available) and called party number via the SS7 network and the appropriate STP 22 to the subscriber's serving SCP 23 at step 4602. At step 4603, a check is performed at the SCP 23 to confirm that the subscriber has voice mail service. Also, the SCP 23 determines whether the presentation restriction value is restricted or unavailable. If the presentation restriction value is restricted and the called party subscribes to the ACR service, an authorize termination response is sent to the SSP 24 allowing the call to be rejected. ACR prevents calls to subscribers when a calling party blocks their number.

If the calling party number is delivered with the query and the presentation restriction indicator for the incoming call is allowed, the SCP 23 launches a query to an LNP database (not pictured), for example, to determine whether the received calling party number is ported. The telephone number returned in the response is either equal to the calling party number sent in the query if the telephone number is not ported or the local routing number if the telephone number is ported. The telephone number from the response is used as the calling party number and checked against entries in a table to determine if the NPA-NXX belongs to a participating LEC.

If the calling party number is found to be a participating LEC, a query is launched to the name database 50 at step 4604 to retrieve the calling party's name. The name database 50 can be, for example, an external LIDB or a local real-time database servicing the SCP 23. If the calling party number was not delivered with the query, or there is no participating LEC, or the presentation restriction indicator for the incoming call is anonymous or unavailable, the SCP 23 will not launch the query to the name database 50 and the SSP 24 terminates the suspended telephone call at the subscriber's line. If available, the calling party's name is sent to the SCP 23 from the name database 50 at step 4605.

At step 4606, the SCP 23 determines the on-line status of the subscriber. As discussed above, this information is previously provided by the SN/IP 57 to the SCP 23. Therefore, the SCP 23 simply retrieves the on-line status data from it subscriber database. If the subscriber is not currently on-line, the SCP 23 sends an authorize termination response to the SSP 24, which terminates the call to the subscriber's telephone line. However, if the subscriber is on-line, as shown in FIG. 46, the SCP 23 instructs the SSP 24 to play a "please hold" announcement to the calling party at step 4607 to request the calling party to hold the line (step 4608).

At step 4609, the SCP 23 sends an SIP invite to the SN/IP 57. The SIP invite contains the called party number, the calling party number (if available and not presentation restricted), the calling party name (if available and not presentation restricted), the IP address, the port number, the client software version, an indicator as to whether or not the subscriber has voice mail service and a session key. At step 4610, the SCP 23 sets a timer equal to a predetermined time, e.g., 25 seconds. In the event that the SN/IP 57 does not respond within the predetermined time (indicating a timeout condition) or responds with an error, the SCP 23 instructs the SSP 24 to stop playing the "please hold" announcement to the caller. Then, the SSP 24 begins playing an announcement to the caller or forwarding the call in accordance with the Intelligent Call Forwarding instructions. When voice mail is available, the message informs the caller that the call is being forwarded to a voice mail service. Lastly, the SCP 23 sends an authorize termination response to the SSP 24. If the subscriber does not have voice mail service, an error is reported and the SCP 23 sends an authorize termination response to the SSP 23. As a result, the SSP 23 terminates the suspended telephone call to the subscriber's telephone line and the call encounters any other features programmed on the line.

If no timeout occurs, at step 4611, the SN/IP 57 sends a message via the Internet 44 to the subscriber, which appears on the subscriber's display at the web client 30, informing the subscriber of the incoming call and presenting the subscriber with disposition options for the call. The message displayed may be a pop-up dialog box.

At step 4612, the subscriber elects to accept the telephone call, and as a result, the client software 34 responds to the SN/IP 57 with an OK message encrypted with the session key. In response, the SN/IP 57 initiates termination of the subscriber's Internet session. The SN/IP 57 also passes the subscriber's selection to accept the incoming call to the SCP 23 at step 4613. At step 4614, the SCP 23 instructs the SSP 24 to stop playing the "please hold" announcement to the caller. At step 4615, the "please hold" announcement is terminated by the SSP 24 and at step 4616 the SSP 24 sends a resource clear message to the SCP 23 confirming that the message is no longer playing.

At step 4617, the SCP 23 instructs the SSP 24 to begin playing a "will take your call" announcement to the caller (step 4618). At step 4619, the SSP 24 sends a resource clear message to the SCP 23. At the conclusion of the "will take your call" announcement, the SCP 23 sends an authorize termination response to the SSP 24 which terminates the suspended call to the subscriber's telephone line (steps 4620-4621). That is, the calling party 20 is connected to the subscriber telephone 25.

In comparison to FIG. 40, which is the call flow when the subscriber elects to accept an incoming call while on-line, according to the embodiment of FIG. 35, FIG. 46 differs only through step 4610. After step 4610, the embodiments are substantially the same. Therefore, substitution of steps 4601 through 4610 in the call flows of FIGS. 39-45 produces a corresponding call flow diagram depicting the embodiment of FIG. 23. These alternative call flows will therefore not be repeated herein to avoid redundancy.

Figure 47:
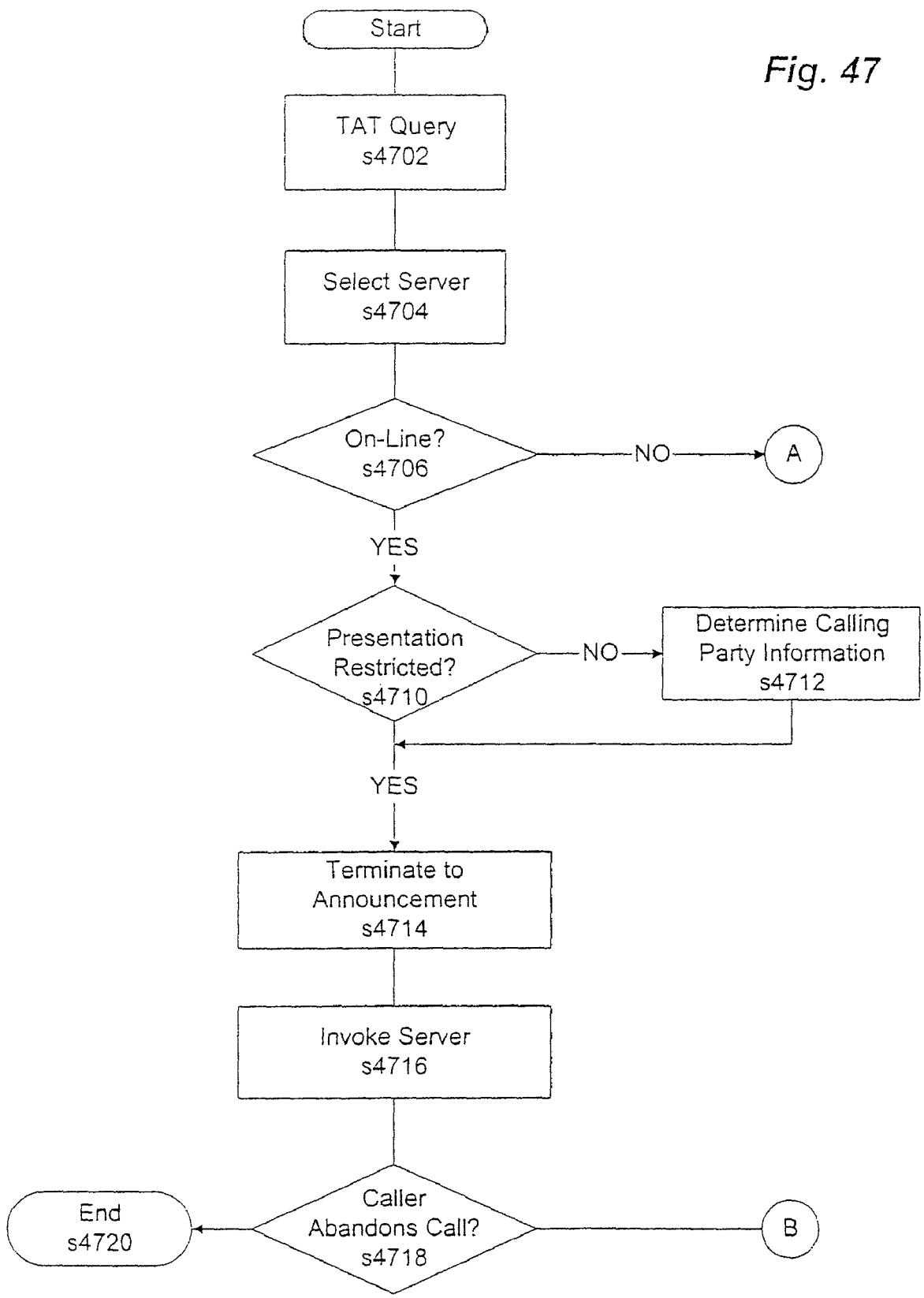
FIG. 47 is a flowchart of exemplary SCP service logic for Intelligent Call Forwarding and ICID, according to an aspect of the present invention.
Figure 48:
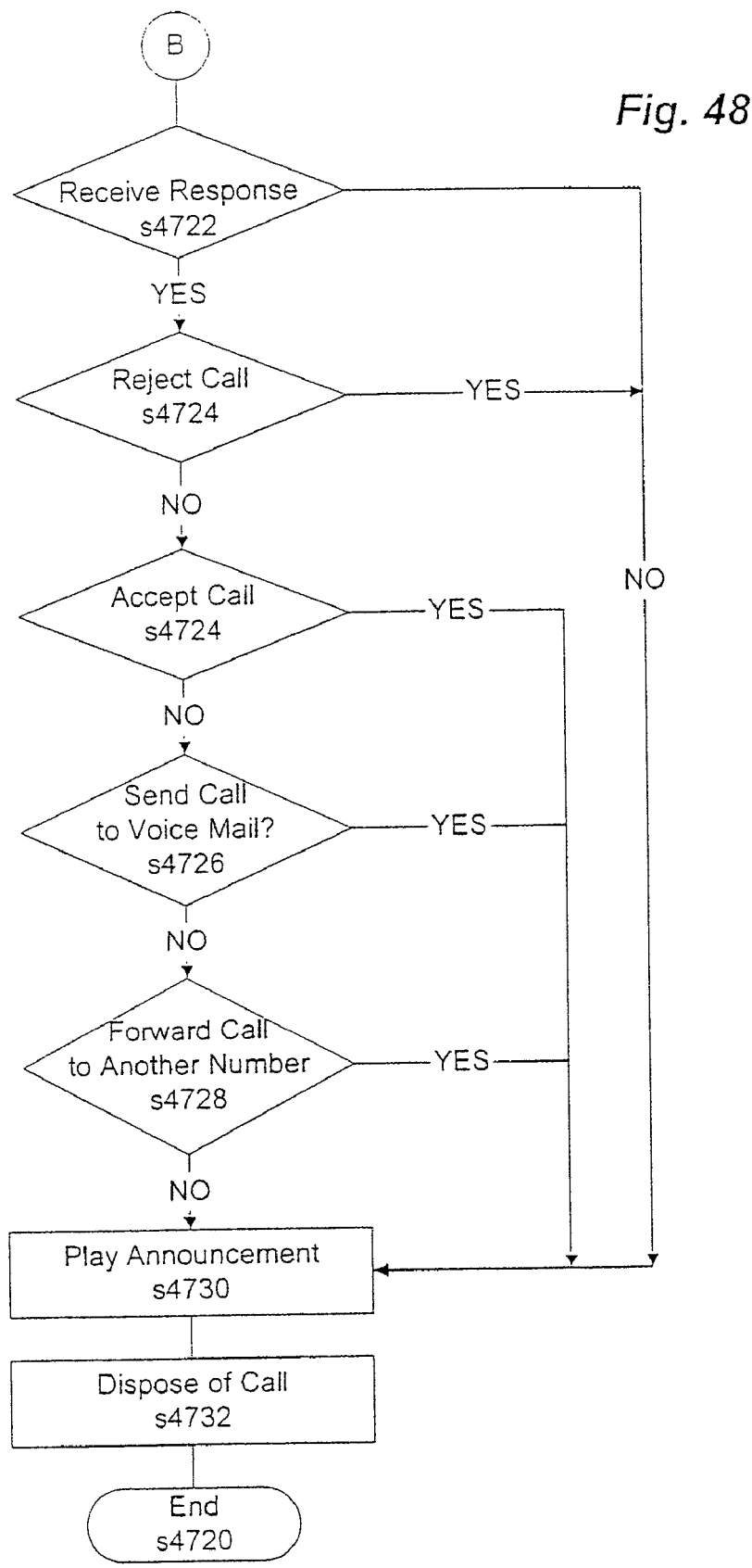
FIG. 48 is a continuation of the exemplary flowchart diagram of FIG. 47.
Figure 49:
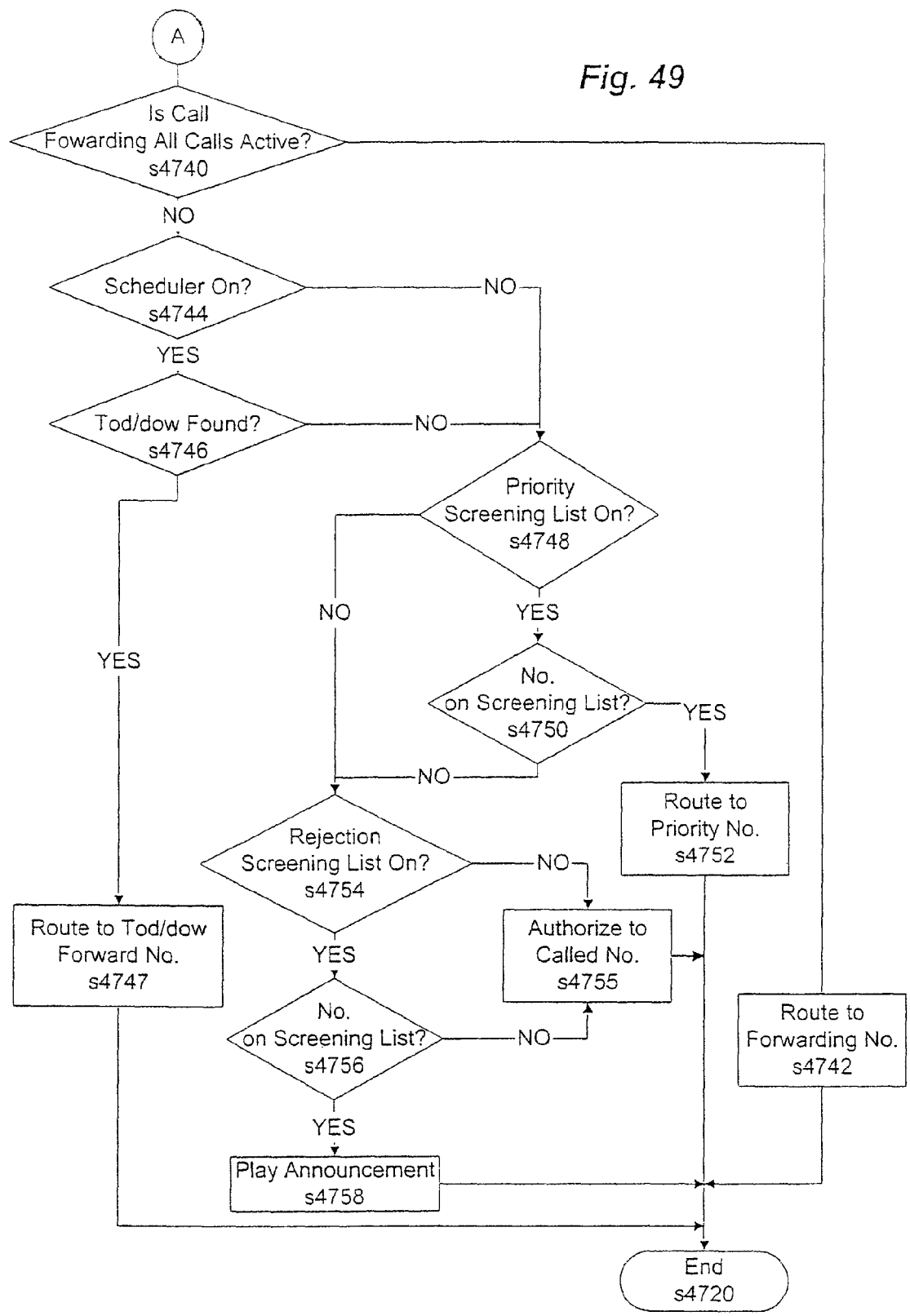
FIG. 49 is a continuation of the exemplary flowchart of FIG. 48.

FIGS. 47-49 show an exemplary flowchart diagram of the SCP service logic, according to an aspect of the present invention, whenever Intelligent Call Forwarding has been activated. At step s4702 of FIG. 47, a query, including the called party's telephone number and the calling party's telephone number, is received by the SCP 23 from the terminating switch SSP 24. At step s4704, a table is used to derive the local access and transport area (LATA) based upon the NPA-NXX of the called party number. In the embodiment depicted in FIG. 35, the LATA is used to determine the corresponding registration server 56 and ICW server 61 to query for the GetData and InvokeApp requests. The system selects from among multiple registration servers and ICW servers assigned to predetermined areas.

Subsequently, at step s4706 the SCP 23 launches a query to the appropriate server to obtain the subscriber's on-line status and sets a timer equal to a predetermined time, e.g., 2 seconds. If the query is unsuccessful, an error is reported and the SCP 23 instructs the SSP 24 to terminate the suspended call to the subscriber's line. If however, the query is successful, the subscriber's on-line status is determined at step s4706.

In an alternative embodiment, which incorporates the SN/IP 57 as shown in FIG. 23, there is no need for the SCP 23 to send a query to a server to determine the subscriber's on-line status. Instead, the SCP 23 already has that data stored and available. Every time the subscriber initiates an Internet session, a service node (e.g., the SN/IP 57) is notified. The service node, in turn, systematically notifies the SCP 23 that the subscriber is on-line and the SCP 23 stores the on-line status information. Therefore, when the SCP 23 receives a TAT query from SSP 24 regarding the subscriber's telephone number, the SCP 23 already has an on-line indication without having to query an external server. In other words, pursuant to the embodiment of FIG. 23, step s4704 is by-passed and step s4706 is executed using data already stored at the SCP 23.

If at step s4706, it is determined that the subscriber is not on-line, the SCP 23 instructs the SSP 24 according to any services associated with the called number. If the subscriber has Intelligent Call Forwarding, the SCP 23 proceeds to step s4740 of FIG. 49 to implement call forwarding options, as discussed below.

If the subscriber is on-line, a determination is made to ascertain whether the presentation restriction value is restricted or unavailable, at step s4710. If the presentation restriction indicator for the incoming call is "allowed," the SCP 23 launches a query to the a name database to determine whether the received calling party number is a ported telephone number at step s4712. If the query is successful, the telephone number returned in the response is either equal to the calling party number sent in the query if the telephone number is not ported, or the local routing number if the telephone number is ported. The telephone number returned in the response is checked against entries in a table to determine if the NPA-NXX belongs to a participating LEC, in which case a query is launched to the name database 50 to retrieve the calling party's name at step s4712.

If either query is not successful, an error is reported, the calling party name is set to null, and a determination is made as to whether the subscriber has voice mail service. Next, when the calling party name and number have been retrieved from the name database 50 at step s4714, a "please hold" announcement is played to the caller. If the subscriber has voice mail service, the caller is advised that the called party is on another call and that the caller should wait, and that the wait may take fifteen seconds. If the subscriber does not have voice mail service, the caller is advised that the called party is on another call, and that if the caller's call is not taken, the caller may hear a busy signal or be transferred to another number.

If the calling party name is not in the name database 50, an error is reported, the calling party name is set to null, and a determination is made as to whether the subscriber has voice mail service. Next, at step s4714 a "please hold" announcement is played to the caller. An appropriate message is played, depending on whether the subscriber has voice mail service.

If a call is received with a presentation restriction indicator of restricted (i.e., anonymous) and the subscriber has the ACR feature activated, an authorization response is sent to the SSP 24 and the suspended call attempts to terminate at the subscriber's line. If no ACR feature is active, or if the presentation restriction value is unavailable, the calling party name is set to null and the calling party number is set to anonymous or unavailable. Next, at step s4714 a "please hold" announcement is played to the caller. An appropriate message is played, depending on whether the subscriber has voice mail service.

At step s4716, the SCP 23 contacts the appropriate server (e.g., via an InvokeApp request to the ICW server 61 of FIG. 35) or service node (e.g., via an SIP invite to the SN/IP 57 of FIG. 23) with a request that includes the called party number, calling party number (if available and not presentation restricted), the calling party name (if available and not presentation restricted), IP address, port number, client software version number, and an indicator as to whether the subscriber has voice mail service. If there is no response within a predetermined time period, e.g., 25 seconds (indicating a timeout condition), an error is reported and an authorization response will be sent to the SSP 24 and the suspended call will attempt to terminate at the subscriber's line. If, however, there is a response within the predetermined time period, a determination is made as to whether the caller has abandoned the call at step s4718. If the call was abandoned, the connection is disconnected at step s4720. If the caller is still on the line, the server or the service node formats an Internet message to the client software 34 on the subscriber's PC 32, which causes a pop-up box dialog box to be displayed on the subscriber's display, informing the subscriber of the incoming call and presenting the subscriber with several call disposition options. Subsequently, the logic proceeds to step s4222 of FIG. 48.

Referring to FIG. 48, which continues the flow of FIG. 47, a check is made at step s4722 to determine whether the subscriber selected a call disposition option and the please hold announcement is terminated. If no call disposition option is made within a predetermined time period, the SCP 23 instructs the SSP 24 to begin playing a "call me back later" announcement at step s4730, after which the SSP 24 disposes of the call at step s4732, ending the logic flow at s4720.

If the subscriber selects a call disposition option (step s4722—YES), the SCP 23 first determines whether the subscriber has expressly rejected the call at step s4723. If the call is rejected (step s4723—YES), the SCP 23 instructs the SSP 24 to begin playing a "call me back later" announcement at step s4730, after which the SSP 24 disposes of the call at step s4732, ending the logic flow at s4720. If the call is not rejected (step s4723—NO), the logic flow proceeds to step s4724.

If the subscriber elects to accept the incoming call (step s4724—YES), the SCP 23 instructs the SSP 24 to begin playing a "will take your call" announcement at step s4730, after which the SCP 23 sends an authorize termination response to the SSP 24 which terminates the suspended call to the subscriber's telephone line at step s4732. Otherwise, the logic flow proceeds to step s4726 (step s4724—NO).

If the subscriber elects to forward the incoming call to voice mail service (step s4726-YES), the SCP 23 instructs the SSP 24 to begin playing an announcement to the caller that the call is being forwarded to a voice mail service at step s4730, after which the SCP 23 sends an authorize termination response to the SSP 24 at step s4732. The call is then connected to the subscriber's voice mail service. If the subscriber does not forward the call to voice mail (step s4726—NO), the logic flow proceeds to step s4728.

If the subscriber elects to forward the incoming call to another telephone line (step s4728—YES), the SCP 23 instructs the SSP 24 to begin playing a "forwarding to another number" announcement at step s4730, after which the SCP 23 sends a Forward Call response to the SSP 24 at step s4732. The call is then forwarded to the desired number. If the subscriber elects not to send the incoming call to another telephone line (step s4728—NO), the subscriber may select an announcement to be played to the caller at step s4730. The SCP 23 accordingly instructs the SSP 24 to begin playing the announcement selected by the subscriber at step s4730. One optional announcement advises the caller that the subscriber is busy and that the caller should call back later. Another option advises the caller that the subscriber is busy and that the subscriber will call the caller back later. After the selected announcement is played to the caller, the logic ends at step s4720.

FIG. 49 continues the flow from FIG. 47 whenever it is determined that an Intelligent Call Forwarding subscriber is not on-line. At step s4740, the SCP 23 determines whether call forwarding for all calls is active. If so, the incoming call is routed to the forwarding number at step s4742. If not, it is determined whether the scheduler is active at step at s4744. If the scheduler is ON, and the tod/dow is found at step s4746, the SCP 23 processes calls according to the tod/dow table, if populated, at step s4747. Processing the call according to the tod/dow table may include terminating the call to the subscriber telephone number if the time of day and day of the week correspond to a deactivation period.

If at step s4744, it is determined that the scheduler is OFF, or if at step s4746, it is determined that the scheduler is ON but the tod/dow table is not populated, the SCP 23 determines whether the subscriber has identified special routing instructions based on the calling party number. First, the SCP 23 determines whether the priority screening list is ON at step s4748 and, if so, whether calling party number is on that list at step s4750. Whenever the calling party number is on the priority screening list (step s4750—YES), the SCP 23 instructs the SSP 24 to route the incoming call to a pre-designated priority telephone number at step s4752, ending the call, at s4720.

When the calling party number is not on the priority screening list (step s4750—NO), the SCP 23 goes on to determine whether the rejection screening list is ON at step s4754. Whenever the rejection screening list is ON, the SCP 23 determines whether the calling party number is on that list at step s4756. Whenever the calling party number is on the rejection screening list (step s4756—YES), the SCP 23 instructs the SSP 24 to play an announcement at step s4758 rejecting the caller. In an alternative embodiment of the invention, the SCP 23 instructs the SSP 24 to terminate the incoming call to a directory number, without an announcement, pre-designated by the subscriber to receive rejected telephone calls, such as an voice message center, where the call is terminated. Whenever the rejection screening list is OFF (step s4754—NO), or the rejection screening list is ON, but the calling party number is not on the list (step s4756—NO), the SCP 23 instructs the SSP 24 to route the call to the called number at step s4755, ending the process at s4720.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods, and uses such as are within the scope of the appended claims.

In accordance with various embodiments of the present invention, the methods described herein are intended for operation as software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that the software implementations of the present invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. Accordingly, the invention is considered to include a tangible storage medium, as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards for Internet and other packet switched network transmission (e.g., TCP/IP, HTML, HTTP, CORBA) represent examples of the state of the art. Such standards are periodically superseded by faster or more efficient equivalents having essentially the same functions. Accordingly, replacement standards and protocols having the same functions are considered equivalents.

What is claimed is:

1. A method for updating communications service parameters, comprising:
   receiving, at a platform configured for speech recognition functionality and corresponding to a communications address associated with verbally updating communications service parameters, a voice instruction from a requester to update a communications service parameter; and
   translating the voice instruction into digital command data and storing the digital command data and the update to the communications service parameter in a database,
   wherein a change in a communications service corresponding to the update to the communications service parameter is implemented in near real-time.

2. The method according to claim 1, further comprising:
   playing, from the platform, a voice announcement to the subscriber identifying the communications service parameter prior to the update to the communications service parameter.

3. The method according to claim 1, further comprising:
   retrieving, from the database, the communications service parameter prior to the update to the communications service parameter.

4. The method according to claim 3, in which the retrieving the communications service parameter comprises retrieving communication service data of an account for the requester from the database.

5. The method according to claim 4, in which the database comprises a service control point database.

6. The method according to claim 5, in which the change to the communications service is implemented by transmitting the update from the platform to a service control point, storing the update in the service control point database, and implementing the update in response to a trigger activating the communications service.

7. The method according to claim 1, further comprising:
   establishing a connection for the requester in response to the requester providing the communications address associated with verbally updating communications service parameters.

8. The method according to claim 1,
wherein the requester provides the voice instruction via a web server in a packet switching network.

9. The method according to claim 8,
wherein the update to the communications service parameter is displayed to the requester at a graphical user interface.

10. The method according to claim 1, further comprising:
receiving voice information comprising identification information from the requester, translating the voice information into digital identification data and verifying the requester based on the digital identification data.

11. The method according to claim 10, further comprising:
comparing the digital identification data to previously stored voice data of the requester.

12. The method according to claim 1,
wherein the platform is accessible by the requester through a telephony network and a packet-switching network.

13. A communications service parameter update platform, comprising:
a receiver that receives a voice instruction from a requester to update a communications service parameter;
a translator that translates the voice instruction into digital command data; and
a forwarder that forwards the digital command data and the update to the communications service parameter to a first database for storage,
wherein the platform corresponds to a communications address associated with verbally updating communications service parameters; and
wherein a change in a communications service corresponding to the update to the communications service parameter is implemented in near real-time.

14. The platform according to claim 13,
wherein the platform is configured to receive digital identification data from the requester through a graphical user interface of the requester.

15. The platform according to claim 14,
wherein the platform is accessible to the requester through a web server in a packet switching network.

16. The platform according to claim 14,
wherein the platform comprises an interactive voice response platform.

17. The platform according to claim 14,
wherein the platform comprises an intelligent peripheral.

18. The platform according to claim 14,
wherein the platform is configured to retrieve the communications service parameter prior to the update from a second database that caches the communications service parameter.

19. A computer readable medium for storing a computer program for updating communications service parameters, comprising:
a receiving code segment that receives, at a platform configured for speech recognition functionality and corresponding to a communications address associated with verbally updating communications service parameters, a voice instruction from a requester to update a communications service parameter;
a translating code segment that translates the voice instruction into digital command data; and
a storing code segment that stores the digital command data and the update to the communications service parameter in a database,
wherein a change in a communications service corresponding to the update to the communications service parameter is implemented in near real-time.

20. The computer readable medium of claim 19,
wherein the communications service comprises call waiting.

21. The computer readable medium of claim 19,
wherein the communications service comprises call forwarding.

22. The computer readable medium of claim 19,
wherein the communications service comprises call blocking.

* * * * *